(12) United States Patent
Yang et al.

(10) Patent No.: US 12,427,964 B2
(45) Date of Patent: Sep. 30, 2025

(54) BRAKE-BY-WIRE SYSTEM AND CONTROL METHOD

(71) Applicant: SHENZHEN YINWANG INTELLIGENT TECHNOLOGIES CO., LTD., Shenzhen (CN)

(72) Inventors: Weimiao Yang, Shenzhen (CN); Shangwei Lv, Suzhou (CN); Yongsheng Zhang, Shanghai (CN); Yuhao Lu, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 96 days.

(21) Appl. No.: 18/398,614

(22) Filed: Dec. 28, 2023

(65) Prior Publication Data

US 2024/0132039 A1 Apr. 25, 2024

Related U.S. Application Data

(63) Continuation of application No. PCT/CN2021/103892, filed on Jun. 30, 2021.

(51) Int. Cl.
*B60T 13/66* (2006.01)
*B60T 13/68* (2006.01)
*B60T 17/22* (2006.01)

(52) U.S. Cl.
CPC .......... *B60T 13/662* (2013.01); *B60T 13/686* (2013.01); *B60T 17/221* (2013.01); *B60T 2270/404* (2013.01)

(58) Field of Classification Search
CPC .... B60T 13/662; B60T 13/686; B60T 17/221; B60T 2270/404; B60T 2270/82;
(Continued)

(56) References Cited

U.S. PATENT DOCUMENTS

2009/0072615 A1* 3/2009 Oosawa ................ B60T 8/4072
701/79
2009/0230762 A1* 9/2009 Giers ...................... B60T 8/885
303/3

(Continued)

FOREIGN PATENT DOCUMENTS

| CN | 110466489 A | 11/2019 |
|---|---|---|
| WO | 2021226887 A1 | 11/2021 |
| WO | 2021237496 A1 | 12/2021 |

*Primary Examiner* — George C Jin
(74) *Attorney, Agent, or Firm* — Fish & Richardson P.C.

(57) ABSTRACT

This application describes examples of a brake-by-wire system and a control method. In one example, a braking control system includes a brake master cylinder, a first pressure booster, a second pressure booster, at least one first interface, at least one first control valve, at least one second control valve, at least one third control valve, at least one fourth control valve, and a second pedal feel simulation system. The at least one first interface is connected to at least one brake wheel cylinder, respectively. The brake master cylinder and the at least one first interface are respectively connected through the at least one first control valve. The first pressure booster and the at least one first interface are respectively connected through the at least one first control valve. The second pressure booster and the at least one first interface are respectively connected through the at least one third control valve.

20 Claims, 33 Drawing Sheets

(58) Field of Classification Search
CPC ...... B60T 7/042; B60T 8/4081; B60T 13/146; B60T 13/745; B60T 13/68
See application file for complete search history.

(56) References Cited

U.S. PATENT DOCUMENTS

| | | | |
|---|---|---|---|
| 2012/0193975 A1* | 8/2012 | Ishii | B60T 8/4081 |
| | | | 303/14 |
| 2017/0137006 A1* | 5/2017 | Kuhlman | B60T 13/146 |
| 2017/0274884 A1* | 9/2017 | Besier | B60T 13/686 |
| 2017/0282877 A1 | 10/2017 | Besier et al. | |
| 2023/0278536 A1* | 9/2023 | Wang | B60T 8/4081 |
| | | | 303/15 |
| 2023/0373455 A1* | 11/2023 | Salter | B60T 7/18 |

* cited by examiner

BRAKE-BY-WIRE SYSTEM AND CONTROL METHOD

CROSS-REFERENCE TO RELATED APPLICATIONS

This application is a continuation of International Application No. PCT/CN2021/103892, filed on Jun. 30, 2021, the disclosure of which is hereby incorporated by reference in its entirety.

TECHNICAL FIELD

This application relates to the automotive field, and more specifically, to a brake-by-wire system and a control method thereof.

BACKGROUND

With the development of vehicle electrification and intelligence, a vehicle has higher requirements on a brake system. As the requirements for an active braking function and a braking energy recovery function increase, a brake-by-wire system is required in a vehicle to implement these functions, that is, a conventional mechanical brake needs to be decoupled from a brake pedal. In addition, as the autonomous driving level of the vehicle is improved, to improve safety of the brake system, the brake system further needs to have redundancy functions, that is, the vehicle still has a braking function even if one or more components in the brake system fail.

In addition, a brake system of a vehicle with an autonomous driving function further needs to support integrated braking functions such as automatic emergency braking (AEB), antilock braking system (ABS), traction control system (TCS), and electronic stability control system (ESC) in a traveling process of the vehicle. This increases complexity of the vehicle brake system, and further imposes a higher requirement on a redundant braking function of the brake system of the vehicle. Therefore, there is an urgent need for a brake system that can consider both brake-by-wire and redundancy functions, and support control functions of various control systems of a vehicle, so as to meet requirements such as control and safety of an autonomous vehicle.

SUMMARY

This application provides a brake-by-wire system and a control method, to implement dual-circuit redundant braking, thereby improving safety of the brake system to some extent.

According to a first aspect, a brake system is provided, including: a brake master cylinder (7), a first pressure booster (1), a second pressure booster (36), at least one first interface (38f, 38g, 38h, 38i), at least one first control valve (13, 14, 15, 16), at least one second control valve (26, 27, 28, 29), and at least one third control valve (31, 32, 33, 34), where the at least one first interface (38f, 38g, 38h, 38i) is configured to connect to at least one brake wheel cylinder (22, 23, 24, 25), respectively; the brake master cylinder (7) and the at least one first interface (38f, 38g, 38h, 38i) are respectively connected through the at least one first control valve (13, 14, 15, 16), and the first pressure booster (1) and the at least one first interface (38f, 38g, 38h, 38i) are respectively connected through the at least one first control valve (13, 14, 15, 16), where the at least one first interface (38f, 38g, 38h, 38i) and the at least one first control valve (13, 14, 15, 16) are respectively connected through the at least one second control valve (26, 27, 28, 29); and the second pressure booster (36) and the at least one first interface (38f, 38g, 38h, 38i) are respectively connected through the at least one third control valve (31, 32, 33, 34).

In the solution of this application, a corresponding isolation valve and a corresponding inlet valve are disposed for each brake wheel cylinder, so that when the master brake system fails, the redundant brake system can independently control each brake wheel cylinder, to implement function backup for the master brake system, thereby meeting the requirements for braking functions such as ABS/AEB/ESC/TCS of the vehicle, and further improving safety of the brake system.

With reference to the first aspect, in some implementations of the first aspect, the brake system further includes at least one fourth control valve (35), where the at least one fourth control valve (35) and the second pressure booster (36) are connected in parallel.

With reference to the first aspect, in some implementations of the first aspect, the first fluid storage container 6 or the second fluid storage container 71 is separately connected to at least one brake wheel cylinder through at least one fourth control valve.

In the solution of this application, when a wheel cylinder outlet valve is connected in parallel to a pressure booster, depressurization can be implemented for a plurality of brake wheel cylinders at a time-sharing manner with relatively low costs. When a plurality of wheel cylinder outlet valves are separately connected to a plurality of brake wheel cylinders, depressurization can be implemented for a plurality of brake wheel cylinders at the same time, thereby further improving independence of a redundant braking part in the brake system.

With reference to the first aspect, in some implementations of the first aspect, the brake system further includes a first fluid storage container (6) and a second fluid storage container (71), where the at least one fourth control valve (35) and the second pressure booster (36) are separately connected to the second fluid storage container (71), and the brake master cylinder (7) and the first pressure booster (1) are separately connected to the first fluid storage container (6); or the brake system further includes the first fluid storage container (6), where the at least one fourth control valve (35), the second pressure booster (36), the brake master cylinder (7) and the first pressure booster (1) are separately connected to the first fluid storage container (6).

In the solution of this application, the redundant brake system in the brake system may obtain the brake fluid from a fluid storage reservoir in the master brake system, to reduce costs. The redundant brake system may further obtain the brake fluid from an independent fluid storage reservoir of the redundant brake system, so that the redundant brake system is more completely decoupled from the master brake system, thereby improving independence of the redundant brake system.

With reference to the first aspect, in some implementations of the first aspect, that the at least one first interface (38f, 38g, 38h, 38i) and the at least one first control valve (13, 14, 15, 16) are respectively connected through the at least one second control valve (26, 27, 28, 29) includes: the at least one second control valve (26, 27, 28, 29) and the at least one first control valve (13, 14, 15, 16) are directly connected through a pipeline; or the at least one second control valve (26, 27, 28, 29) and the at least one first control valve (13, 14, 15, 16) are respectively connected through at least one second interface (38b, 38c, 38d, 38e), where the brake system further includes the at least one second interface (38b, 38c, 38d, 38e).

With reference to the first aspect, in some implementations of the first aspect, that the at least one fourth control valve (35) and the second pressure booster (36) are separately connected to the first fluid storage container (6) includes: the at least one fourth control valve (35), the second pressure booster (36), and the first fluid storage container (6) are directly connected through a pipeline; or the at least one fourth control valve (35) and the second pressure booster (36) are connected to the first fluid storage container (6) through a third interface (38a), where the brake system further includes the third interface (38a).

With reference to the first aspect, in some implementations of the first aspect, the brake system further includes a second pedal feel simulation system (121), where the second pedal feel simulation system (121) is connected to any one of the at least one second control valve (26, 27, 28, 29), a first pressure sensor (30) is connected to the second control valve connected to the second pedal feel simulation system (121), and the brake system further includes the first pressure sensor (30).

In the solution of this application, an independent pedal feel simulation system in the redundant brake system makes the redundant brake system more completely decoupled from the master brake system, thereby ensuring pedal feel of a driver, facilitating subsequent maintenance and replacement, and facilitating installation.

With reference to the first aspect, in some implementations of the first aspect, the brake system further includes at least one first one-way valve (39, 40, 41, 42), where the at least one first one-way valve (39, 40, 41, 42) is connected in parallel to the at least one second control valve (26, 27, 28, 29), a first pressure sensor (30) is connected to any one of the second control valves (26, 27, 28, 29), and the system further includes the first pressure sensor (30).

In the solution of this application, the one-way valve connected in parallel to the isolation valve can prevent the brake fluid from flowing back to the brake master cylinder while the brake pedal can generate displacement when the isolation valve is in a switched-off state.

With reference to the first aspect, in some implementations of the first aspect, the brake system further includes a first pedal feel simulator switch valve (43) and a first pedal feel simulation system (112); the first pedal feel simulator switch valve (43) is connected to any one of the at least one second control valve (26, 27, 28, 29); the first pressure sensor (30) is connected to the second control valve connected to the first pedal feel simulator switch valve (43), and a second hydraulic apparatus (120) includes the first pressure sensor (30); and a first pedal feel simulator (10) in the first pedal feel simulation system (112) is connected to the first pedal feel simulator switch valve (43).

In the solution of this application, the redundant brake system in the brake-by-wire system may further feed back pedal feel information to the driver. When the master brake system fails, pedal feel of the driver can still be ensured, thereby bringing more stable and comfortable driving experience to the driver.

With reference to the first aspect, in some implementations of the first aspect, that a first pedal feel simulator (10) in the first pedal feel simulation system (112) is connected to the first pedal feel simulator switch valve (43) includes: the first pedal feel simulator (10) and the first pedal feel simulator switch valve (43) are directly connected through a pipeline; or the first pedal feel simulator (10) and the first pedal feel simulator switch valve (43) are connected through a fourth interface (38j), where the second hydraulic apparatus (120) further includes the fourth interface (38j).

With reference to the first aspect, in some implementations of the first aspect, the brake system further includes at least one fifth control valve (11, 12), at least one sixth control valve (17, 18, 19, 20), at least one second one-way valve (47, 48, 49, 50), and a mechanical brake input apparatus (111), where the mechanical brake input apparatus (111) is connected to the master cylinder (7); the at least one fifth control valve (11, 12) is further included between the master cylinder (7) and the at least one first control valve (13, 14, 15, 16); and one end of the at least one sixth control valve (17, 18, 19, 20) is connected to a hydraulic pipeline between the at least one first control valve (13, 14, 15, 16) and the at least one second control valve (26, 27, 28, 29), and the other end of the at least one sixth control valve (17, 18, 19, 20) is configured to be hydraulically connected to a fluid storage container.

According to a second aspect, a first brake subsystem is provided, where the first brake subsystem (120) includes at least one first interface (38f, 38g, 38h, 38i), at least one second interface (38b, 38c, 38d, 38e), at least one second control valve (26, 27, 28, 29), at least one third control valve (31, 32, 33, 34), and a second pressure booster (36); the at least one first interface (38f, 38g, 38h, 38i) is configured to connect to at least one brake wheel cylinder (22, 23, 24, 25); the second pressure booster (36) is connected to the at least one first interface (38f, 38g, 38h, 38i) through the at least one third control valve (31, 32, 33, 34); and the at least one second interface (38b, 38c, 38d, 38e) is connected to the at least one first interface (38f, 38g, 38h, 38i) through the at least one second control valve (26, 27, 28, 29).

In the solution of this application, a corresponding isolation valve and a corresponding inlet valve are disposed for each brake wheel cylinder, so that when the master brake system fails, the redundant brake system can independently control each brake wheel cylinder, to implement function backup for the master brake system, thereby meeting the requirements for braking functions such as ABS/AEB/ESC/TCS of the vehicle, and further improving safety of the brake system.

With reference to the second aspect, in some implementations of the second aspect, the first brake subsystem (120) further includes at least one fourth control valve (35), where the at least one fourth control valve (35) and the second pressure booster (36) are connected in parallel.

With reference to the second aspect, in some implementations of the second aspect, the first fluid storage container 6 or the second fluid storage container 71 is separately connected to at least one brake wheel cylinder through at least one fourth control valve.

In the solution of this application, when a wheel cylinder outlet valve is connected in parallel to a pressure booster, depressurization can be implemented for a plurality of brake wheel cylinders at a time-sharing manner with relatively low costs. When a plurality of wheel cylinder outlet valves are separately connected to a plurality of brake wheel cylinders, depressurization can be implemented for a plurality of brake wheel cylinders at the same time, thereby further improving independence of a redundant braking part in the brake system.

With reference to the second aspect, in some implementations of the second aspect, the first brake subsystem (120) further includes a second fluid storage container (71), where the at least one fourth control valve (35) and the second pressure booster (36) are separately connected to the second fluid storage container (71); or a third interface (38a), where the at least one fourth control valve (35) and the second pressure booster (36) are separately connected to the third interface (38a).

In the solution of this application, the redundant brake system may obtain the brake fluid from a fluid storage reservoir in the master brake system, to reduce costs. The redundant brake system may further obtain the brake fluid from an independent fluid storage reservoir of the redundant brake system, so that the redundant brake system is more completely decoupled from the master brake system, thereby improving independence of the redundant brake system.

With reference to the second aspect, in some implementations of the second aspect, the first brake subsystem (120) further includes a second pedal feel simulation system (121), where the second pedal feel simulation system (121) is connected to any one of the at least one second control valve (26, 27, 28, 29), a first pressure sensor (30) is connected to the second control valve connected to the second pedal feel simulation system (121), and the first hydraulic apparatus (120) includes the first pressure sensor (30).

In the solution of this application, an independent pedal feel simulation system in the redundant brake system makes the redundant brake system more completely decoupled from the master brake system, thereby ensuring pedal feel of a driver, facilitating subsequent maintenance and replacement, and facilitating installation.

With reference to the second aspect, in some implementations of the second aspect, the first brake subsystem (120) further includes at least one first one-way valve (39, 40, 41, 42), where the at least one first one-way valve (39, 40, 41, 42) is connected in parallel to the at least one second control valve (26, 27, 28, 29), the first pressure sensor (30) is connected to any one of the second control valves (26, 27, 28, 29), and the first brake subsystem (120) includes the first pressure sensor (30).

In the solution of this application, the one-way valve connected in parallel to the isolation valve can prevent the brake fluid from flowing back to the brake master cylinder while the brake pedal can generate displacement when the isolation valve is in a switched-off state.

With reference to the second aspect, in some implementations of the second aspect, the first brake subsystem (120) further includes a fourth interface (38j) and a first pedal feel simulator switch valve (43); the fourth interface (38j) is connected to any one of the at least one second control valve (26, 27, 28, 29) through the first pedal feel simulator switch valve (43); and the first pressure sensor (30) is connected to the second control valve connected to the first pedal feel simulator switch valve (43), and the first brake subsystem (120) includes the first pressure sensor (30).

In the solution of this application, the redundant brake system may further feed back pedal feel information to the driver. When the master brake system fails, pedal feel of the driver can still be ensured, thereby bringing more stable and comfortable driving experience to the driver.

According to a third aspect, a brake system braking method is provided, applied to a brake system, where the brake system includes a brake master cylinder (7), a first pressure booster (1), a second pressure booster (36), at least one first interface (38f, 38g, 38h, 38i), at least one first control valve (13, 14, 15, 16), at least one second control valve (26, 27, 28, 29), at least one third control valve (31, 32, 33, 34), and a controller; the at least one first interface (38f, 38g, 38h, 38i) is configured to connect to at least one brake wheel cylinder (22, 23, 24, 25), respectively; the brake master cylinder (7) and the at least one first interface (38f, 38g, 38h, 38i) are respectively connected through the at least one first control valve (13, 14, 15, 16), and the first pressure booster (1) and the at least one first interface (38f, 38g, 38h, 38i) are respectively connected through the at least one first control valve (13, 14, 15, 16), where the at least one first interface (38f, 38g, 38h, 38i) and the at least one first control valve (13, 14, 15, 16) are respectively connected through the at least one second control valve (26, 27, 28, 29); and the second pressure booster (36) and the at least one first interface (38f, 38g, 38h, 38i) are respectively connected through the at least one third control valve (31, 32, 33, 34). The method includes: obtaining a first signal, where the first signal is used to indicate fault information of the brake system; and controlling, according to the first signal, the at least one second control valve (26, 27, 28, 29) to switch to a switched-off state.

It should be understood that the fault information of the brake system may be obtained by detecting a pedal displacement sensor of the brake pedal, a pressure of the first pressure booster, or the like.

In the solution of this application, the at least one isolation valve of the redundant brake system is controlled, so that the master brake system and the redundant brake system are isolated when the master brake system fails. This implements backup of a function of the master brake system by the redundant brake system, thereby ensuring safety of the brake system.

With reference to the third aspect, in some implementations of the third aspect, the method further includes: obtaining a second signal, where the second signal is used to indicate a first target braking requirement; and controlling, according to the second signal, the at least one third control valve (31, 32, 33, 34) to switch to a first state, where the first state includes: the at least one target third control valve is configured to be in a switched-on state, where the at least one third control valve (31, 32, 33, 34) includes the at least one target third control valve, and the at least one target third control valve is determined according to the second signal.

It should be understood that one or more target third control valves may be selected from the at least one third control valve (31, 32, 33, 34) according to the second signal, so that each brake wheel cylinder is independently controlled when the master brake system fails.

It should be understood that the first target braking requirement may be a braking requirement that requires cooperation of at least one third control valve when the master brake system fails, for example, pressure boosting, depressurization, or pressure preservation on at least one brake wheel cylinder.

In the solution of this application, the at least one inlet valve of the redundant brake system is controlled, so that the redundant brake system independently controls each brake wheel cylinder when the master brake system fails.

With reference to the third aspect, in some implementations of the third aspect, the brake system further includes at least one fourth control valve (35), where the at least one fourth control valve (35) and the second pressure booster (36) are connected in parallel; and the method further includes: obtaining a third signal, where the third signal is used to indicate a second target braking requirement; and controlling, according to the third signal, the at least one fourth control valve (35) to switch to a second state, where the second state includes: the at least one target fourth control valve is configured to be in a switched-on state, where the at least one fourth control valve (35) includes the at least one target fourth control valve, and the at least one target fourth control valve is determined according to the third signal.

It should be understood that one or more target fourth control valves may be selected from the at least one fourth control valve (35) according to the third signal, to implement independent control on each brake wheel cylinder when the master brake system fails. For example, when there is only one fourth control valve, depressurization control may be implemented for each brake wheel cylinder at different times; and when each brake wheel cylinder has a corresponding fourth control valve, independent control may be implemented for each brake wheel cylinder.

It should be understood that the second target braking requirement may be a braking requirement that requires cooperation of at least one fourth control valve when the master brake system fails, for example, depressurization on at least one brake wheel cylinder.

In the solution of this application, the at least one outlet valve of the redundant brake system is controlled, so that when the master brake system fails, the redundant brake system performs depressurization control on each brake wheel cylinder. For example, if there is only one outlet valve, this solution can implement time-sharing independent depressurization for each brake wheel cylinder, thereby reducing costs. If there is a corresponding outlet valve for each wheel cylinder, this solution can implement independent depressurization for each brake wheel cylinder at the same time, thereby improving functions of a redundant brake system and improving braking safety.

With reference to the third aspect, in some implementations of the third aspect, the brake system includes a second pedal feel simulation system (121), the second pedal feel simulation system (121) is connected to any one of the at least one second control valve (26, 27, 28, 29), a first pressure sensor (30) is connected to the second control valve connected to the second pedal feel simulation system (121), and the brake system further includes the first pressure sensor (30); and the method further includes: obtaining a fourth signal, where the fourth signal is used to indicate the second pedal feel simulation system (121) to operate; and controlling, according to the fourth signal, a second pedal feel simulator switch valve (44) in the second pedal feel simulation system (121) to switch to a third state, where the third state includes: the second pedal feel simulator switch valve (44) is configured to be in a switched-on state.

In the solution of this application, an independent pedal feel simulation system in the redundant brake system makes the redundant brake system more completely decoupled from the master brake system, thereby ensuring pedal feel of a driver, facilitating subsequent maintenance and replacement, and facilitating installation.

With reference to the third aspect, in some implementations of the third aspect, the brake system includes a first pedal feel simulator switch valve (43) and a first pedal feel simulation system (112); the first pedal feel simulator switch valve (43) is connected to any one of the at least one second control valve (26, 27, 28, 29); the first pressure sensor (30) is connected to the second control valve connected to the first pedal feel simulator switch valve (43), and the second hydraulic apparatus (120) includes the first pressure sensor (30); and a first pedal feel simulator (10) in the first pedal feel simulation system (112) is connected to the first pedal feel simulator switch valve (43). The method further includes: obtaining a fifth signal, where the fifth signal is used to indicate the first pedal feel simulation system (112) to operate; and controlling, according to the fifth signal, the first pedal feel simulator switch valve (43) to switch to a fourth state, where the fourth state includes: the first pedal feel simulator switch valve (10) is configured to be in a switched-on state.

In the solution of this application, the redundant brake system may further feed back pedal feel information to the driver. When the master brake system fails, pedal feel of the driver can still be ensured, thereby bringing more stable and comfortable driving experience to the driver.

According to a fourth aspect, a brake system braking method is provided, applied to a brake system, where the brake system includes a brake master cylinder (7), a first pressure booster (1), a second pressure booster (36), at least one first interface (38f, 38g, 38h, 38i), at least one first control valve (13, 14, 15, 16), at least one second control valve (26, 27, 28, 29), at least one third control valve (31, 32, 33, 34), and a controller; the at least one first interface (38f, 38g, 38h, 38i) is configured to connect to at least one brake wheel cylinder (22, 23, 24, 25), respectively; the brake master cylinder (7) and the at least one first interface (38f, 38g, 38h, 38i) are respectively connected through the at least one first control valve (13, 14, 15, 16), and the first pressure booster (1) and the at least one first interface (38f, 38g, 38h, 38i) are respectively connected through the at least one first control valve (13, 14, 15, 16), where the at least one first interface (38f, 38g, 38h, 38i) and the at least one first control valve (13, 14, 15, 16) are respectively connected through the at least one second control valve (26, 27, 28, 29); and the second pressure booster (36) is connected to the at least one first interface (38f, 38g, 38h, 38i) through the at least one third control valve (31, 32, 33, 34). The method includes: a controller obtains a braking requirement, and generates a control instruction according to the braking requirement; and the controller sends the control instruction to a brake system, to increase a braking force of at least one brake wheel cylinder (22, 23, 24, 25) by controlling the brake system.

In the solution of this application, two isolation valves are disposed in the redundant brake system. In a case of low costs, when the master brake system fails, the redundant brake system can control each brake wheel cylinder, to implement function backup of the master brake system, thereby meeting requirements for braking functions such as ABS/AEB/ESC/TCS of the vehicle, and further improving safety of the brake system.

With reference to the fourth aspect, in some implementations of the fourth aspect, the brake system further includes at least one fourth control valve (35), where the at least one fourth control valve (35) is connected in parallel to a second pressure booster (36); and the method further includes: the controller sends a control instruction to the brake system, to reduce or maintain the braking force of at least one brake wheel cylinder (22, 23, 24, 25) by controlling the brake system.

In the solution of this application, when a wheel cylinder outlet valve is connected in parallel to a pressure booster, depressurization can be implemented for a plurality of brake wheel cylinders at a time-sharing manner with relatively low costs. When a plurality of wheel cylinder outlet valves and connected in parallel to the pressure booster, depressurization can be implemented for a plurality of brake wheel cylinders at the same time, thereby further improving independence of a redundant braking part in the brake system.

With reference to the fourth aspect, in some implementations of the fourth aspect, the brake system further includes a first fluid storage container (6) and a second fluid storage container (71), where the at least one fourth control valve

(35) and the second pressure booster (36) are separately connected to the second fluid storage container (71), and the brake master cylinder (7) and the first pressure booster (1) are separately connected to the first fluid storage container (6); or the system further includes the first fluid storage container (6), where the at least one fourth control valve (35), the second pressure booster (36), the brake master cylinder (7) and the first pressure booster (1) are separately connected to the first fluid storage container (6). The increasing a braking force of at least one brake wheel cylinder (22, 23, 24, 25) by controlling the brake system includes: the controller controls the brake fluid from the first fluid storage container (6) or the second fluid storage container (71) to flow into the at least one brake wheel cylinder (22, 23, 24, 25). Alternatively, the reducing or maintaining the braking force of at least one brake wheel cylinder (22, 23, 24, 25) by controlling the brake system includes: the controller controls the brake fluid in the at least one brake wheel cylinder (22, 23, 24, 25) to flow back to the first fluid storage container (6) or the second fluid storage container (71); or the controller maintains the pressure of the brake fluid in the pipeline between the at least one brake wheel cylinder (22, 23, 24, 25) and the first fluid storage container (6), or the controller maintains the pressure of the brake fluid in the pipeline between the at least one brake wheel cylinder (22, 23, 24, 25) and the second fluid storage container (71).

In the solution of this application, the redundant brake system in the brake-by-wire system may obtain the brake fluid from a fluid storage reservoir in the master brake system, to reduce costs. The redundant brake system may further obtain the brake fluid from an independent fluid storage reservoir of the redundant brake system, so that the redundant brake system is more completely decoupled from the master brake system, thereby improving independence of the redundant brake system.

With reference to the fourth aspect, in some implementations of the fourth aspect, that the controller controls the brake fluid from the first fluid storage container (6) or the second fluid storage container (71) to flow into the at least one brake wheel cylinder (22, 23, 24, 25) includes: at least one fourth control valve (35) is in a switched-off state, at least one third control valve (31, 32, 33, 34) is in a switched-on state, all second control valves (26, 27, 28, 29) are in a switched-off state, and the controller controls the brake fluid from the first fluid storage container (6) or the second fluid storage container (71) to flow into the at least one brake wheel cylinder (22, 23, 24, 25) through the second pressure booster (36) and the at least one third control valve (31, 32, 33, 34).

With reference to the fourth aspect, in some implementations of the fourth aspect, that the controller controls the brake fluid in the at least one brake wheel cylinder (22, 23, 24, 25) to flow back to the first fluid storage container (6) or the second fluid storage container (71) includes: at least one fourth control valve (35) is in a switched-on state, at least one third control valve (31, 32, 33, 34) is in a switched-on state, all second control valves (26, 27, 28, 29) are in a switched-off state, and the controller controls the brake fluid in the at least one brake wheel cylinder (22, 23, 24, 25) to flow back to the first fluid storage container (6) or the second fluid storage container (71) through at least one third control valve (31, 32, 33, 34) and at least one fourth control valve (35).

With reference to the fourth aspect, in some implementations of the fourth aspect, the brake system further includes a second pedal feel simulation system (121), where the second pedal feel simulation system (121) is connected to any one of the at least one second control valve (26, 27, 28, 29), a first pressure sensor (30) is connected to the second control valve connected to the second pedal feel simulation system (121), and the brake system further includes the first pressure sensor (30). The controller controls the second pedal feel simulation system (121) to feed back the pedal feel information to a driver, specifically including: the second pedal feel simulator switch valve (44) in the second pedal feel simulation system (121) is in a switched-on state, the brake fluid enters a second pedal feel simulator (45) from the brake master cylinder (7) through the first control valve connected to the second pedal feel simulation system (121), and the second pedal feel simulation system 121 feeds back the sensing information to the driver, where the second pedal feel simulation system (121) includes the second pedal feel simulator (45).

In the solution of this application, an independent pedal feel simulation system in the redundant brake system makes the redundant brake system more completely decoupled from the master brake system, thereby ensuring pedal feel of a driver, facilitating subsequent maintenance and replacement, and facilitating installation.

With reference to the fourth aspect, in some implementations of the fourth aspect, the brake system further includes at least one first one-way valve (39, 40, 41, 42), where the at least one first one-way valve (39, 40, 41, 42) is connected in parallel to the at least one second control valve (26, 27, 28, 29), a first pressure sensor (30) is connected to any one of the second control valves (26, 27, 28, 29), and the system further includes the first pressure sensor (30). That the controller sends a control instruction to the brake system to reduce or maintain the braking force of the at least one brake wheel cylinder (22, 23, 24, 25) by controlling the brake system includes: at least one first one-way valve (39, 40, 41, 42) is configured to displace the brake pedal (3) while isolating the brake fluid from flowing to the brake master cylinder (7).

In the solution of this application, the one-way valve connected in parallel to the isolation valve can prevent the brake fluid from flowing back to the brake master cylinder while the brake pedal can generate displacement when the isolation valve is in a switched-off state.

With reference to the fourth aspect, in some implementations of the fourth aspect, the brake system includes a first pedal feel simulator switch valve (43) and a first pedal feel simulation system (112); the first pedal feel simulator switch valve (43) is connected to any one of the at least one second control valve (26, 27, 28, 29); the first pressure sensor (30) is connected to the second control valve connected to the first pedal feel simulator switch valve (43), and the second hydraulic apparatus (120) includes the first pressure sensor (30); and a first pedal feel simulator (10) in the first pedal feel simulation system (112) is connected to the first pedal feel simulator switch valve (43). The controller controls the first pedal feel simulation system (112) to feed back the pedal feel information to a driver, specifically including: the third pedal feel simulator switch valve (9) in the first pedal feel simulation system is in a switched-off state, the first pedal feel simulator switch valve (43) is in a switched-on state, and the brake fluid passes through the first control valve connected to the first pedal feel simulator switch valve (43) from the brake master cylinder (7) and enters the first pedal feel simulator (10), and the second pedal feel simulation system (121) feeds back the pedal feel information to the driver.

In the solution of this application, the redundant brake system may further feed back pedal feel information to the driver. When the master brake system fails, pedal feel of the driver can still be ensured, thereby bringing more stable and comfortable driving experience to the driver.

According to a fifth aspect, a brake system is provided, where the brake system includes a brake master cylinder (7), a first pressure booster (1), a second pressure booster (36), at least one fifth control valve (11, 12), at least one first control valve (13, 14, 15, 16), and at least one second control valve (52, 53); the at least one first control valve (13, 14, 15, 16) is configured to connect to at least one brake wheel cylinder (22, 23, 24, 25); the brake master cylinder (7) and at least one first control valve (13, 14, 15, 16) are respectively connected through the at least one second control valve (52, 53), and the at least one fifth control valve (11, 12) is further included between the at least one first control valve (13, 14, 15, 16) and the at least one second control valve (52, 53); and the first pressure booster (1) and the at least one first control valve (13, 14, 15, 16) are directly connected, and the second pressure booster (36) and at least one first control valve (13, 14, 15, 16) are connected through at least one fifth control valve (11, 12).

In the solution of this application, two isolation valves are disposed in the redundant brake system, so that when the master brake system fails, the redundant brake system can control each brake wheel cylinder, to implement function backup of the master brake system, thereby meeting requirements for braking functions such as ABS/AEB/ESC/TCS of the vehicle, and further improving safety of the brake system.

With reference to the fifth aspect, in some implementations of the fifth aspect, the brake system further includes a first fluid storage container (6) and a second fluid storage container (71), where the second pressure booster (36) is connected to the first fluid storage container (6), or the second pressure booster (36) is connected to the second fluid storage container (71).

In the solution of this application, the redundant brake system in the brake system may obtain the brake fluid from a fluid storage reservoir in the master brake system, to reduce costs. The redundant brake system may further obtain the brake fluid from an independent fluid storage reservoir of the redundant brake system, so that the redundant brake system is more completely decoupled from the master brake system, thereby improving independence of the redundant brake system.

With reference to the fifth aspect, in some implementations of the fifth aspect, that the brake master cylinder (7) and at least one first control valve (13, 14, 15, 16) are respectively connected through the at least one second control valve (52, 53), and the at least one fifth control valve (11, 12) is further included between the at least one first control valve (13, 14, 15, 16) and the at least one second control valve (52, 53) includes: the brake master cylinder (7) and the at least one second control valve (52, 53) are directly connected, or the brake master cylinder (7) and the at least one second control valve (52, 53) are respectively connected through at least one second interface (38*k*, 38*l*); and the at least one second control valve (52, 53) and the at least one fifth control valve (11, 12) are directly connected, or the at least one second control valve (52, 53) and the at least one fifth control valve (11, 12) are respectively connected through at least one fifth interface (38*m*, 38*n*).

With reference to the fifth aspect, in some implementations of the fifth aspect, that the second pressure booster (36) is connected to the first fluid storage container (6) includes: the second pressure booster (36) and the first fluid storage container (6) are directly connected, or the second pressure booster (36) and the first fluid storage container (6) are connected through a third interface (38*a*).

With reference to the fifth aspect, in some implementations of the fifth aspect, the brake system further includes a first pedal feel simulator switch valve (43) and a first pedal feel simulation system (112); the first pedal feel simulator switch valve (43) is connected to any one of the at least one second control valve (52, 53); the first pressure sensor (30) is connected to the second control valve connected to the first pedal feel simulator switch valve (43), and the second hydraulic apparatus (120) includes a first pressure sensor (30); and the first pedal feel simulator (10) in the first pedal feel simulation system (112) is connected to the first pedal feel simulator switch valve (43).

In the solution of this application, the redundant brake system in the brake-by-wire system may further feed back pedal feel information to the driver. When the master brake system fails, pedal feel of the driver can still be ensured, thereby bringing more stable and comfortable driving experience to the driver.

With reference to the fifth aspect, in some implementations of the fifth aspect, the brake system further includes at least one fourth control valve (54, 55), where the first fluid storage container (6) or the second fluid storage container (71) is connected to the at least one first control valve (13, 14, 15, 16) through the at least one fourth control valve (54, 55), and the at least one fifth control valve (11, 12) is further included between the at least one fourth control valve (54, 55) and the at least one first control valve (13, 14, 15, 16), where the at least one fourth control valve (54, 55) and the at least one fifth control valve (11, 12) are directly connected, or the at least one fourth control valve (54, 55) and the at least one fifth control valve (11, 12) are respectively connected through at least one fifth interface (38*m*, 38*n*).

In the solution of this application, a wheel cylinder outlet valve is added to a redundant brake system, so that when a master brake system fails and a brake wheel cylinder needs to be depressurized, for example, when an ABS braking requirement is met, the controller can effectively reduce braking forces of the four brake wheel cylinders, thereby further improving safety of the brake system.

With reference to the fifth aspect, in some implementations of the fifth aspect, the brake system further includes at least one first one-way valve (56, 57), where the at least one first one-way valve (56, 57) is connected in parallel to the at least one second control valve (52, 53), the first pressure sensor (30) is connected to any one of the second control valves (52, 53), and the brake system further includes the first pressure sensor (30).

In the solution of this application, the one-way valve connected in parallel to the isolation valve can prevent the brake fluid from flowing back to the brake master cylinder while the brake pedal can generate displacement when the isolation valve is in a switched-off state.

With reference to the fifth aspect, in some implementations of the fifth aspect, the brake system further includes at least one sixth control valve (17, 18, 19, 20), at least one second one-way valve (47, 48, 49, 50), and a mechanical brake input apparatus (111); the mechanical brake input apparatus (111) is connected to the master cylinder (7); the at least one sixth control valve (17, 18, 19, 20) is further included between the at least one first control valve (13, 14, 15, 16) and the at least one brake wheel cylinder (22, 23, 24, 25); and the at least one second one-way valve (47, 48, 49, 50) and the at least one first control valve (13, 14, 15, 16) are respectively connected in parallel.

According to a sixth aspect, a brake system is provided, where the brake system includes a brake master cylinder (7), a first pressure booster (1), a second pressure booster (36), at least one fifth control valve (11, 12), at least one first control valve (13, 14, 15, 16), and at least one second control valve (52, 53); the at least one first control valve (13, 14, 15, 16) is configured to connect to at least one brake wheel cylinder (22, 23, 24, 25); the brake master cylinder (7) and the at least one first control valve (13, 14, 15, 16) are respectively connected through the at least one second control valve (52, 53), and the at least one fifth control valve (11, 12) is further included between the brake master cylinder (7) and the at least one second control valve (52, 53); the second pressure booster (36) and the at least one first control valve (13, 14, 15, 16) are directly connected; and the first pressure booster (1) and the at least one first control valve (13, 14, 15, 16) are connected through the at least one second control valve (52, 53).

In the solution of this application, two isolation valves are disposed in the redundant brake system, so that when the master brake system fails, the redundant brake system can control each brake wheel cylinder, to implement function backup of the master brake system, thereby meeting requirements for braking functions such as ABS/AEB/ESC/TCS of the vehicle, and further improving safety of the brake system.

With reference to the sixth aspect, in some implementations of the sixth aspect, the brake system further includes a first fluid storage container (6) and a second fluid storage container (71), where the second pressure booster (36) is connected to the first fluid storage container (6), or the second pressure booster (36) is connected to the second fluid storage container (71).

In the solution of this application, the redundant brake system in the brake system may obtain the brake fluid from a fluid storage reservoir in the master brake system, to reduce costs. The redundant brake system may further obtain the brake fluid from an independent fluid storage reservoir of the redundant brake system, so that the redundant brake system is more completely decoupled from the master brake system, thereby improving independence of the redundant brake system.

With reference to the sixth aspect, in some implementations of the sixth aspect, that the brake master cylinder (7) and the at least one first control valve (13, 14, 15, 16) are respectively connected through the at least one second control valve (52, 53), and the at least one fifth control valve (11, 12) is further included between the brake master cylinder (7) and the at least one second control valve (52, 53) includes: the at least one second control valve (52, 53) and the at least one fifth control valve (11, 12) are directly connected, or the at least one second control valve (52, 53) and at least one fifth control valve (11, 12) are respectively connected through at least one second interface (38k, 38l); and the at least one first control valve (13, 14, 15, 16) and the at least one second control valve (52, 53) are directly connected, or the at least one first control valve (13, 14, 15, 16) and the at least one second control valve (52, 53) are respectively connected through at least one fifth interface (38m, 38n).

With reference to the sixth aspect, in some implementations of the sixth aspect, that the second pressure booster (36) is connected to the first fluid storage container (6) includes: the second pressure booster (36) and the first fluid storage container (6) are directly connected, or the second pressure booster (36) and the first fluid storage container (6) are connected through a third interface (38a).

With reference to the sixth aspect, in some implementations of the sixth aspect, the brake system further includes a first pedal feel simulator switch valve (43) and a first pedal feel simulation system (112); the first pedal feel simulator switch valve (43) is connected to any one of the at least one second control valve (52, 53); the first pressure sensor (30) is connected to the second control valve connected to the first pedal feel simulator switch valve (43), and the second hydraulic apparatus (120) includes a first pressure sensor (30); and the first pedal feel simulator (10) in the first pedal feel simulation system (112) is connected to the first pedal feel simulator switch valve (43).

In the solution of this application, the redundant brake system in the brake-by-wire system may further feed back pedal feel information to the driver. When the master brake system fails, pedal feel of the driver can still be ensured, thereby bringing more stable and comfortable driving experience to the driver.

With reference to the sixth aspect, in some implementations of the sixth aspect, the brake system further includes at least one fourth control valve (54, 55), where the first fluid storage container (6) or the second fluid storage container (71) is connected to the at least one first control valve (13, 14, 15, 16) through the at least one fourth control valve (54, 55); and the at least one fourth control valve (54, 55) and the at least one first control valve (13, 14, 15, 16) are directly connected, or the at least one fourth control valve (54, 55) and the at least one first control valve (13, 14, 15, 16) are respectively connected through at least one fifth interface (38m, 38n).

In the solution of this application, a wheel cylinder outlet valve is added to a redundant brake system, so that when a master brake system fails and a brake wheel cylinder needs to be depressurized, for example, when an ABS braking requirement is met, the controller can effectively reduce braking forces of the four brake wheel cylinders, thereby further improving safety of the brake system.

With reference to the sixth aspect, in some implementations of the sixth aspect, the brake system further includes at least one first one-way valve (56, 57), where the at least one first one-way valve (56, 57) is connected in parallel to the at least one second control valve (52, 53), the first pressure sensor (30) is connected to any one of the second control valves (52, 53), and the brake system further includes the first pressure sensor (30).

In the solution of this application, the one-way valve connected in parallel to the isolation valve can prevent the brake fluid from flowing back to the brake master cylinder while the brake pedal can generate displacement when the isolation valve is in a switched-off state.

With reference to the sixth aspect, in some implementations of the sixth aspect, the brake system further includes at least one sixth control valve (17, 18, 19, 20), at least one second one-way valve (47, 48, 49, 50), and a mechanical brake input apparatus (111); the mechanical brake input apparatus (111) is connected to the master cylinder (7); the at least one sixth control valve (17, 18, 19, 20) is further included between the at least one first control valve (13, 14, 15, 16) and the at least one brake wheel cylinder (22, 23, 24, 25); and the at least one second one-way valve (47, 48, 49, 50) and the at least one first control valve (13, 14, 15, 16) are respectively connected in parallel.

According to a seventh aspect, a brake system is provided, including: a brake master cylinder (7), a first pressure booster (1), a second pressure booster (36), at least one first interface (38w, 38x, 38y, 38z), at least one first control valve (13, 14, 15, 16), at least one second control valve (52, 53), and at least one third control valve (61, 62, 63, 64); the at least one first interface (38w, 38x, 38y, 38z) is configured to connect to at least one brake wheel cylinder (22, 23, 24, 25); the at least one first control valve (13, 14, 15, 16) and the at least one first interface (38w, 38x, 38y, 38z) are respectively connected through the at least one third control valve (61, 62, 63, 64); the brake master cylinder (7) and at least one first control valve (13, 14, 15, 16) are respectively connected through the at least one second control valve (52, 53); at least one fifth control valve (11, 12) is further included between the at least one first control valve (13, 14, 15, 16) and the at least one second control valve (52, 53); and the first pressure booster (1) and the at least one first control valve (13, 14, 15, 16) are directly connected, and the second pressure booster (36) and the at least one first control valve (13, 14, 15, 16) are connected through the at least one fifth control valve (11, 12).

In the solution of this application, two isolation valves are disposed in the redundant brake system. In a case of low costs, when the master brake system fails, the redundant brake system can control each brake wheel cylinder, to implement function backup of the master brake system, thereby meeting requirements for braking functions such as ABS/AEB/ESC/TCS of the vehicle, and further improving safety of the brake system.

With reference to the seventh aspect, in some implementations of the seventh aspect, the first fluid storage container (6) is connected to the second fluid storage container (71), and the second pressure booster (36) is connected to the first fluid storage container (6), or the second pressure booster (36) is connected to the second fluid storage container (71).

In the solution of this application, the redundant brake system in the brake system may obtain the brake fluid from a fluid storage reservoir in the master brake system, to reduce costs. The redundant brake system may further obtain the brake fluid from an independent fluid storage reservoir of the redundant brake system, so that the redundant brake system is more completely decoupled from the master brake system, thereby improving independence of the redundant brake system.

With reference to the seventh aspect, in some implementations of the seventh aspect, the brake master cylinder (7) and the at least one first control valve (13, 14, 15, 16) are respectively connected through the at least one second control valve (52, 53), and the at least one first control valve (13, 14, 15, 16) and the at least one second control valve (52, 53) further include the at least one fifth control valve (11, 12), where the brake master cylinder (7) and the at least one second control valve (52, 53) are directly connected, or the brake master cylinder (7) and the at least one second control valve (52, 53) are connected through at least one second interface (38k, 38l); and the at least one second control valve (52, 53) and the at least one fifth control valve (11, 12) are directly connected, or the at least one second control valve (52, 53) and the at least one fifth control valve (11, 12) are respectively connected through at least one fifth interface (38m, 38n).

With reference to the seventh aspect, in some implementations of the sixth aspect, the brake system further includes at least one sixth interface (38s, 38t, 38u, 38v), at least one first control valve (13, 14, 15, 16), and at least one third control valve (61, 62, 63, 64), where the at least one first control valve (13, 14, 15, 16) and the at least one third control valve (61, 62, 63, 64) are directly connected through a pipeline; or the at least one first control valve (13, 14, 15, 16) and the at least one third control valve (61, 62, 63, 64) are respectively connected through at least one sixth interface (38s, 38t, 38u, 38v).

With reference to the seventh aspect, in some implementations of the seventh aspect, that the second pressure booster (36) is connected to the first fluid storage container (6) includes: the second pressure booster (36) and the first fluid storage container (6) are directly connected, or the second pressure booster (36) and the first fluid storage container (6) are connected through a third interface (38a).

With reference to the seventh aspect, in some implementations of the seventh aspect, the brake system further includes at least one fourth control valve (65, 66) and at least one third one-way valve (67, 68, 69, 70), where the at least one fourth control valve (65, 66) is connected to the first fluid storage container (6), or the at least one fourth control valve (65, 66) is connected to the second fluid storage container (71); the at least one third one-way valve (67, 68, 69, 70) is connected to at least one fourth one-way valve, and the at least one third one-way valve (67, 68, 69, 70) is connected to the at least one third control valve (61, 62, 63, 64).

In the solution of this application, a wheel cylinder outlet valve is added to a redundant brake system, so that when a master brake system fails and a brake wheel cylinder needs to be depressurized, for example, when an ABS braking requirement is met, the controller can effectively reduce braking forces of the four brake wheel cylinders, thereby further improving safety of the brake system.

With reference to the seventh aspect, in some implementations of the seventh aspect, the brake system includes a first pedal feel simulator switch valve (43) and a first pedal feel simulation system (112); the first pedal feel simulator switch valve (43) is connected to any one of the at least one second control valve (52, 53); the first pressure sensor (30) is connected to the second control valve connected to the first pedal feel simulator switch valve (43), and the second hydraulic apparatus (120) includes the first pressure sensor (30); and a first pedal feel simulator (10) in the first pedal feel simulation system (112) is connected to the first pedal feel simulator switch valve (43).

In the solution of this application, the redundant brake system in the brake-by-wire system may further feed back pedal feel information to the driver. When the master brake system fails, pedal feel of the driver can still be ensured, thereby bringing more stable and comfortable driving experience to the driver.

With reference to the seventh aspect, in some implementations of the seventh aspect, the brake system further includes at least one first one-way valve (56, 57), where the at least one first one-way valve (56, 57) is connected in parallel to the at least one second control valve (52, 53), the first pressure sensor (30) is connected to any one of the second control valves (52, 53), and the brake system further includes the first pressure sensor (30).

In the solution of this application, the one-way valve connected in parallel to the isolation valve can prevent the brake fluid from flowing back to the brake master cylinder while the brake pedal can generate displacement when the isolation valve is in a switched-off state.

With reference to the seventh aspect, in some implementations of the seventh aspect, the brake system further includes at least one sixth control valve (17, 18, 19, 20), at least one second one-way valve (47, 48, 49, 50), and a mechanical brake input apparatus (111); the mechanical brake input apparatus (111) is connected to the master cylinder (7); the at least one sixth control valve (17, 18, 19,

20) is further included between the at least one first control valve (13, 14, 15, 16) and the at least one third control valve (61, 62, 63, 64); and the at least one second one-way valve (47, 48, 49, 50) and the at least one first control valve (13, 14, 15, 16) are respectively connected in parallel.

According to an eighth aspect, a brake system is provided, where the brake system includes a brake master cylinder (7), a first pressure booster (1), a second pressure booster (36), at least one first interface (38w, 38x, 38y, 38z), at least one first control valve (13, 14, 15, 16), at least one second control valve (52, 53), and at least one third control valve (61, 62, 63, 64); at least one first interface (38w, 38x, 38y, 38z) is configured to connect to at least one brake wheel cylinder (22, 23, 24, 25); the at least one first control valve (13, 14, 15, 16) and the at least one first interface (38w, 38x, 38y, 38z) are connected through the at least one third control valve (61, 62, 63, 64); the brake master cylinder (7) and the at least one first control valve (13, 14, 15, 16) are respectively connected through at least one second control valve (52, 53), and at least one fifth control valve (11, 12) is further included between the brake master cylinder (7) and the at least one second control valve (52, 53); the second pressure booster (36) and the at least one first control valve (13, 14, 15, 16) are directly connected; and the first pressure booster (1) and the at least one first control valve (13, 14, 15, 16) are respectively connected through the at least one second control valve (52, 53).

In the solution of this application, two isolation valves are disposed in the redundant brake system. In a case of low costs, when the master brake system fails, the redundant brake system can control each brake wheel cylinder, to implement function backup of the master brake system, thereby meeting requirements for braking functions such as ABS/AEB/ESC/TCS of the vehicle, and further improving safety of the brake system.

With reference to the eighth aspect, in some implementations of the eighth aspect, the first fluid storage container (6) is connected to the second fluid storage container (71), and the second pressure booster (36) is connected to the first fluid storage container (6), or the second pressure booster (36) is connected to the second fluid storage container (71).

In the solution of this application, the redundant brake system in the brake system may obtain the brake fluid from a fluid storage reservoir in the master brake system, to reduce costs. The redundant brake system may further obtain the brake fluid from an independent fluid storage reservoir of the redundant brake system, so that the redundant brake system is more completely decoupled from the master brake system, thereby improving independence of the redundant brake system.

With reference to the eighth aspect, in some implementations of the eighth aspect, that the brake master cylinder (7) and the at least one first control valve (13, 14, 15, 16) are respectively connected through at least one second control valve (52, 53), and at least one fifth control valve (11, 12) is further included between the brake master cylinder (7) and the at least one second control valve (52, 53) includes: the at least one fifth control valve (11, 12) and the at least one second control valve (52, 53) are directly connected, or the at least one fifth control valve (11, 12) and the at least one second control valve (52, 53) are respectively connected through at least one second interface (38k, 38l); and the at least one first control valve (13, 14, 15, 16) and the at least one second control valve (52, 53) are directly connected, or the at least one first control valve (13, 14, 15, 16) and the at least one second control valve (52, 53) are respectively connected through at least one fifth interface (38m, 38n).

With reference to the eighth aspect, in some implementations of the eighth aspect, the brake system further includes the at least one sixth interface (38s, 38t, 38u, 38v), the at least one first control valve (13, 14, 15, 16), and the at least one third control valve (61, 62, 63, 64), where the at least one first control valve (13, 14, 15, 16) and the at least one third control valve (61, 62, 63, 64) are directly connected through a pipeline; or the at least one first control valve (13, 14, 15, 16) and the at least one third control valve (61, 62, 63, 64) are respectively connected through at least one sixth interface (38s, 38t, 38u, 38v).

With reference to the eighth aspect, in some implementations of the eighth aspect, that the second pressure booster (36) is connected to the first fluid storage container (6) includes: the second pressure booster (36) and the first fluid storage container (6) are directly connected, or the second pressure booster (36) and the first fluid storage container (6) are connected through a third interface (38a).

With reference to the eighth aspect, in some implementations of the eighth aspect, the brake system further includes at least one fourth control valve (65, 66) and at least one third one-way valve (67, 68, 69, 70), where the at least one fourth control valve (65, 66) is connected to the first fluid storage container (6), or the at least one fourth control valve (65, 66) is connected to the second fluid storage container (71); and the at least one third one-way valve (67, 68, 69, 70) is connected to the at least one fourth control valve (65, 66), and the at least one third one-way valve (67, 68, 69, 70) is connected to the at least one third control valve (61, 62, 63, 64).

In the solution of this application, a wheel cylinder outlet valve is added to a redundant brake system, so that when a master brake system fails and a brake wheel cylinder needs to be depressurized, for example, when an ABS braking requirement is met, the controller can effectively reduce braking forces of the four brake wheel cylinders, thereby further improving safety of the brake system.

With reference to the eighth aspect, in some implementations of the eighth aspect, the brake system includes a first pedal feel simulator switch valve (43) and a first pedal feel simulation system (112); the first pedal feel simulator switch valve (43) is connected to any one of the at least one second control valve (52, 53); the first pressure sensor (30) is connected to the second control valve connected to the first pedal feel simulator switch valve (43), and the second hydraulic apparatus (120) includes the first pressure sensor (30); and a first pedal feel simulator (10) in the first pedal feel simulation system (112) is connected to the first pedal feel simulator switch valve (43).

In the solution of this application, the redundant brake system in the brake-by-wire system may further feed back pedal feel information to the driver. When the master brake system fails, pedal feel of the driver can still be ensured, thereby bringing more stable and comfortable driving experience to the driver.

With reference to the eighth aspect, in some implementations of the eighth aspect, the brake system further includes at least one first one-way valve (56, 57), where the at least one first one-way valve (56, 57) is connected in parallel to the at least one second control valve (52, 53), the first pressure sensor (30) is connected to any one of the second control valves (52, 53), and the brake system further includes the first pressure sensor (30).

In the solution of this application, the one-way valve connected in parallel to the isolation valve can prevent the brake fluid from flowing back to the brake master cylinder while the brake pedal can generate displacement when the isolation valve is in a switched-off state.

With reference to the eighth aspect, in some implementations of the eighth aspect, the brake system further includes at least one sixth control valve (17, 18, 19, 20), at least one second one-way valve (47, 48, 49, 50), and a mechanical brake input apparatus (111); the mechanical brake input apparatus (111) is connected to the master cylinder (7); the at least one sixth control valve (17, 18, 19, 20) is further included between the at least one first control valve (13, 14, 15, 16) and the at least one third control valve (61, 62, 63, 64); and the at least one second one-way valve (47, 48, 49, 50) and the at least one first control valve (13, 14, 15, 16) are respectively connected in parallel.

According to a ninth aspect, a brake system is provided, where the brake system includes a brake master cylinder (7), a first pressure booster (1), a second pressure booster (36), at least one first interface (38*q*, 38*r*), at least one first control valve (13, 14, 15, 16), and at least one second control valve (52, 53); the brake master cylinder (7) or the first pressure booster (1) is connected to at least one brake master cylinder (22, 23, 24, 25) through the at least one first control valve (13, 14, 15, 16); and a second pressure booster (36) is connected to at least one first interface (38*q*, 38*r*) through at least one fourth one-way valve (58, 59), and the second pressure booster (36) and a fourth pressure sensor (60) are connected in parallel.

In the solution of this application, a pressure sensor of the pressure booster and the one-way valve may cooperate with the redundant brake system to control a pressure of the brake fluid more accurately, thereby ensuring safety of the brake system.

With reference to the ninth aspect, in some implementations of the ninth aspect, that the brake master cylinder (7) or the first pressure booster (1) is connected to at least one brake master cylinder (22, 23, 24, 25) through the at least one first control valve (13, 14, 15, 16) includes: the brake master cylinder (7) or the first pressure booster (1) is directly connected to the second brake wheel cylinder (23) and the fourth brake wheel cylinder (25) through the second inlet valve (14) and the fourth inlet valve (16); and the brake master cylinder (7) or the first pressure booster (1) is connected to the first brake wheel cylinder (22) and the third brake wheel cylinder (24) respectively through the first inlet valve (13) and the third inlet valve (15), and the at least one second control valve (52, 53) is further included between the first inlet valve (13) and the first brake wheel cylinder (22) and between the third inlet valve (15) and the third brake wheel cylinder (24), where the at least one brake wheel cylinder (22, 23, 24, 25) includes the first brake wheel cylinder (22), the second brake wheel cylinder (23), the third brake wheel cylinder (24), and the fourth brake wheel cylinder (25), and the at least one first control valve (13, 14, 15, 16) includes the first inlet valve (13), the second inlet valve (14), the third inlet valve (15), and the fourth inlet valve (16).

In the solution of this application, when a master brake system fails, a redundant brake system independently controls a front wheel brake wheel cylinder, and an EPB system cooperates to implement pressure boosting on a rear wheel brake wheel cylinder, to implement independent pressure boosting for four wheels.

With reference to the ninth aspect, in some implementations of the ninth aspect, the brake system further includes a first fluid storage container (6) and a second fluid storage container (71), where the at least one fourth control valve (35) and the second pressure booster (36) are separately connected to the second fluid storage container (71), and the brake master cylinder (7) and the first pressure booster (1) are separately connected to the first fluid storage container (6); or the brake system further includes the first fluid storage container (6), where the at least one fourth control valve (35), the second pressure booster (36), the brake master cylinder (7) and the first pressure booster (1) are separately connected to the first fluid storage container (6).

In the solution of this application, the redundant brake system in the brake system may obtain the brake fluid from a fluid storage reservoir in the master brake system, to reduce costs. The redundant brake system may further obtain the brake fluid from an independent fluid storage reservoir of the redundant brake system, so that the redundant brake system is more completely decoupled from the master brake system, thereby improving independence of the redundant brake system.

With reference to the ninth aspect, in some implementations of the ninth aspect, that the at least one second control valve (52, 53) is further included between the first inlet valve (13) and the first brake wheel cylinder (22) and between the third inlet valve (15) and the third brake wheel cylinder (24) includes: the first inlet valve (13) and the third inlet valve (15) are respectively directly connected to the at least one second control valve (52, 53); or the first inlet valve (13) and the third inlet valve (15) are connected to the at least one second control valve (52, 53) through at least one second interface (38*o*, 38*p*); the at least one second control valve (52, 53) is directly connected to the first brake wheel cylinder (22) and the third brake wheel cylinder (24); or the at least one second control valve (52, 53) is connected to the first brake wheel cylinder (22) and the third brake wheel cylinder (24) through at least one first interface (38*q*, 38*r*).

With reference to the ninth aspect, in some implementations of the ninth aspect, the brake system further includes at least one fourth control valve (54, 55), where the first fluid storage container (6) or the second fluid storage container (71) is connected to the first brake wheel cylinder (22) and the third brake wheel cylinder (24) through the at least one fourth control valve (54, 55).

In the solution of this application, a wheel cylinder outlet valve is added to a redundant brake system, so that when a master brake system fails and a brake wheel cylinder needs to be depressurized, for example, when an ABS braking requirement is met, the controller can effectively reduce braking forces of the four brake wheel cylinders, thereby further improving safety of the brake system.

With reference to the ninth aspect, in some implementations of the ninth aspect, the brake system further includes at least one fifth control valve (11, 12), at least one sixth control valve (17, 18, 19, 20), at least one second one-way valve (47, 48, 49, 50), and a mechanical brake input apparatus (111), where the mechanical brake input apparatus (111) is connected to the master cylinder (7); the at least one fifth control valve (11, 12) is further included between the master cylinder (7) and the at least one first control valve (13, 14, 15, 16); and the at least one sixth control valve (17, 18, 19, 20) is further included between the at least one first control valve (13, 14, 15, 16) and the at least one second control valve (26, 27, 28, 29), and the at least one second one-way valve (47, 48, 49, 50) and the at least one first control valve (13, 14, 15, 16) are respectively connected in parallel.

It should be understood that the control method according to any one of the third aspect or the fourth aspect or the possible implementations of the third aspect or the fourth aspect may be further used in the brake system according to any one of the fifth aspect to the ninth aspect or the possible implementations of the fifth aspect to the ninth aspect. To avoid repetition, details are not described herein again.

According to a tenth aspect, a vehicle is provided, including the brake system according to any one of the first aspect or the possible implementations of the third aspect, where a hydraulic adjustment unit in the brake system adjusts a pressure of the brake fluid in a brake pipeline in the brake system, to control a braking force applied to a brake wheel cylinder in the brake system.

According to an eleventh aspect, a control apparatus is provided. The control apparatus includes a processing unit and a transceiver unit. The transceiver unit is configured to send a control instruction, and the processing unit is configured to generate the control instruction, so that the control apparatus performs any possible method according to the first aspect or the third aspect.

Optionally, the control apparatus may be an independent controller in a vehicle, or may be a chip having a control function in the vehicle. The processing unit may be a processor, and the transceiver unit may be a communication interface.

Optionally, the control apparatus may further include a storage unit. The storage unit may be a memory in the controller. The memory may be a storage unit (for example, a register or a cache) in a chip, or may be a storage unit (for example, a read-only memory or a random access memory) located outside the chip in a vehicle.

It should be noted that, in the foregoing controller, the memory is coupled to the processor. That the memory is coupled to the processor may be understood as that the memory is located inside the processor, or that the memory is located outside the processor, to be independent of the processor.

According to a twelfth aspect, a computer program product is provided. The computer program product includes computer program code, and when the computer program code is run on a computer, the computer is enabled to perform the methods according to the foregoing aspects.

It should be noted that all or some of the computer program code may be stored in a first storage medium. The first storage medium may be encapsulated together with a processor, or may be encapsulated separately from a processor. This is not specifically limited in this embodiment of this application.

According to a thirteenth aspect, a computer-readable medium is provided. The computer-readable medium stores program code, and when the computer program code is run on a computer, the computer is enabled to perform the methods according to the foregoing aspects.

DESCRIPTION OF EMBODIMENTS

Figure 1A:
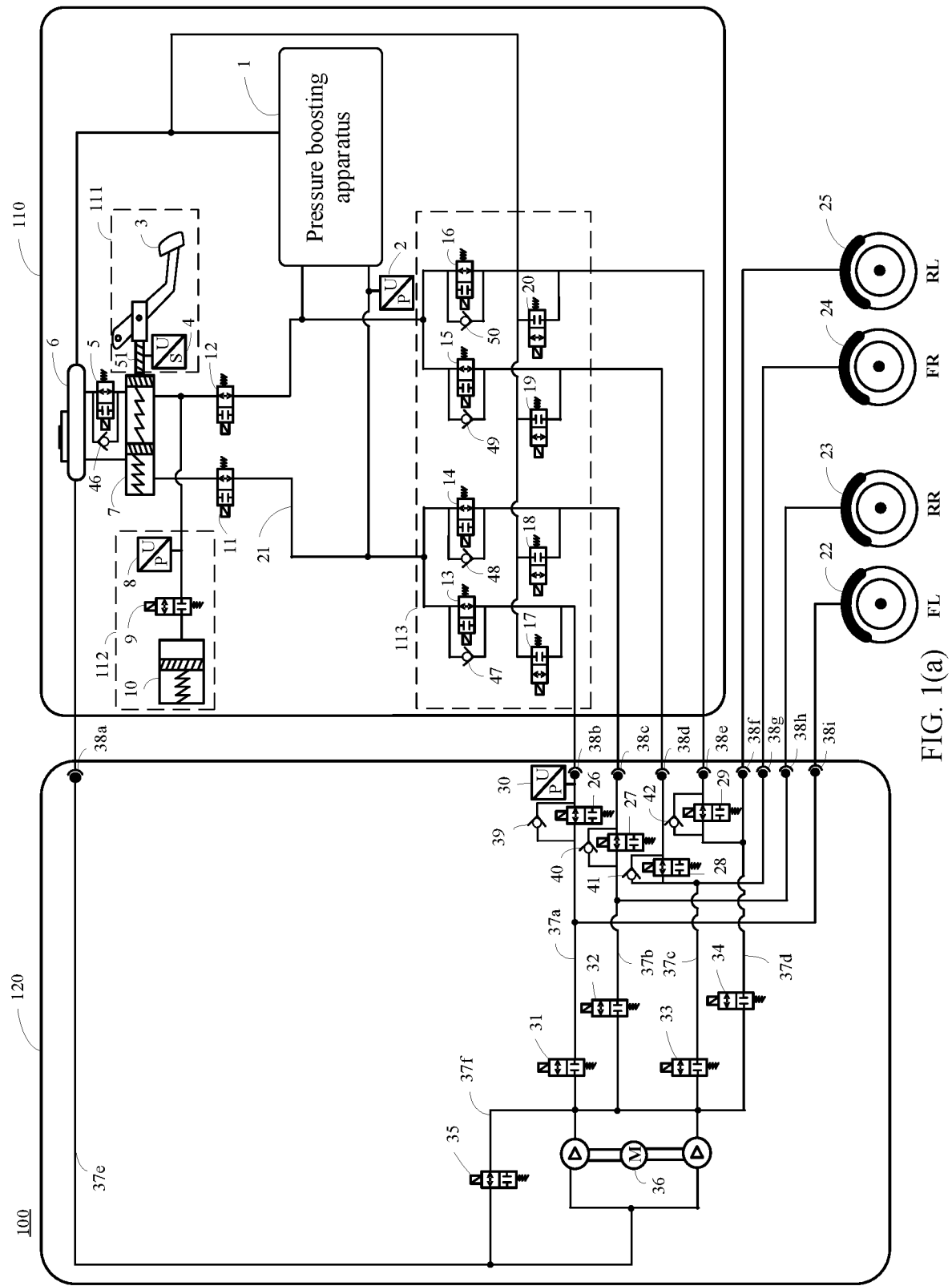
FIG. 1(a) and FIG. 1(b) are a schematic diagram of a brake-by-wire system according to an embodiment of this application.

The following describes technical solutions of this application with reference to accompanying drawings. Apparently, the described embodiments are merely some rather than all of the embodiments of this application. All other embodiments obtained by a person of ordinary skill in the art based on embodiments of this application without creative efforts shall fall within the protection scope of this application.

The brake-by-wire system in this application is applicable to an autonomous vehicle or a new energy vehicle. The autonomous vehicle includes a passenger vehicle and a commercial vehicle that have an autonomous driving function, and the new energy vehicle includes a passenger vehicle and a commercial vehicle that use new energy.

For ease of understanding, the following first describes related terms and concepts that may be used in embodiments of this application.

Antilock brake system (ABS): When a vehicle is braking, a braking force is automatically controlled, so that wheels are not locked and are in a rolling and sliding state to ensure that adhesion between the wheels and the ground is at the maximum.

Automatic emergency braking (AEB) system: When a vehicle encounters an emergency or a distance between the vehicle and a vehicle or a pedestrian in front of the vehicle is less than a safe distance, the system automatically brakes the vehicle to avoid or reduce collision accidents such as rear-end collisions.

Electronic stability control system (ESC): Sensors collect vehicle information to determine vehicle instability. When a vehicle tends to be unstable, the ESC system applies a braking force for a single wheel or some wheels to obtain a yaw moment to stabilize the wheel/wheels, so as to stabilize the vehicle.

Traction control system (TCS): A control system that automatically controls an engine or a driving motor to suppress a speed of a driving wheel when the driving wheel slips.

The brake system includes an integrated brake system (IBS) and a redundant brake module (RBU), where the redundant brake module may also be referred to as a redundant brake system.

Integrated brake system: An electro-hydraulic brake-by-wire system that includes an electric linear pump, a solenoid valve, a valve body, and the like and that can implement braking functions such as ABS, AEB, ESC, and TCS.

Redundant brake module: An independent brake module that is used as a backup for a master brake system. When the master brake system of a vehicle fails, the RBU module completes braking of the vehicle to improve safety of the vehicle.

Currently, there is a brake system that includes a master brake system and a redundant brake system that perform braking independently. The system uses a plunger pump and two isolation valves in the redundant brake system to implement effective braking on a front left wheel and a front right wheel of a vehicle after the master brake system fails. Although the brake system has a simple and reliable structure and high stability, the redundant brake system in the brake system can only implement braking on the two front wheels, and cannot meet requirements for integrated braking functions such as ABS, AEB, ESC, and TCS.

With the further development of autonomous driving and new energy technologies, a current brake system faces the following problems: The brake system cannot well consider both brake-by-wire and redundancy functions, and cannot meet control and safety requirements of a vehicle. In addition, the brake system is required to support functions such as ABS, AEB, TCS, and ESC. Therefore, an embodiment of this application provides a brake-by-wire system, which has a plurality of redundancy functions, and can meet both brake-by-wire and redundancy functions, to support a control requirement of a new energy vehicle or an autonomous vehicle. The following provides detailed descriptions with reference to FIG. 1(a) and FIG. 1(b) to FIG. 30.

It should be noted that a brake pipeline used in the following may be only an "outlet pipeline" or an "inlet pipeline", or the brake pipeline may be an "outlet pipeline" and an "inlet pipeline". In a process of depressurizing a brake wheel cylinder of a wheel of a vehicle, a brake pipeline in a brake system is configured to transfer brake fluid in the brake wheel cylinder to a fluid storage apparatus. In this case, the brake pipeline may be referred to as an "outlet pipeline". In a process of pressurizing the brake wheel cylinder of the wheel of the vehicle, the brake pipeline is configured to provide brake fluid to the wheel of the vehicle, to provide a braking force for the wheel of the vehicle. In this case, the brake pipeline may be referred to as an "inlet pipeline".

In addition, an "inlet valve", an "outlet valve", and a "pressure equalizing valve" used in the following are distinguished based only on functions of the control valves in the brake system. A control valve configured to control connection or disconnection of the inlet pipeline may be referred to as an "inlet valve" or a "pressure boosting valve". A controller configured to control connection or disconnection of a fluid return pipeline may be referred to as an "outlet valve" or a "depressurization valve". A control valve configured to isolate brake subsystems at two levels may be referred to as an "isolation valve". The control valve may be a valve commonly used in an existing brake system, for example, a solenoid valve. This is not specifically limited in this embodiment of this application.

In addition, after the control valve is connected to the brake pipeline, connection ports between the control valve and the brake pipeline may be represented by a first port and a second port. A flow direction of brake fluid between the first port and the second port is not limited in this application. For example, in a process of pressurizing a brake wheel cylinder of a wheel of a vehicle, the brake fluid may flow from the first port of the control valve to the second port of the control valve, or in a process of depressurizing the brake wheel cylinder of the wheel of the vehicle, the brake fluid may flow from the second port of the control valve to the first port of the control valve. In illustrations of the embodiments of this application, the "first port" and the "second port" of the control valve are defined as follows: In the process of pressurizing the brake wheel cylinder of the wheel of the vehicle, a first port of the control valve that the brake fluid encounters is the first port; and in the process of depressurizing the brake wheel cylinder of the wheel of the vehicle, a first port of the control valve that the brake fluid encounters is the second port. The foregoing definitions are merely an example. This is not limited in this embodiment of this application.

In addition, a "master brake pipeline 21", a "redundant brake pipeline 37a", a "redundant brake pipeline 37b", and another brake pipeline used in the following may be understood as one or more brake pipeline segments that implement a function. For example, the master brake pipeline 21 includes a plurality of brake pipeline segments used to connect the brake master cylinder 7 and the brake circuit 113.

In addition, when the following describes an architecture of a brake system, an architecture of a vehicle, or the like with reference to the accompanying drawings, the accompanying drawings schematically show two operating states (closed or open) that may be implemented by each control valve. A current operating state of the control valve is not limited to that shown in the figures.

Figure 1B:
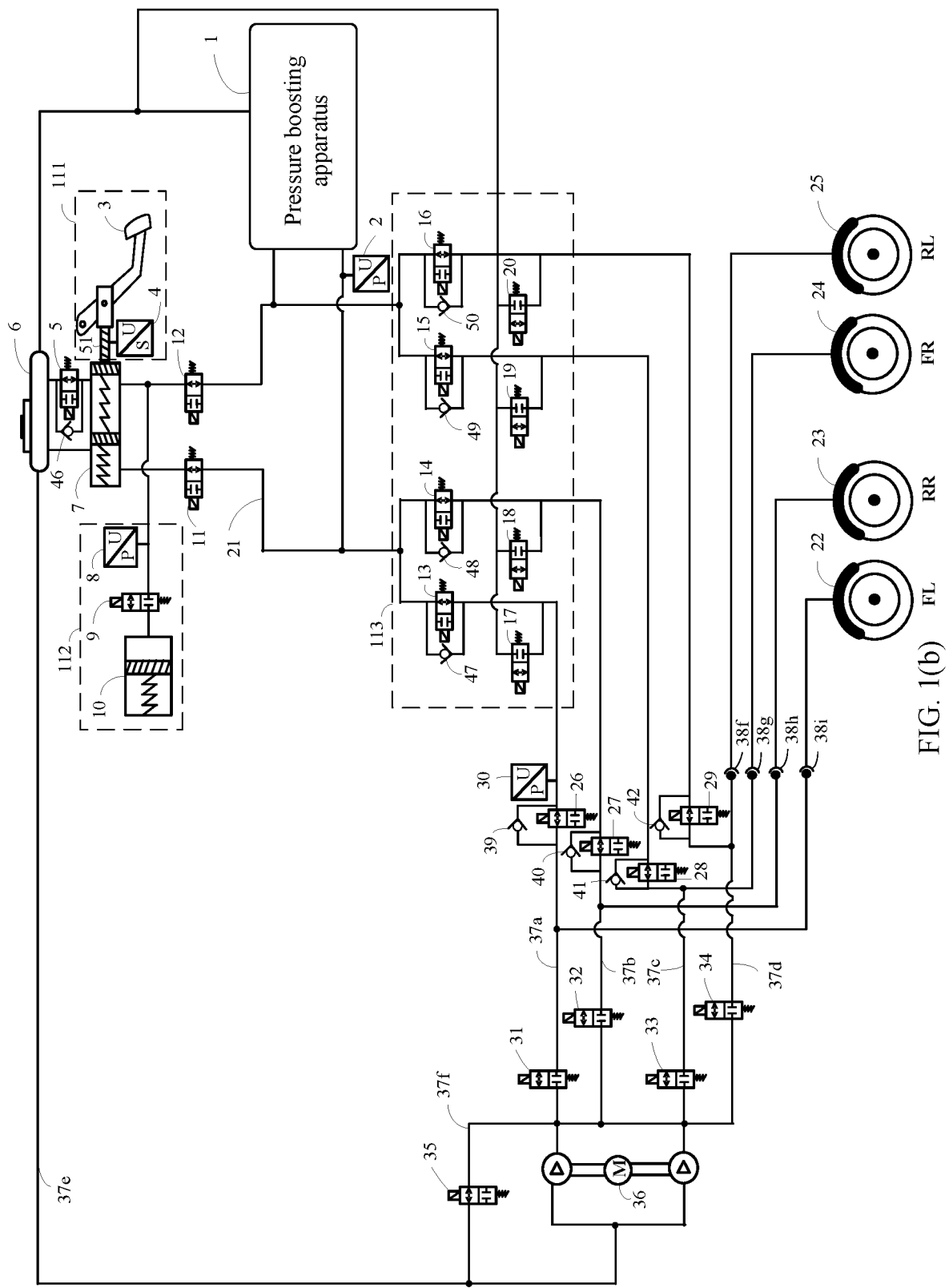

The following describes the solutions of this application with reference to the accompanying drawings. FIG. 1(a) and FIG. 1(b) are a schematic diagram of a brake-by-wire system according to an embodiment of this application. As shown in FIG. 1(a) or FIG. 1(b), the brake-by-wire system 100 may include a master brake system 110, a redundant brake system 120, and a controller. The brake-by-wire system 100 may also be a first brake wheel cylinder 22, a second brake wheel cylinder 23, a third brake wheel cylinder 24, and a fourth brake wheel cylinder 25.

It should be understood that the redundant brake system 120 may be used as an example of the first brake subsystem, and a name of the first brake subsystem 120 is not limited in this application.

It should be understood that the brake system in this application further includes at least one controller, for example, a controller of the master brake system and a controller of the redundant brake system, which are not shown in the figure. The brake system may further control different components according to different braking requirements through a controller. For example, in a redundant operating mode, the controller may control components of the redundant brake system 120, to implement a corresponding braking function. Various individual components in the brake system may also have their own sub-controllers, and these controllers can communicate with each other and operate together. The controller receives measurement or detection signals from various sensors, such as an environment condition, a driver input, and a brake system status, and controls braking features of the brake system through calculation and judgment.

It should be understood that the brake system in this application may not include a brake wheel cylinder, that is, may include only the master brake system 110 and the redundant brake system 120; or may include a brake wheel cylinder, that is, the master brake system 110, the redundant brake system 120, and the brake wheel cylinder all belong to the brake system.

It should be understood that the at least one brake wheel cylinder (22, 23, 24, 25) in this application may be the first brake wheel cylinder 22, the second brake wheel cylinder 23, the third brake wheel cylinder 24, and the fourth brake wheel cylinder 25 described above.

The master brake system 110 may include a pressure boosting apparatus 1, a mechanical brake input apparatus 111, a first pedal feel simulation system 112, a brake circuit 113, a second pressure sensor 2, a master cylinder inlet valve 5, a one-way valve 46, a first fluid storage container 6, a brake master cylinder 7, a first wheel cylinder isolation valve 11, a second wheel cylinder isolation valve 12, and a master brake pipeline 21.

It should be understood that the pressure boosting apparatus 1 may be an example of the first pressure booster 1, and may be specifically a component that performs a pressure boosting function, such as a pressure boosting pump or a plunger pump assembly. This is not limited in this embodiment of this application.

In a possible implementation, the mechanical brake input apparatus 111 includes a brake pedal 3, a pedal displacement sensor 4, and a push rod 51. It should be understood that, when a driver steps on the brake pedal 3, the brake pedal is connected to the push rod 51, the push rod 51 is pushed forward, so that pressures of the first hydraulic chamber and the second hydraulic chamber of the brake master cylinder 7 increase, and the brake fluid (hydraulic fluid) in the first fluid storage container 6 enters the first hydraulic chamber and the second hydraulic chamber of the brake master cylinder 7 through the master brake pipeline, the one-way valve 46, and the master cylinder inlet valve 5. In this way, the pressures of the first hydraulic chamber and the second hydraulic chamber of the brake master cylinder 7 increase, and the brake fluid is pushed into the master brake pipeline 21 from the first hydraulic chamber and the second hydraulic chamber of the brake master cylinder 7, and enters the brake circuit 113 through the first wheel cylinder isolation valve 11 and the second wheel cylinder isolation valve 12. The pedal displacement sensor 4 is configured to measure displacement of the push rod 51 relative to the brake master cylinder 7. It should be understood that the master brake pipeline 21 includes pipelines in the master brake system. For brief description, each pipeline in the master brake pipeline 21 is not described in this embodiment of this application.

It should be understood that, in this embodiment of this application, the one-way valve allows the brake fluid to flow only from the first port of the one-way valve to the second port, but not flow from the second port to the first port. For example, an upper end of the one-way valve 46 is the first port, a lower end thereof is the second port, and the brake fluid can flow only from the first port of the one-way valve to the second port. However, it should be understood that this is merely for ease of understanding, and names of the first port and the second port are not limited. In other words, it may also be described as that the brake fluid can flow only from the second port to the first port.

It should be understood that the at least one fifth control valve (11, 12) is configured to isolate the pressure boosting apparatus 1 from the brake master cylinder 7, and in the pressure boosting mode, the brake fluid comes from the pressure boosting apparatus 1. Generally, the fifth control valve is in a switched-on state, and in the pressure boosting mode, the fifth control valve is in a switched-off state. In this application, the at least one fifth control valve may be specifically the first wheel cylinder isolation valve 11 and the second wheel cylinder isolation valve 12. A quantity of the fifth control valves is not limited in this embodiment of this application, and the quantity of the fifth control valves shown in this embodiment of this application is merely an example. The closed state is that the brake fluid cannot flow from one port of the control valve to another port; and the open state is specifically that the brake fluid may flow from one port of the control valve to another port.

In a possible implementation, the first pedal feel simulation system 112 includes a third pressure sensor 8, a third pedal feel simulator switch valve 9, and a first pedal feel simulator 10. It should be understood that the second hydraulic chamber of the brake master cylinder 7 is connected to the third pressure sensor 8, the third pedal feel simulator switch valve 9, and the first pedal feel simulator 10 through the master brake pipeline 21. The first pedal feel simulation system 112 is configured to feed back pedal feel information to the driver. It should be understood that, when the pressure boosting apparatus is in a brake-by-wire operating mode, the third pedal feel simulator switch valve 9 in the first pedal feel simulation system 112 is in a switched-on state.

It should be understood that the brake circuit 113 has different forms of arrangement, for example, may be in an X-shaped arrangement, an H-shaped arrangement, or an I-shaped arrangement.

The X-shaped arrangement means that one brake circuit connects the brake wheel cylinder of the front left (FL) wheel and the brake wheel cylinder of the rear right (RR) wheel, and the other brake circuit connects the brake wheel cylinder of the front right (FR) wheel and the brake wheel cylinder of the rear left (RL) wheel.

The H-shaped arrangement means that one brake circuit connects the brake wheel cylinder of the front left wheel and the brake wheel cylinder of the rear left wheel, and the other brake circuit connects the brake wheel cylinder of the front right wheel and the brake wheel cylinder of the rear right wheel.

The I-shaped arrangement means that one brake circuit connects the brake wheel cylinder of the front left wheel and the brake wheel cylinder of the front right wheel, and the other brake circuit connects the brake wheel cylinder of the rear left wheel and the brake wheel cylinder of the rear right wheel.

It should be understood that a type of the brake circuit is not limited in this embodiment of this application, and an X-shaped brake circuit is used as an example in this embodiment of this application.

The brake circuit 113 includes a fifth wheel cylinder inlet valve 13, a sixth wheel cylinder inlet valve 14, a seventh wheel cylinder inlet valve 15, an eighth wheel cylinder inlet valve 16, a first wheel cylinder outlet valve 17, a second wheel cylinder outlet valve 18, a third wheel cylinder outlet valve 19, a fourth wheel cylinder outlet valve 20, a first master one-way valve 47, a second master one-way valve 48, a third master one-way valve 49, and a fourth master one-way valve 50.

The fifth wheel cylinder inlet valve 13 controls the brake fluid to enter the brake wheel cylinder of the front left FL wheel, the sixth wheel cylinder inlet valve 14 controls the brake fluid to enter the brake wheel cylinder of the rear right wheel RR, the seventh wheel cylinder inlet valve 15 controls the brake fluid to enter the brake wheel cylinder of the front right wheel FR, and the eighth wheel cylinder inlet valve 16 controls the brake fluid to enter the brake wheel cylinder of the rear left RL wheel.

It should be understood that the at least one first control valve (13, 14, 15, 16) is configured to enable the brake fluid to flow into the brake wheel cylinder. In this application, the at least one first control valve may be specifically the fifth wheel cylinder inlet valve 13, the sixth wheel cylinder inlet valve 14, the seventh wheel cylinder inlet valve 15, and the eighth wheel cylinder inlet valve 16. A quantity of the first control valves is not limited in this embodiment of this application, and the quantity of the first control valves shown in this embodiment of this application is merely an example.

It should be understood that the at least one second one-way valve (47, 48, 49, 50) is configured to adjust pressures at two ends of the first control valve, to prevent the brake fluid from flowing into the brake wheel cylinder when the pressure at the second port of the at least one first control valve is higher than that at the first port. The at least one second one-way valve may be specifically the first master one-way valve 47, the second master one-way valve 48, the third master one-way valve 49, and the fourth master one-way valve 50. A quantity of the second one-way valves is not limited in this embodiment of this application, and the quantity of the second one-way valves shown in this embodiment of this application is merely an example.

The first wheel cylinder outlet valve 17 controls the brake fluid to flow out of the brake wheel cylinder of the front left FL wheel and return to the first fluid storage container 6 or the pressure boosting apparatus 1; the second wheel cylinder outlet valve 18 controls the brake fluid to flow out of the brake wheel cylinder of the rear right wheel RR and return to the first fluid storage container 6 or the pressure boosting apparatus 1; the third wheel cylinder outlet valve 19 controls the brake fluid to flow out of the brake wheel cylinder of the front right wheel FR and return to the first fluid storage container 6 or the pressure boosting apparatus 1; and the fourth wheel cylinder outlet valve 20 controls the brake fluid to flow out of the brake wheel cylinder of the rear left RL wheel and return to the first fluid storage container 6 or the pressure boosting apparatus 1.

Similarly, the at least one sixth control valve (17, 18, 19, 20) is configured to enable the brake fluid to flow back from the brake wheel cylinder to the fluid storage container, for example, flow back to the first fluid storage container 6. In this application, the at least one sixth control valve may be specifically the first wheel cylinder outlet valve 17, the second wheel cylinder outlet valve 18, the third wheel cylinder outlet valve 19, and the fourth wheel cylinder outlet valve 20. A quantity of the sixth control valves is not limited in this embodiment of this application, and the quantity of the sixth control valves shown in this embodiment of this application is merely an example.

The redundant brake system 120 may include a plunger pump assembly 36, a first wheel cylinder inlet valve 31, a second wheel cylinder inlet valve 32, a third wheel cylinder inlet valve 33, a fourth wheel cylinder inlet valve 34, a wheel cylinder outlet valve 35, a first redundant isolation valve 26, a second redundant isolation valve 27, a third redundant isolation valve 28, a fourth redundant isolation valve 29, a first pressure sensor 30, and a redundant brake pipeline 37.

It should be understood that the plunger pump assembly 36 may be a specific example of the second pressure booster 36, or the second pressure booster 36 may be a component such as a pressure boosting pump that performs a pressure boosting function. This is not limited in this embodiment of this application.

It should be understood that the at least one second control valve (26, 27, 28, 29) is configured to isolate the two brake subsystems, and the at least one second control valve may belong to the redundant brake system 120 or the master brake system 110. This is not limited in this application. The at least one second control valve (26, 27, 28, 29) is generally in a switched-on state, and in a redundant braking mode, the at least one second control valve (26, 27, 28, 29) is in a switched-off state. In this application, the at least one second control valve may be specifically the first redundant isolation valve 26, the second redundant isolation valve 27, the third redundant isolation valve 28, and the fourth redundant isolation valve 29. A quantity of the second control valves is not limited in this embodiment of this application, and the quantity of the second control valves shown in this embodiment of this application is merely an example.

Similarly, the at least one third control valve (31, 32, 33, 34) is configured to enable the brake fluid to flow into the brake wheel cylinder. The at least one third control valve (31, 32, 33, 34) is generally in a switched-off state, and in a redundant braking mode, the at least one third control valve (31, 32, 33, 34) is in a switched-on state. In this application, the at least one third control valve may be specifically the first wheel cylinder inlet valve 31, the second wheel cylinder inlet valve 32, the third wheel cylinder inlet valve 33, and the fourth wheel cylinder inlet valve 34. A quantity of the third control valves is not limited in this embodiment of this application, and the quantity of the third control valves shown in this embodiment of this application is merely an example.

Similarly, the at least one fourth control valve (35) is configured to enable the brake fluid to flow back from the brake wheel cylinder to the fluid storage container, for example, flow back to the first fluid storage container 6 or the second fluid storage container 71. The at least one fourth control valve is generally in a switched-off state, and in a depressurization operating condition in the redundant braking mode, the at least one fourth control valve is in a switched-on state. In this application, the at least one fourth control valve may be specifically the wheel cylinder outlet valve 35. A quantity of the fourth control valves is not limited in this embodiment of this application, and the quantity of the fourth control valves shown in this embodiment of this application is merely an example.

In a possible implementation, the first fluid storage container 6 or the second fluid storage container 71 is separately connected to at least one brake wheel cylinder through the at least one fourth control valve. This is not shown in the figures in this embodiment of this application. If there is a corresponding wheel cylinder outlet valve for each wheel cylinder, the solution can implement simultaneous and independent depressurization on each brake wheel cylinder.

In a possible implementation, the redundant brake system may further include a brake system connector 38. The brake system plug-in connectors 38 include at least one first interface (38f, 38g, 38h, 38i, 38w, 38x, 38y, 38z, 38q, 38r), at least one second interface (38b, 38c, 38d, 38e, 38k, 38l, 38o, 38p), a third interface 38a, and a fourth interface 38j. The first interface is configured to connect the isolation valve that isolates the two brake subsystems and the master brake system; the second interface is configured to connect the redundant brake system 120 and the at least one brake wheel cylinder; the third interface is configured to connect the redundant brake system 120 and the first fluid storage container 6 in the master brake system 110; and the fourth interface is configured to connect the redundant brake system 120 and the first pedal feel simulator 10.

In a possible implementation, the brake system plug-in connector 38 may further include at least one fifth interface (38m, 38n), where the fifth interface is configured to connect the redundant brake system 120 and at least one first control valve in the master brake system.

In a possible implementation, the brake system plug-in connector 38 may further include at least one sixth interface (38s, 38t, 38u, 38v), and the sixth interface is configured to connect at least one third control valve in the redundant brake system 120 and at least one first control valve in the master brake system 110.

It should be understood that the redundant brake system 120 and the master brake system 110 may be directly connected through a brake pipeline, as shown in FIG. 1(b), or connected through at least one of the foregoing interfaces of the brake system plug-in connector 38, as shown in FIG. 1(a), where the brake system plug-in connector 38 may belong to the redundant brake system 120, or may belong to the master brake system 110. In this application, the redundant brake system 120 and the master brake system 110 in any brake system may be directly connected through a brake pipeline, and in this case, the brake system is integrated. Alternatively, the redundant brake system 120 and the master brake system 110 in any brake system may be connected through at least one of the foregoing interfaces in the brake system plug-in connector 38, and in this case, the brake system is of a split type. Alternatively, the redundant brake system 120 and the master brake system 110 in any brake system may be directly connected through a pipeline or through an interface as described above. This is not limited in this embodiment of this application.

The first wheel cylinder inlet valve 31 is connected to the first redundant isolation valve 26 through a first redundant brake pipeline 37a, and the first redundant brake pipeline 37a provides a braking force for the first brake wheel cylinder 22. The second wheel cylinder inlet valve 32 and the second redundant isolation valve 27 are connected through a second redundant brake pipeline 37b, and the second redundant brake pipeline 37b provides a braking force for the second brake wheel cylinder 23. The third wheel cylinder inlet valve 33 is connected to the third redundant isolation valve 28 through a third redundant brake pipeline 37c, and the third redundant brake pipeline 37c provides a braking force for the third brake wheel cylinder 24. The fourth wheel cylinder inlet valve 34 is connected to the fourth redundant isolation valve 29 through a fourth redundant brake pipeline 37d, and the fourth redundant brake pipeline 37d provides a braking force for the fourth brake wheel cylinder 25. In this embodiment provided in this application, the redundant brake pipeline 37 may include the first redundant brake pipeline 37a, the second redundant brake pipeline 37b, the third redundant brake pipeline 37c, the fourth redundant brake pipeline 37d, a fifth redundant brake pipeline 37e, and a sixth redundant brake pipeline 37f.

In a possible implementation, the redundant brake pipeline may further include a seventh redundant brake pipeline 37g and an eighth redundant brake pipeline 37h.

The wheel cylinder outlet valve 35, the plunger pump assembly 36, the first wheel cylinder inlet valve 31, the second wheel cylinder inlet valve 32, the third wheel cylinder inlet valve 33, and the fourth wheel cylinder inlet valve 34 are connected through the sixth redundant brake pipeline 37f. The wheel cylinder outlet valve 35, the plunger pump assembly 36, and the first brake system plug-in connector 38a are connected through the fifth redundant brake pipeline 37e.

The brake system plug-in connectors 38 include the first brake system plug-in connector 38a, a second brake system plug-in connector 38b, a third brake system plug-in connector 38c, a fourth brake system plug-in connector 38d, a fifth brake system plug-in connector 38e, a sixth brake system plug-in connector 38f, a seventh brake system plug-in connector 38g, an eighth brake system plug-in connector 38h, and a ninth brake system plug-in connector 38i.

The redundant brake system 120 may further include a first redundant one-way valve 39, a second redundant one-way valve 40, a third redundant one-way valve 41, and a fourth redundant one-way valve 42. The first redundant one-way valve 39 is connected in parallel to the first redundant isolation valve 26, the second redundant one-way valve 40 is connected in parallel to the second redundant isolation valve 27, the third redundant one-way valve 41 is connected in parallel to the third redundant isolation valve 28, and the fourth redundant one-way valve 42 is connected in parallel to the fourth redundant isolation valve 29. The first redundant isolation valve 26 includes a first port and a second port, and the first pressure sensor 30 is connected to the first port of the first redundant isolation valve 26.

It should be understood that the at least one first one-way valve (39, 40, 41, 42) is configured to prevent the brake fluid from flowing back to the brake master cylinder 7 while enabling the brake pedal 3 to generate displacement. In this application, the at least one first one-way valve may be specifically the first redundant one-way valve 39, the second redundant one-way valve 40, the third redundant one-way valve 41, and the fourth redundant one-way valve 42. A quantity of the first one-way valves is not limited in this embodiment of this application, and the quantity of the first one-way valves shown in this embodiment of this application is merely an example.

A connection relationship between the master brake system 110 and the redundant brake system 120 is as follows: The first fluid storage container 6 is connected to the wheel cylinder outlet valve 35 and the plunger pump assembly 36 in the redundant brake system 120 through the brake system plug-in connector 38*a*; the brake circuit 113 is connected to the first ports of the first redundant isolation valve 26, the second redundant isolation valve 27, the third redundant isolation valve 28, and the fourth redundant isolation valve 29 respectively through the second brake system plug-in connector 38*b*, the third brake system plug-in connector 38*c*, the fourth brake system plug-in connector 38*d*, and the fifth brake system plug-in connector 38*e*; the first brake wheel cylinder 22 is connected to the second port of the first redundant isolation valve 26 in the redundant system 120 through the ninth brake system plug-in connector 38*i*; the second brake wheel cylinder 23 is connected to the second port of the second redundant isolation valve 27 in the redundant system 120 through the eighth brake system plug-in connector 38*h*; the third brake wheel cylinder 24 is connected to the second port of the first redundant isolation valve 28 in the redundant system 120 through the seventh brake system plug-in connector 38*g*; and the fourth brake wheel cylinder 25 is connected to the second port of the first redundant isolation valve 29 in the redundant system 120 through the sixth brake system plug-in connector 38*f*.

Figure 9:
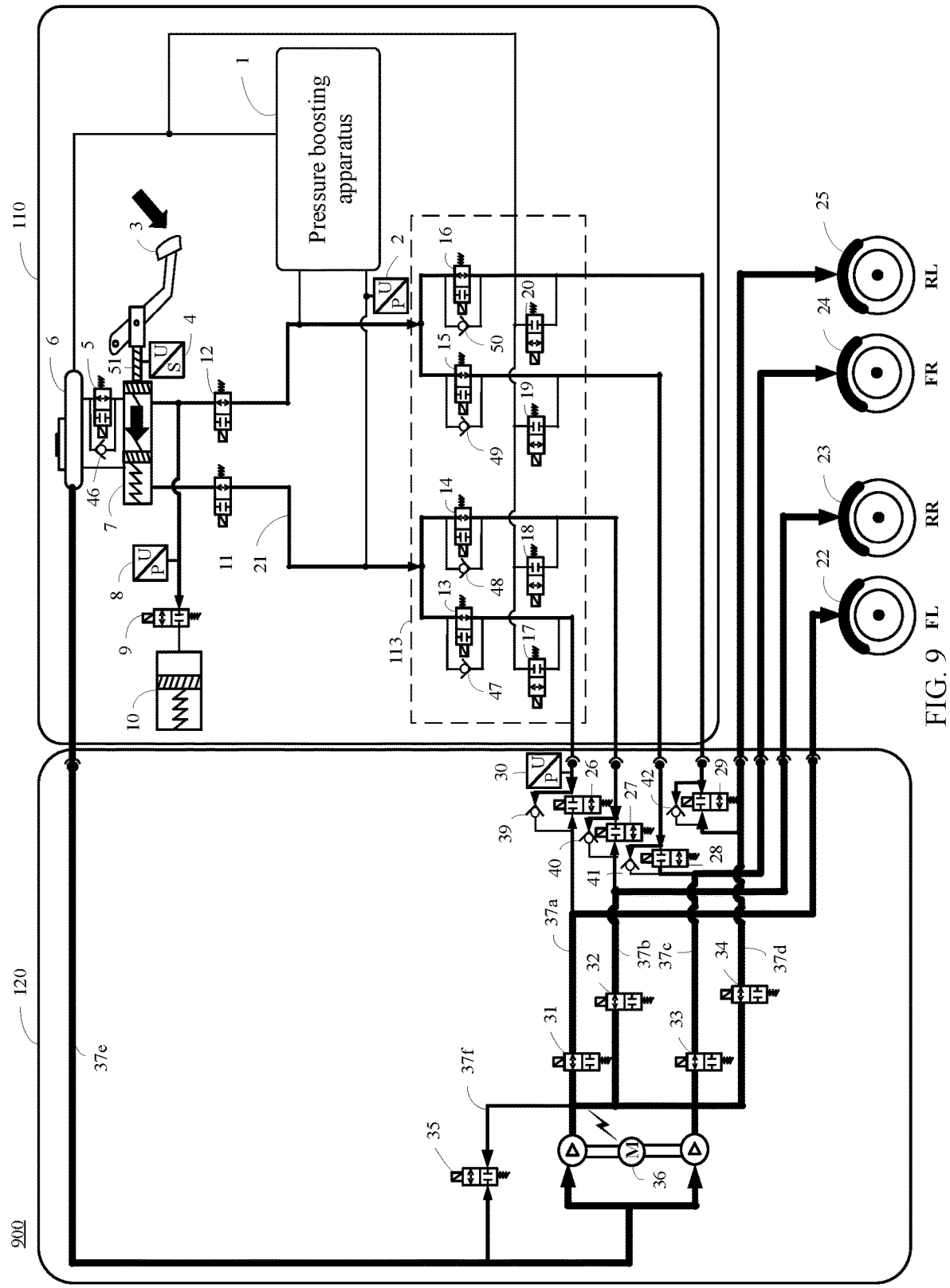
FIG. 9 is a schematic diagram of another pressure boosting process in a redundant braking mode according to an embodiment of this application.

FIG. 1(*a*) is used as an example to describe an operating mode of the brake-by-wire system. In this embodiment of this application, the brake-by-wire system in FIG. 1(*a*) includes three operating modes: a manual braking mode, a pressure boosting apparatus braking mode, and a redundant braking mode. The following describes in detail the redundant braking mode of the brake-by-wire system in FIG. 1(*a*) with reference to FIG. 9. FIG. 9 is a schematic diagram of a pressure boosting process in the redundant braking mode according to an embodiment of this application. When a master brake system fails, a controller independently controls a redundant brake system 120 to provide braking forces for four brake wheel cylinders.

When the master brake system fails, a driver steps on the brake pedal 3, and brake fluid enters a brake circuit 113 from a brake master cylinder 7. The controller controls a first redundant isolation valve 26, a second redundant isolation valve 27, a third redundant isolation valve 28, and a fourth redundant isolation valve 29 to be in a switched-off state. In this case, only a small amount of brake fluid can enter the brake wheel cylinders through a one-way valve, and the redundant brake system 120 is required to provide braking forces for the brake wheel cylinders. The redundant brake system 120 controls a first wheel cylinder inlet valve 31, a second wheel cylinder inlet valve 32, a third wheel cylinder inlet valve 33, and a fourth wheel cylinder inlet valve 34 to be in a switched-on state, controls a wheel cylinder outlet valve 35 to be in a switched-off state, and controls a plunger pump assembly 36 to operate. The brake fluid from the first fluid storage container 6 passes through the plunger pump assembly 36, and enters a first brake wheel cylinder 22, a second brake wheel cylinder 23, a third brake wheel cylinder 24, and a fourth brake wheel cylinder 25 from the first wheel cylinder inlet valve 31, the second wheel cylinder inlet valve 32, the third wheel cylinder inlet valve 33, and the fourth wheel cylinder inlet valve 34, respectively, to provide braking forces for these brake wheel cylinders. A first redundant one-way valve 39, a second redundant one-way valve 40, a third redundant one-way valve 41, and a fourth redundant one-way valve 42 isolate the brake fluid from flowing to a master brake system 110.

It should be noted that, in the accompanying drawings of embodiments of this application, thickness of the brake pipeline represents only a flow direction of the brake fluid in different operating modes, and does not represent a pressure value of the brake fluid in the brake pipeline. For example, in FIG. 9, in the redundant braking mode, the brake pipeline shown by thick lines indicates that when the redundant brake system 120 provides braking forces for the brake wheel cylinders, the brake fluid flows to the brake wheel cylinders; and the brake pipeline shown by thin lines indicates that when the redundant brake system 120 provides braking forces for the brake wheel cylinders, although the brake fluid still flows in the brake pipelines, no braking force can be provided for the brake wheel cylinders.

In the solution of this application, the isolation valve and the wheel cylinder inlet valve for each brake wheel cylinder are disposed in the redundant brake system, so that when the master brake system fails, the redundant brake system can independently control each brake wheel cylinder, to implement function backup for the master brake system, thereby meeting the requirements for braking functions such as ABS/AEB/ESC/TCS of the vehicle, and further improving safety of the brake system.

Figure 2:
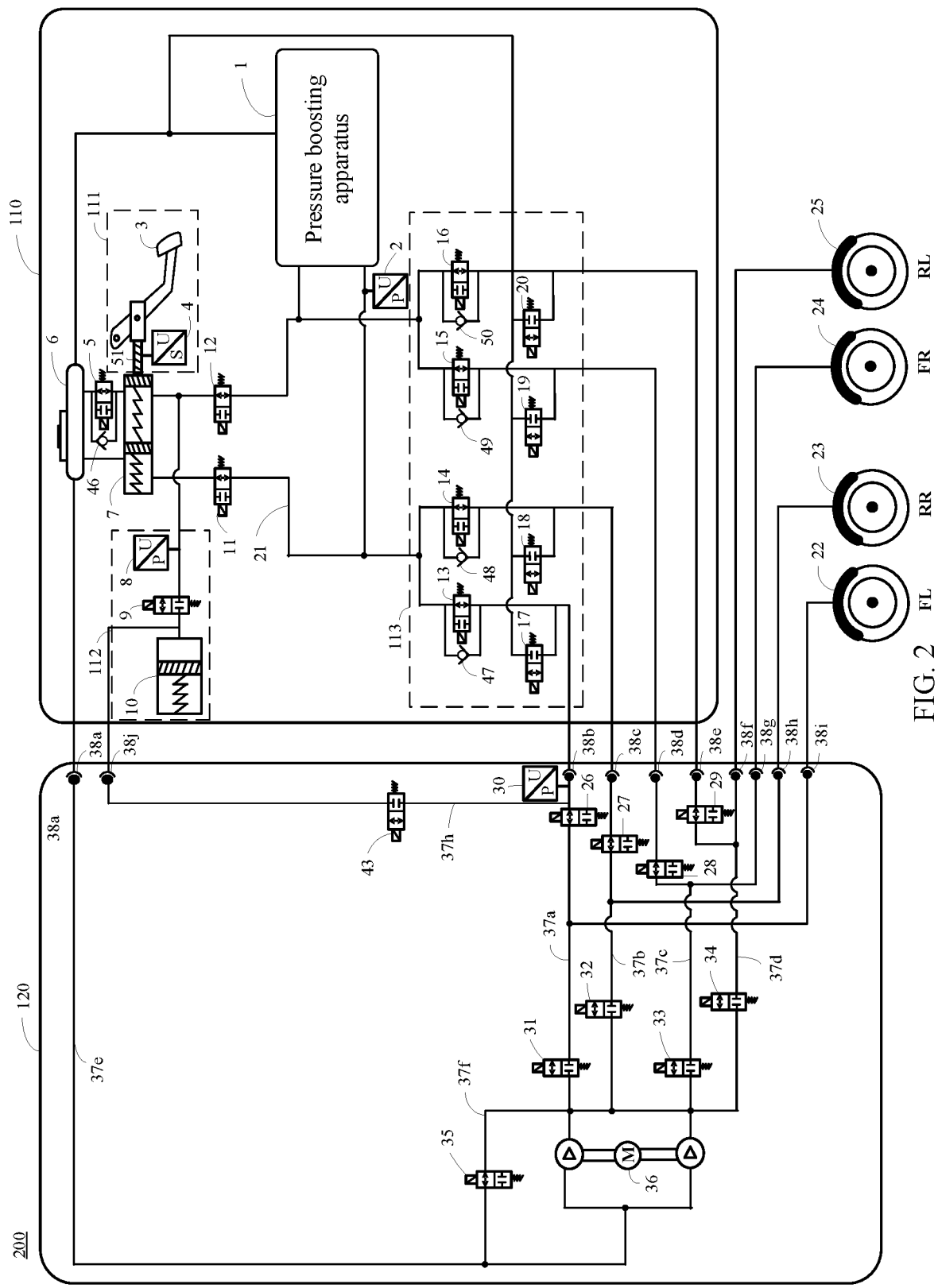
FIG. 2 is a schematic diagram of another brake-by-wire system according to an embodiment of this application.

FIG. 2 is a schematic diagram of another brake-by-wire system according to an embodiment of this application. As shown in FIG. 2, the brake-by-wire system 100 includes a master brake system 110, a redundant brake system 120, a first brake wheel cylinder 22, a second brake wheel cylinder 23, a third brake wheel cylinder 24, and a fourth brake wheel cylinder 25.

A structure and functions of the master brake system 110 in FIG. 2 are the same as those of the master brake system 110 in FIG. 1(*a*). To avoid repetition, details are not described herein again.

The redundant brake system 120 may include a plunger pump assembly 36, a first wheel cylinder inlet valve 31, a second wheel cylinder inlet valve 32, a third wheel cylinder inlet valve 33, a fourth wheel cylinder inlet valve 34, a wheel cylinder outlet valve 35, a first redundant isolation valve 26, a second redundant isolation valve 27, a third redundant isolation valve 28, a fourth redundant isolation valve 29, a first pressure sensor 30, a redundant brake pipeline 37, and a brake system plug-in connector 38. The first wheel cylinder inlet valve 31 is connected to the first redundant isolation valve 26 through a first redundant brake pipeline 37*a*, and the first redundant brake pipeline 37*a* provides a braking force for the first brake wheel cylinder 22. The second wheel cylinder inlet valve 32 and the second redundant isolation valve 27 are connected through a second redundant brake pipeline 37*b*, and the second redundant brake pipeline 37*b* provides a braking force for the second brake wheel cylinder 23. The third wheel cylinder inlet valve 33 is connected to the third redundant isolation valve 28 through a third redundant brake pipeline 37*c*, and the third redundant brake pipeline 37*c* provides a braking force for the third brake wheel cylinder 24. The fourth wheel cylinder inlet valve 34 is connected to the fourth redundant isolation valve 29 through a fourth redundant brake pipeline 37d, and the fourth redundant brake pipeline 37d provides a braking force for the fourth brake wheel cylinder 25. The redundant brake pipeline 37 includes the first redundant brake pipeline 37a, the second redundant brake pipeline 37b, the third redundant brake pipeline 37c, the fourth redundant brake pipeline 37d, a fifth redundant brake pipeline 37e, a sixth redundant brake pipeline 37f, a seventh redundant brake pipeline 37g, and an eighth redundant brake pipeline 37h.

The wheel cylinder outlet valve 35, the plunger pump assembly 36, the first wheel cylinder inlet valve 31, the second wheel cylinder inlet valve 32, the third wheel cylinder inlet valve 33, and the fourth wheel cylinder inlet valve 34 are connected through the sixth redundant brake pipeline 37f. The wheel cylinder outlet valve 35, the plunger pump assembly 36, the first brake system plug-in connector 38a are connected through the fifth redundant brake pipeline 37e, and the brake system plug-in connectors 38 include the first brake system plug-in connector 38a.

The redundant brake system 120 may further include a first pedal feel simulator switch valve 43, the first redundant isolation valve 26 includes a first port and a second port, and the first pedal feel simulator switch valve 43 is connected to the first port of the first redundant isolation valve 26 through the eighth redundant brake pipeline 37h, where the first pedal feel simulator switch valve 43 is configured to feed back pedal feel information to a driver when the master brake system 110 fails. The first pressure sensor 30 is connected to the first port of the first redundant isolation valve 26. In the solution of this application, an installation position of the first pedal feel simulator switch valve 43 may be connected to the first port of each redundant isolation valve through the redundant brake pipeline 37h. In this case, an installation position of the first pressure sensor 30 changes with the installation position of the first pedal feel simulator switch valve 43. Installation positions of the first pedal feel simulator switch valve 43 and the first pressure sensor 30 are not limited in this embodiment of this application. For example, as shown in FIG. 2, a first port of the first pedal feel simulator switch valve 43 is connected to the first port of the first redundant isolation valve 26 through the eighth redundant brake pipeline 37h, and the first pressure sensor 30 is connected to the first port of the first redundant isolation valve 26.

A connection relationship between the master brake system 110 and the redundant brake system 120 in the brake-by-wire system shown in FIG. 2 includes: in addition to the connection relationship in FIG. 1(a), the first port of the first pedal feel simulator 10 is connected to a second port of the first pedal feel simulator switch valve 43 in the redundant brake system 120 through the tenth brake system plug-in connector 38j.

As described above, the brake-by-wire system in this embodiment of this application includes three operating modes: a manual braking mode, a pressure boosting apparatus braking mode, and a redundant braking mode. The following describes in detail the redundant braking mode of the brake-by-wire system in FIG. 2 with reference to FIG. 10.

Figure 10:
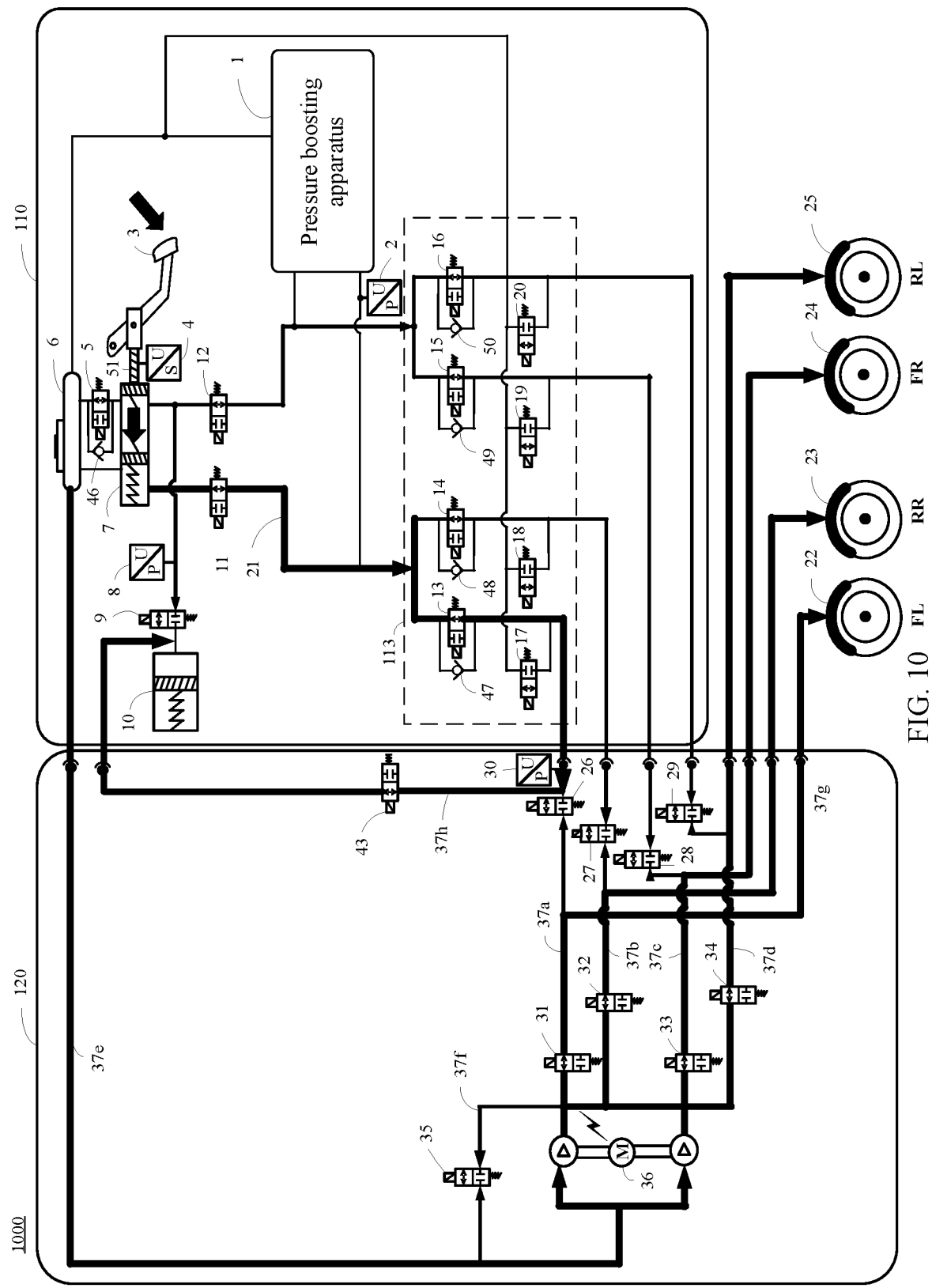
FIG. 10 is a schematic diagram of still another pressure boosting process in a redundant braking mode according to an embodiment of this application.

FIG. 10 is a schematic diagram of still another redundant braking mode according to an embodiment of this application. When a master brake system fails, a controller controls a redundant brake system 120 to provide braking forces for four brake wheel cylinders.

For example, in a possible case, when the master brake system fails, a driver steps on the brake pedal 3, and brake fluid enters a brake circuit 113 from a brake master cylinder 7. The controller controls a first redundant isolation valve 26, a second redundant isolation valve 27, a third redundant isolation valve 28, and a fourth redundant isolation valve 29 to be in a switched-off state. In this case, the brake fluid cannot enter the brake wheel cylinder through the master brake system, and the redundant brake system 120 is required to provide braking forces for the brake wheel cylinders. The redundant brake system 120 controls a first wheel cylinder inlet valve 31, a second wheel cylinder inlet valve 32, a third wheel cylinder inlet valve 33, and a fourth wheel cylinder inlet valve 34 to be in a switched-on state, controls a wheel cylinder outlet valve 35 to be in a switched-off state, and controls a plunger pump assembly 36 to operate. The brake fluid from the first fluid storage container 6 passes through the plunger pump assembly 36, and enters a first brake wheel cylinder 22, a second brake wheel cylinder 23, a third brake wheel cylinder 24, and a fourth brake wheel cylinder 25 from the first wheel cylinder inlet valve 31, the second wheel cylinder inlet valve 32, the third wheel cylinder inlet valve 33, and the fourth wheel cylinder inlet valve 34, respectively, to provide braking forces for these brake wheel cylinders. Similarly, a first pedal feel simulator switch valve 43 in the redundant brake system is in a switched-on state, and the brake fluid enters a first pedal feel simulator 10 in a master brake system 110 from the brake circuit 113 through the first pedal feel simulator switch valve 43, and feeds back pedal feel information to the driver.

In the solution of this application, the isolation valve and the wheel cylinder inlet valve for each brake wheel cylinder are disposed in the redundant brake system, so that when the master brake system fails, the redundant brake system can independently control each brake wheel cylinder, to implement function backup of the master brake system, thereby meeting requirements for braking functions such as ABS/AEB/ESC/TCS of the vehicle, and further improving safety of the brake system. For example, when the brake system needs to perform depressurization in a redundant braking mode, if there is only one wheel cylinder outlet valve, this solution may implement time-sharing independent depressurization for all brake wheel cylinders. If there is a corresponding wheel cylinder outlet valve for each wheel cylinder, this solution may implement independent depressurization for all brake wheel cylinders at the same time. In addition, the redundant brake system 120 in the brake-by-wire system may further feed back pedal feel information to the driver. When the master brake system fails, pedal feel of the driver can still be ensured, thereby bringing more stable and comfortable driving experience to the driver.

Figure 3A:
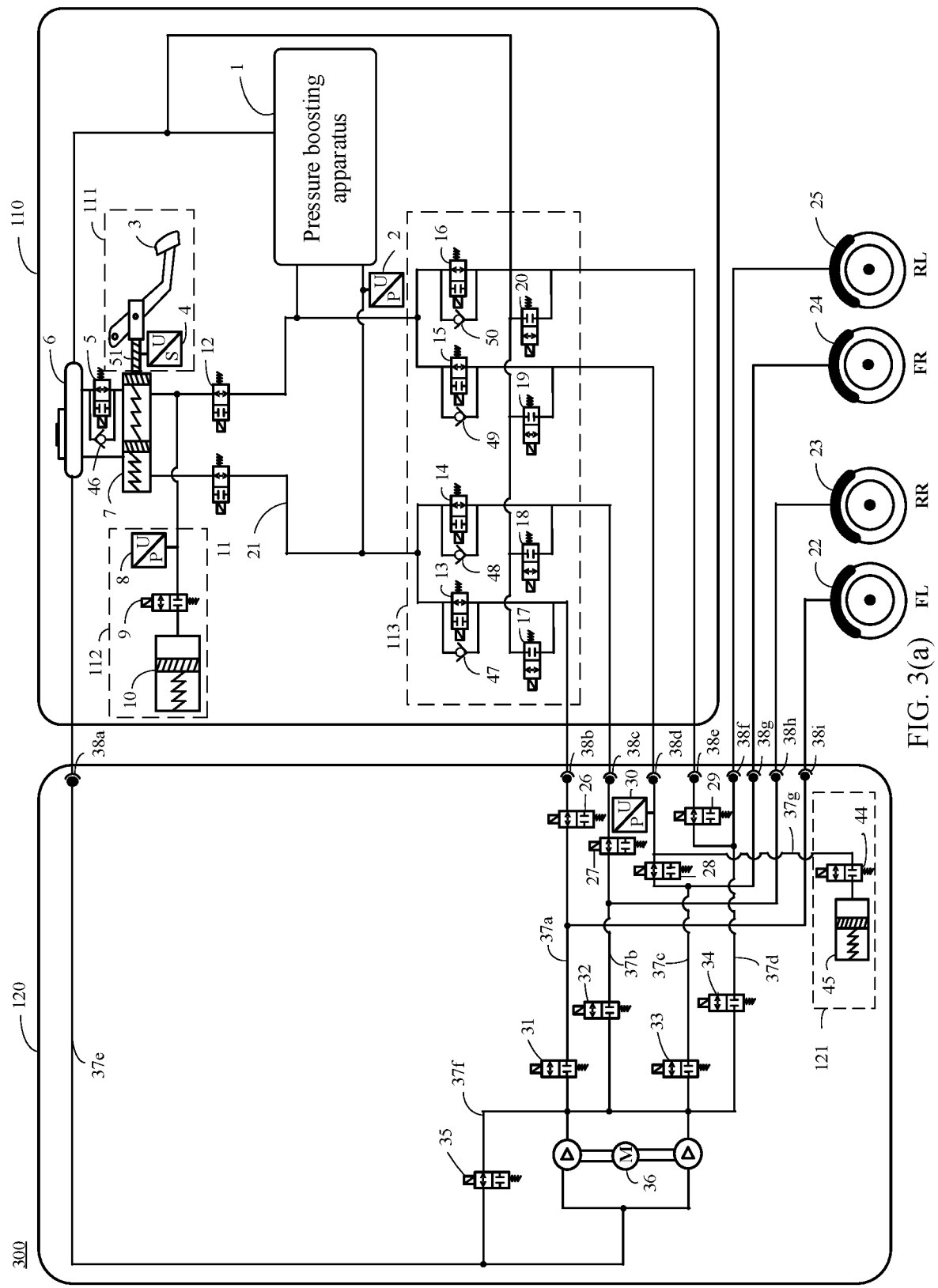
FIG. 3(a) and FIG. 3(b) are a schematic diagram of still another brake-by-wire system according to an embodiment of this application.
Figure 3B:
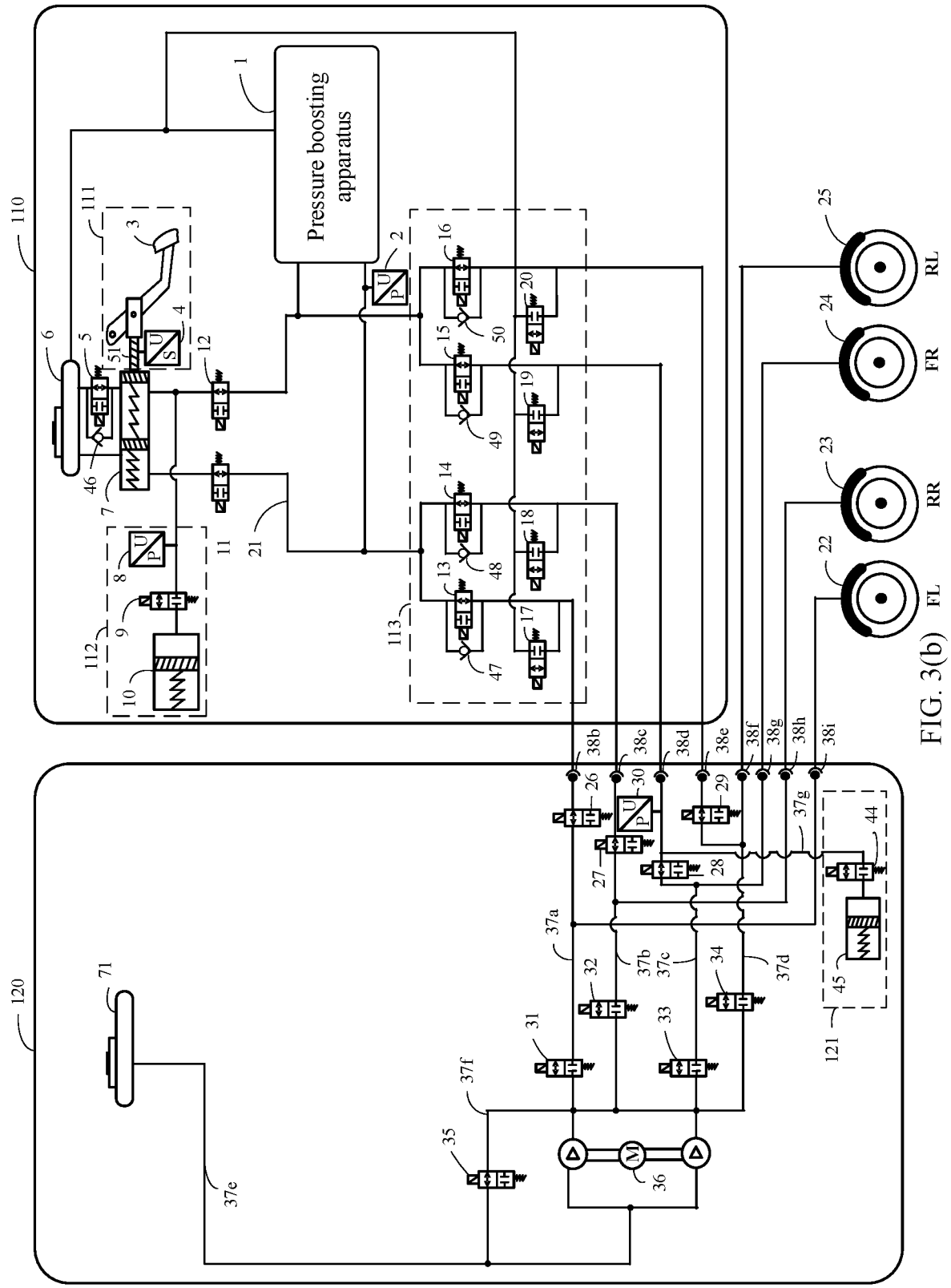

FIG. 3(a) and FIG. 3(b) are a schematic diagram of still another brake-by-wire system according to an embodiment of this application. As shown in FIG. 3(a) or FIG. 3(b), the brake-by-wire system 100 includes a master brake system 110, a redundant brake system 120, a first brake wheel cylinder 22, a second brake wheel cylinder 23, a third brake wheel cylinder 24, and a fourth brake wheel cylinder 25.

A structure and functions of the master brake system 110 in FIG. 3(a) are the same as those of the master brake system 110 in FIG. 1(a). To avoid repetition, details are not described herein again.

The redundant brake system 120 may include a plunger pump assembly 36, a first wheel cylinder inlet valve 31, a second wheel cylinder inlet valve 32, a third wheel cylinder inlet valve 33, a fourth wheel cylinder inlet valve 34, a wheel cylinder outlet valve 35, a first redundant isolation valve 26, a second redundant isolation valve 27, a third redundant isolation valve 28, a fourth redundant isolation valve 29, a first pressure sensor 30, a redundant brake pipeline 37, and a brake system plug-in connector 38. The first wheel cylinder inlet valve 31 is connected to the first redundant isolation valve 26 through a first redundant brake pipeline 37*a*, and the first redundant brake pipeline 37*a* provides a braking force for the first brake wheel cylinder 22. The second wheel cylinder inlet valve 32 and the second redundant isolation valve 27 are connected through a second redundant brake pipeline 37*b*, and the second redundant brake pipeline 37*b* provides a braking force for the second brake wheel cylinder 23. The third wheel cylinder inlet valve 33 is connected to the third redundant isolation valve 28 through a third redundant brake pipeline 37*c*, and the third redundant brake pipeline 37*c* provides a braking force for the third brake wheel cylinder 24. The fourth wheel cylinder inlet valve 34 is connected to the fourth redundant isolation valve 29 through a fourth redundant brake pipeline 37*d*, and the fourth redundant brake pipeline 37*d* provides a braking force for the fourth brake wheel cylinder 25. The redundant brake pipeline 37 includes the first redundant brake pipeline 37*a*, the second redundant brake pipeline 37*b*, the third redundant brake pipeline 37*c*, the fourth redundant brake pipeline 37*d*, a fifth redundant brake pipeline 37*e*, a sixth redundant brake pipeline 37*f*, a seventh redundant brake pipeline 37*g*, and an eighth redundant brake pipeline 37*h*.

The wheel cylinder outlet valve 35, the plunger pump assembly 36, the first wheel cylinder inlet valve 31, the second wheel cylinder inlet valve 32, the third wheel cylinder inlet valve 33, and the fourth wheel cylinder inlet valve 34 are connected through the sixth redundant brake pipeline 37*f*. The wheel cylinder outlet valve 35, the plunger pump assembly 36, the first brake system plug-in connector 38*a* are connected through the fifth redundant brake pipeline 37*e*, and the brake system plug-in connectors 38 include the first brake system plug-in connector 38*a*, as shown in FIG. 3(*a*).

The redundant brake system 120 may further include an independent second fluid storage container 71, where the second fluid storage container 71 is connected to the plunger pump 36 through the fifth redundant brake pipeline 37*e*, as shown in FIG. 3(*b*). The independent fluid storage reservoir in the redundant brake system may enable the redundant brake system 120 to be more completely decoupled from the master brake system 110. It should be understood that the redundant brake system 120 in this embodiment of this application may include an independent second fluid storage container 71, and a connection structure is similar to that in FIG. 3(*b*), and is omitted in other accompanying drawings of this application. It should be further understood that, in this embodiment of this application, the redundant braking mode of the brake-by-wire system is described by using an example in which the brake fluid comes from a first fluid storage container 6 in the master brake system 110. In this embodiment of this application, neither a fluid storage reservoir from which the brake fluid comes nor a fluid storage reservoir from which the brake fluid flows back is not limited. The brake fluid may come from the first fluid storage container 6 or the second fluid storage container 71, and the brake fluid may flow back to the first fluid storage container 6 or the second fluid storage container 71.

The redundant brake system 120 may further include a second pedal feel simulation system 121. The second pedal feel simulation system 121 includes a second pedal feel simulator switch valve 44 and a second pedal feel simulator 45. The second pedal feel simulator 45 and the second pedal feel simulator switch valve 44 are connected to a first port of the third redundant isolation valve 28 through the seventh redundant brake pipeline 37*g*, where the second pedal feel simulator switch valve 44 and the second pedal feel simulator 45 are configured to feed back pedal feel information to the driver when the master brake system 110 fails. The first pressure sensor 30 is connected to the first port of the third redundant isolation valve 28.

In the solution of this application, an installation position of the second pedal feel simulation system 121 may be connected to the first port of each redundant isolation valve through the seventh redundant brake pipeline 37*g*. In this case, an installation position of the first pressure sensor 30 changes with the installation position of the second pedal feel simulation system 121. Installation positions of the second pedal feel simulation system 121 and the first pressure sensor 30 are not limited in this embodiment of this application. For example, as shown in FIG. 3(*a*), the second pedal feel simulation system 121 is connected to the first port of the third redundant isolation valve 28 through the seventh redundant brake pipeline 37*g*, and the first pressure sensor 30 is connected to the first port of the third redundant isolation valve 28.

A connection relationship between the master brake system 110 and the redundant brake system 120 in the brake-by-wire system shown in FIG. 3(*a*) is the same as that in FIG. 1(*a*), and details are not described herein again.

In this embodiment of this application, the brake-by-wire system includes three operating modes: a manual braking mode, a pressure boosting apparatus braking mode, and a redundant braking mode. The following describes in detail operating principles of the brake-by-wire system in the three operating modes with reference to FIG. 4 to FIG. 8.

Figure 4:
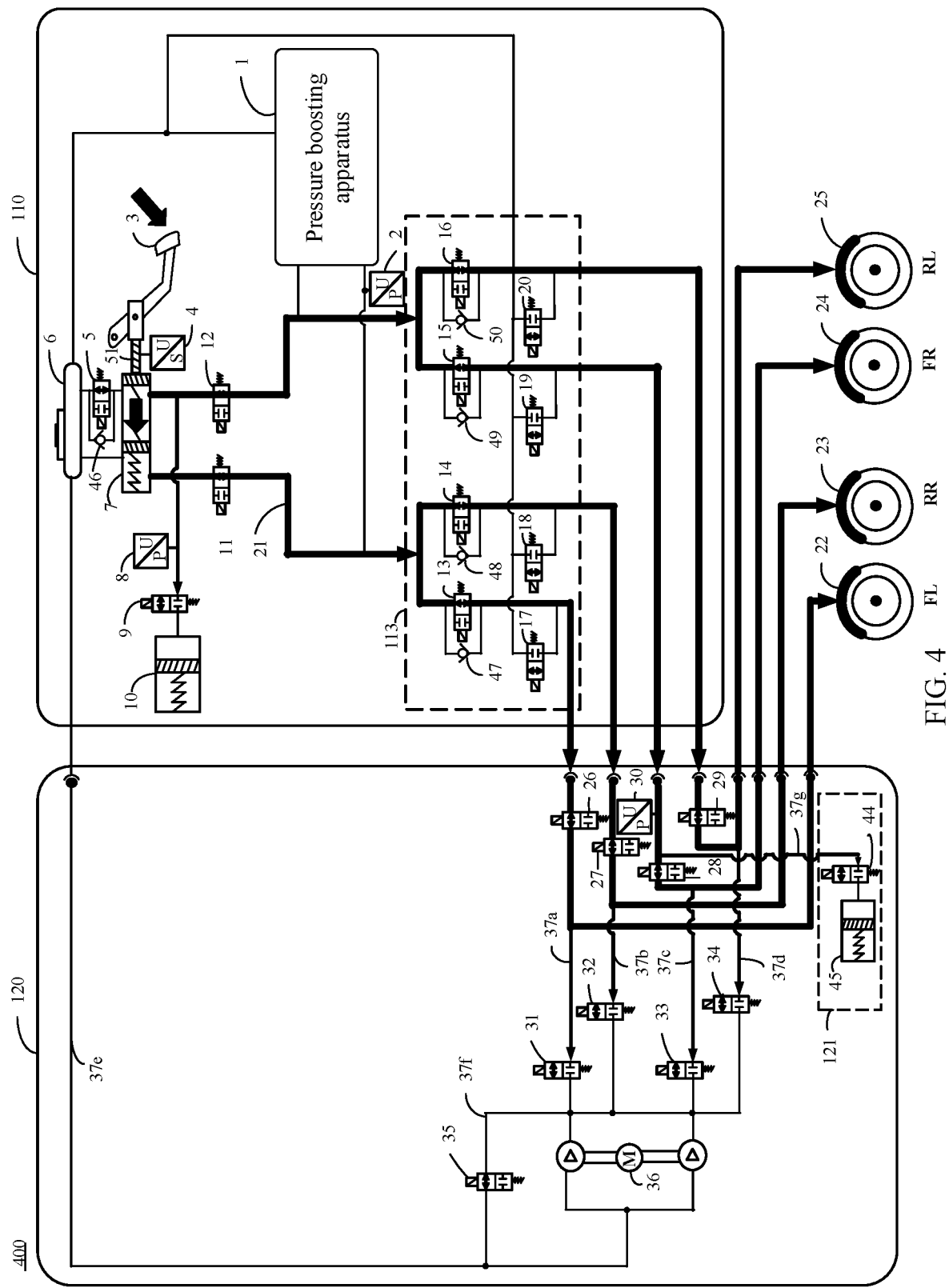
FIG. 4 is a schematic diagram of a pressure boosting process in an emergency manual braking mode according to an embodiment of this application.

Manual braking operating mode: FIG. 4 is a schematic diagram of a pressure boosting process in a manual braking mode in an emergency state according to an embodiment of this application.

A driver steps on a brake pedal 3, and brake fluid enters a brake circuit 113 from a brake master cylinder 7. A first redundant isolation valve 26, a second redundant isolation valve 27, a third redundant isolation valve 28, and a fourth redundant isolation valve 29 are in a switched-on state. The brake fluid enters the four brake wheel cylinders through the first redundant isolation valve 26, the second redundant isolation valve 27, the third redundant isolation valve 28, and the fourth redundant isolation valve 29, respectively, to provide braking forces for the brake wheel cylinders. In this case, the first wheel cylinder inlet valve 31, the second wheel cylinder inlet valve 32, the third wheel cylinder inlet valve 33, and the fourth wheel cylinder inlet valve 34 in the redundant brake system 120 are in a switched-off state, to prevent the brake fluid from flowing back to a first fluid storage container 6. Similarly, a second pedal feel simulator switch valve 44 in the second pedal feel simulation system 121 is also in a switched-off state, and in this case, the second pedal feel simulation system 121 does not work.

Figure 5:
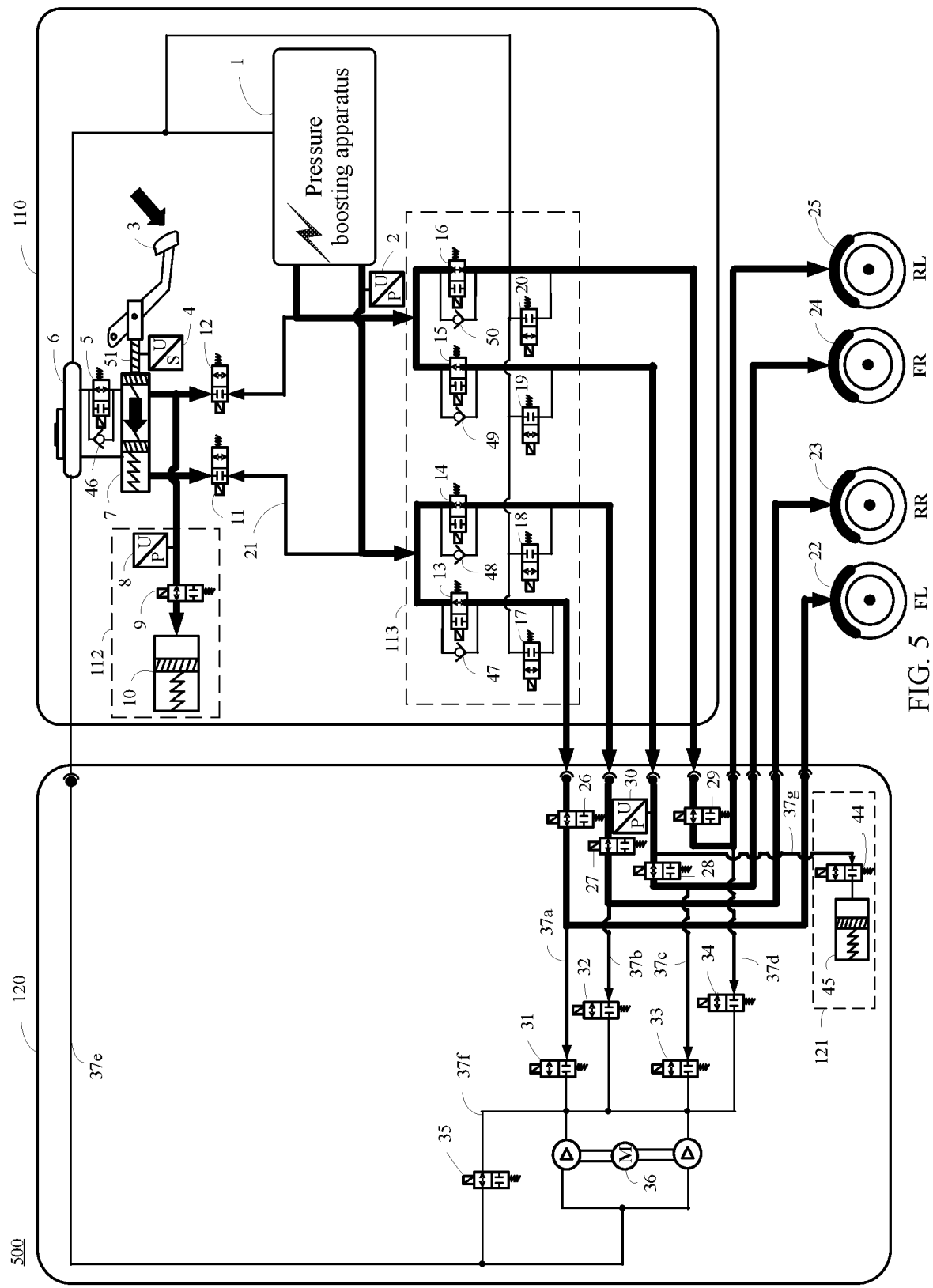
FIG. 5 is a schematic diagram of a pressure boosting process in a pressure boosting apparatus mode according to an embodiment of this application.

Pressure boosting apparatus braking mode: FIG. 5 is a schematic diagram of a pressure boosting process in a pressure boosting apparatus mode according to an embodiment of this application.

In the pressure boosting apparatus braking mode, the controller of the master brake system controls a first wheel cylinder isolation valve 11 and a second wheel cylinder isolation valve 12 in a master brake system 110 to be in a switched-off state, and controls a third pedal feel simulator switch valve 9 to be in a switched-on state. A driver steps on a brake pedal 3, and brake fluid enters a first pedal feel simulator 10 in a first pedal feel simulation system 112 from a brake master cylinder 7, and feeds back pedal feel information to the driver. A pressure boosting apparatus 1 in the master brake system 110 operates, the brake fluid enters a brake circuit 113 from the pressure boosting apparatus; and a first redundant isolation valve 26, a second redundant isolation valve 27, a third redundant isolation valve 28, and a fourth redundant isolation valve 29 are in a switched-on state, and the brake fluid enters the four brake wheel cylinders through the first redundant isolation valve 26, the second redundant isolation valve 27, the third redundant isolation valve 28, and the fourth redundant isolation valve 29, respectively, to provide braking forces for the brake wheel cylinders. In this case, the first wheel cylinder inlet valve 31, the second wheel cylinder inlet valve 32, the third wheel cylinder inlet valve 33, and the fourth wheel cylinder inlet valve 34 in the redundant brake system 120 are in a switched-off state, to prevent the brake fluid from flowing back to a first fluid storage container 6. Similarly, a second pedal feel simulator switch valve 44 in the second pedal feel simulation system 121 is also in a switched-off state, and in this case, the second pedal feel simulation system 121 does not work.

Redundant braking mode: When the master brake system fails, the brake-by-wire system enters the redundant braking mode. In this mode, there are three braking operating processes: a pressure boosting process in the redundant braking mode, a pressure preservation process in the redundant braking mode, and a depressurization process in the redundant braking mode. The following describes the three processes in detail with reference to FIG. 6 to FIG. 8.

Figure 6:
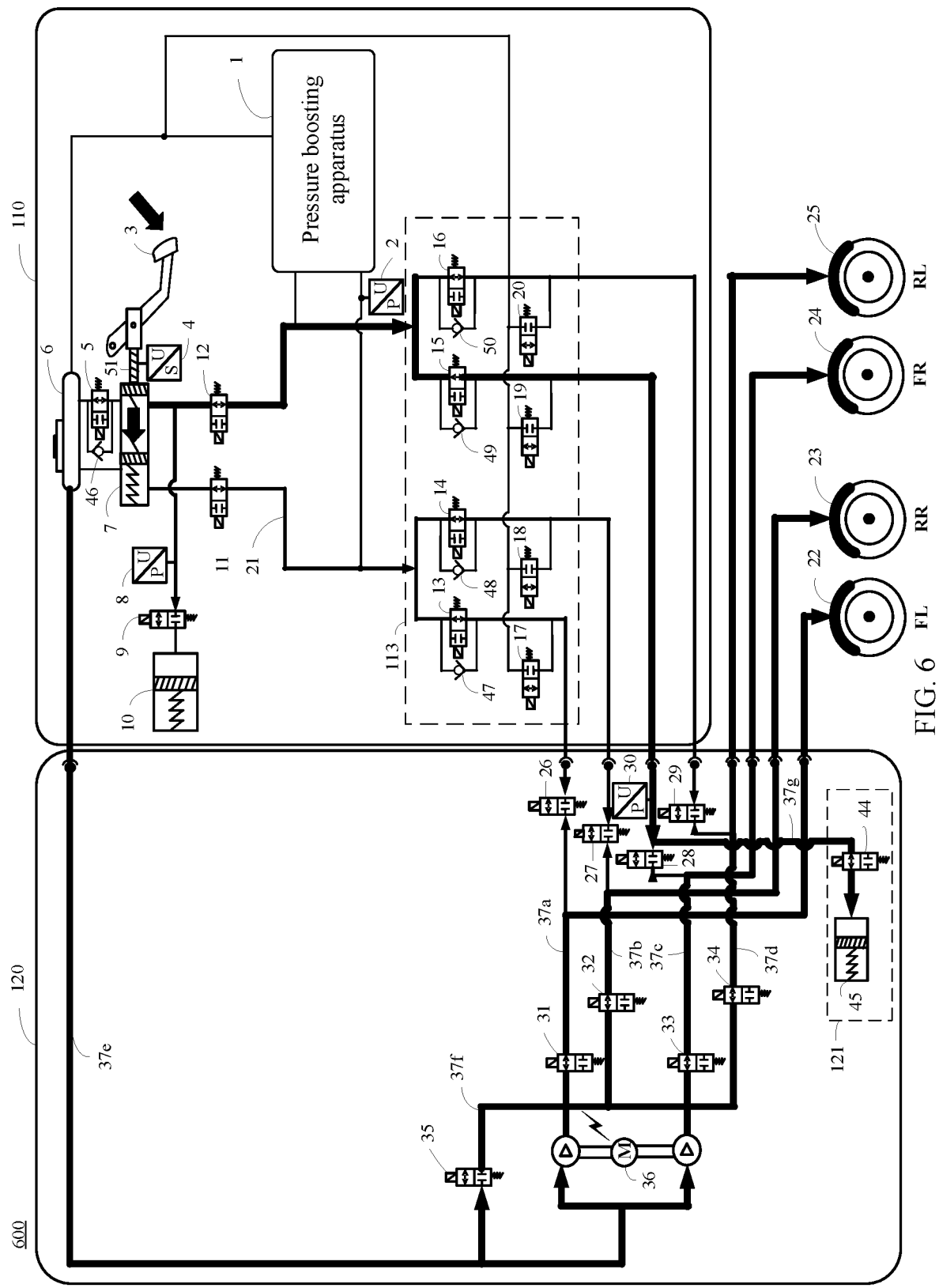
FIG. 6 is a schematic diagram of a pressure boosting process in a redundant braking mode according to an embodiment of this application.

Pressure boosting process in the redundant braking mode: FIG. 6 is a schematic diagram of a pressure boosting process in the redundant braking mode according to an embodiment of this application. When a master brake system fails, a controller controls a redundant brake system 120 to provide braking forces for four brake wheel cylinders.

When the master brake system fails, a driver steps on the brake pedal 3, and brake fluid enters a brake circuit 113 from a brake master cylinder 7. The controller controls a first redundant isolation valve 26, a second redundant isolation valve 27, a third redundant isolation valve 28, and a fourth redundant isolation valve 29 to be in a switched-off state. In this case, the redundant brake system 120 is required to provide braking forces for the brake wheel cylinders. The redundant brake system 120 controls a first wheel cylinder inlet valve 31, a second wheel cylinder inlet valve 32, a third wheel cylinder inlet valve 33, and a fourth wheel cylinder inlet valve 34 to be in a switched-on state, controls a wheel cylinder outlet valve 35 to be in a switched-off state, and controls a plunger pump assembly 36 to operate. The brake fluid from the first fluid storage container 6 passes through the plunger pump assembly 36, and enters a first brake wheel cylinder 22, a second brake wheel cylinder 23, a third brake wheel cylinder 24, and a fifth brake wheel cylinder 25 from the first wheel cylinder inlet valve 31, the second wheel cylinder inlet valve 32, the third wheel cylinder inlet valve 33, and the fourth wheel cylinder inlet valve 34, respectively, to provide braking forces for these brake wheel cylinders. In this case, the controller controls a second pedal feel simulator switch valve 44 to be in a switched-on state, and the brake fluid enters a second pedal feel simulator 45 in a second pedal feel simulation system 121 from a brake circuit 113, to feed back pedal feel information to the driver.

Figure 7:
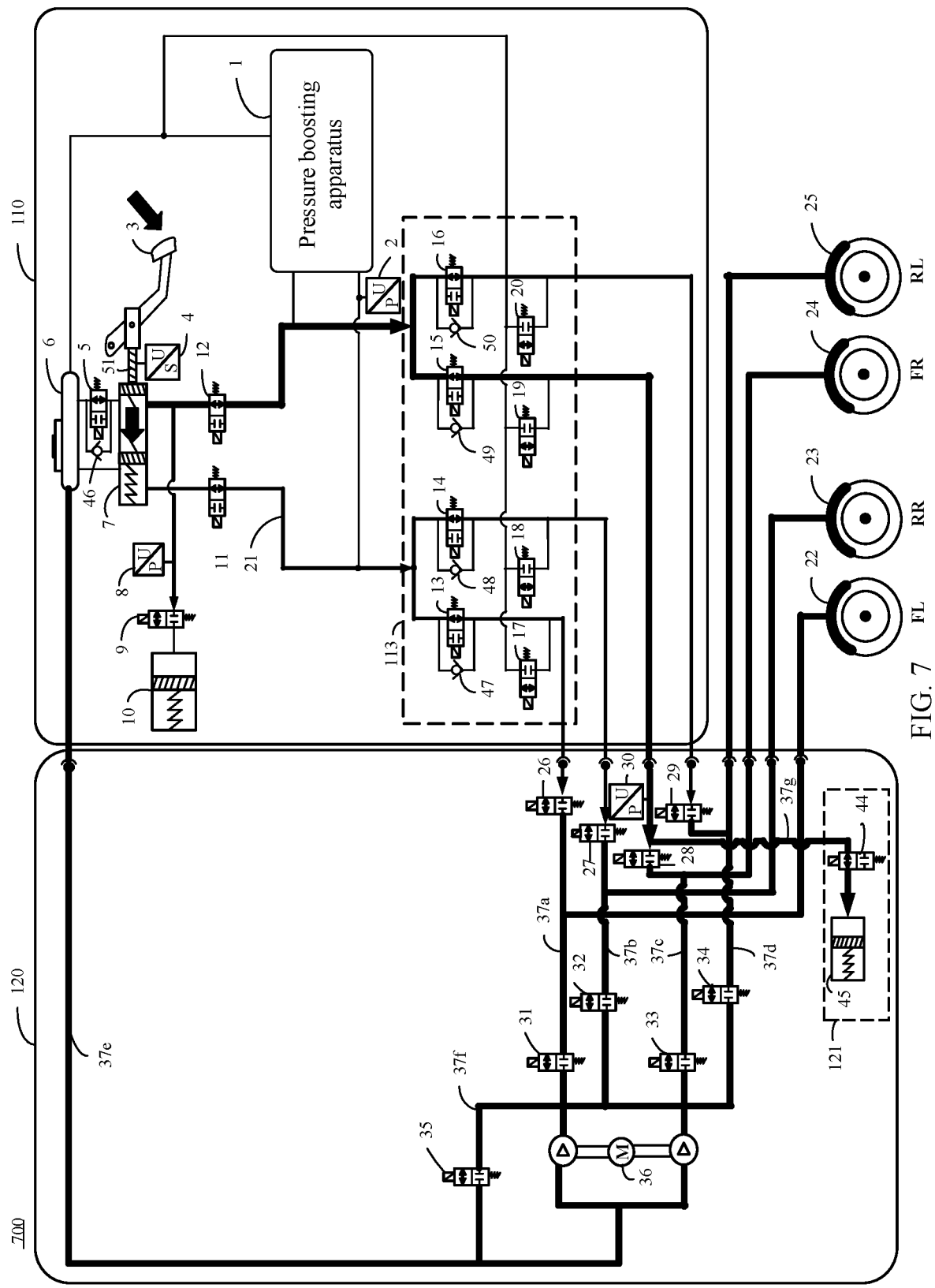
FIG. 7 is a schematic diagram of a pressure preservation process in a redundant braking mode according to an embodiment of this application.

Pressure preservation process in the redundant braking mode: FIG. 7 is a schematic diagram of a pressure preservation process in the redundant braking mode according to an embodiment of this application. When a master brake system fails, a controller controls a redundant brake system 120 to maintain braking forces for four brake wheel cylinders.

When the master brake system fails, the controller controls a wheel cylinder outlet valve 35 to be in a switched-off state, and the controller controls a first wheel cylinder inlet valve 31, a second wheel cylinder inlet valve 32, a third wheel cylinder inlet valve 33, and a fourth wheel cylinder inlet valve 34 to be in a switched-off state, and controls a first redundant isolation valve 26, a second redundant isolation valve 27, a third redundant isolation valve 28, and a fourth redundant isolation valve 29 to be in a switched-off state, and brake fluid does not flow in a redundant brake pipeline 37, to maintain braking forces of the first brake wheel cylinder 22, the second brake wheel cylinder 23, the third brake wheel cylinder 24, and the fourth brake wheel cylinder 25.

Figure 8:
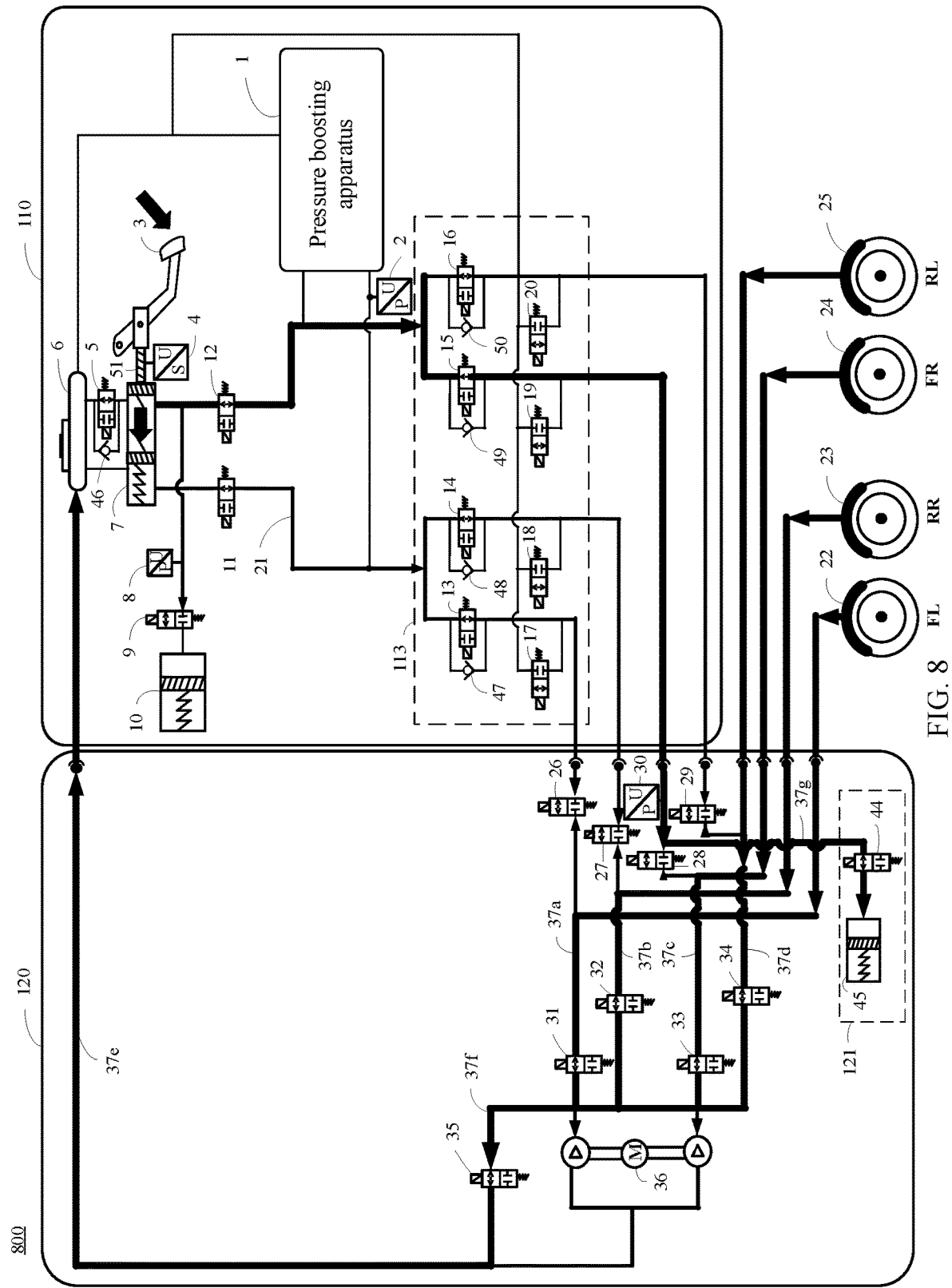
FIG. 8 is a schematic diagram of a depressurization process in a redundant braking mode according to an embodiment of this application.

Depressurization process in the redundant braking mode: FIG. 8 is a schematic diagram of a depressurization process in the redundant braking mode according to an embodiment of this application.

When a master brake system fails, a controller controls a wheel cylinder outlet valve 35 to be in a switched-on state, the controller controls a first wheel cylinder inlet valve 31, a second wheel cylinder inlet valve 32, a third wheel cylinder inlet valve 33, and a fourth wheel cylinder inlet valve 34 to be in a switched-on state, and the controller controls a first redundant isolation valve 26, a second redundant isolation valve 27, a third redundant isolation valve 28, and a fourth redundant isolation valve 29 to be in a switched-off state. Brake fluid flows out from a first brake wheel cylinder 22, a second brake wheel cylinder 23, a third brake wheel cylinder 24, and a fourth brake wheel cylinder 25, and flows back to a first fluid storage container 6 through the first wheel cylinder inlet valve 31, the second wheel cylinder inlet valve 32, the third wheel cylinder inlet valve 33, the fourth wheel cylinder inlet valve 34, and the wheel cylinder outlet valve 35, respectively, to reduce braking forces of the first brake wheel cylinder 22, the second brake wheel cylinder 23, the third brake wheel cylinder 24, and the fourth brake wheel cylinder 25.

In the solution of this application, the isolation valve and the wheel cylinder inlet valve for each brake wheel cylinder are disposed in the redundant brake system, so that when the master brake system fails, the redundant brake system can independently control each brake wheel cylinder, to implement function backup for the master brake system, thereby meeting the requirements for braking functions such as ABS/AEB/ESC/TCS of the vehicle, and further improving safety of the brake system. For example, when the brake system needs to perform depressurization in a redundant braking mode, if there is only one wheel cylinder outlet valve, this solution may implement time-sharing independent depressurization for all brake wheel cylinders. If there is a corresponding wheel cylinder outlet valve for each wheel cylinder, this solution may implement independent depressurization for all brake wheel cylinders at the same time. In addition, the redundant brake system 120 in the brake-by-wire system may further feed back pedal feel information to the driver. When the master brake system fails, pedal feel of the driver can still be ensured, thereby bringing more stable and comfortable driving experience to the driver. In addition, the independent pedal feel simulator in the redundant brake system enables the redundant brake system to be more completely decoupled from the master brake system, thereby facilitating subsequent maintenance and replacement and facilitating installation.

Figure 11:
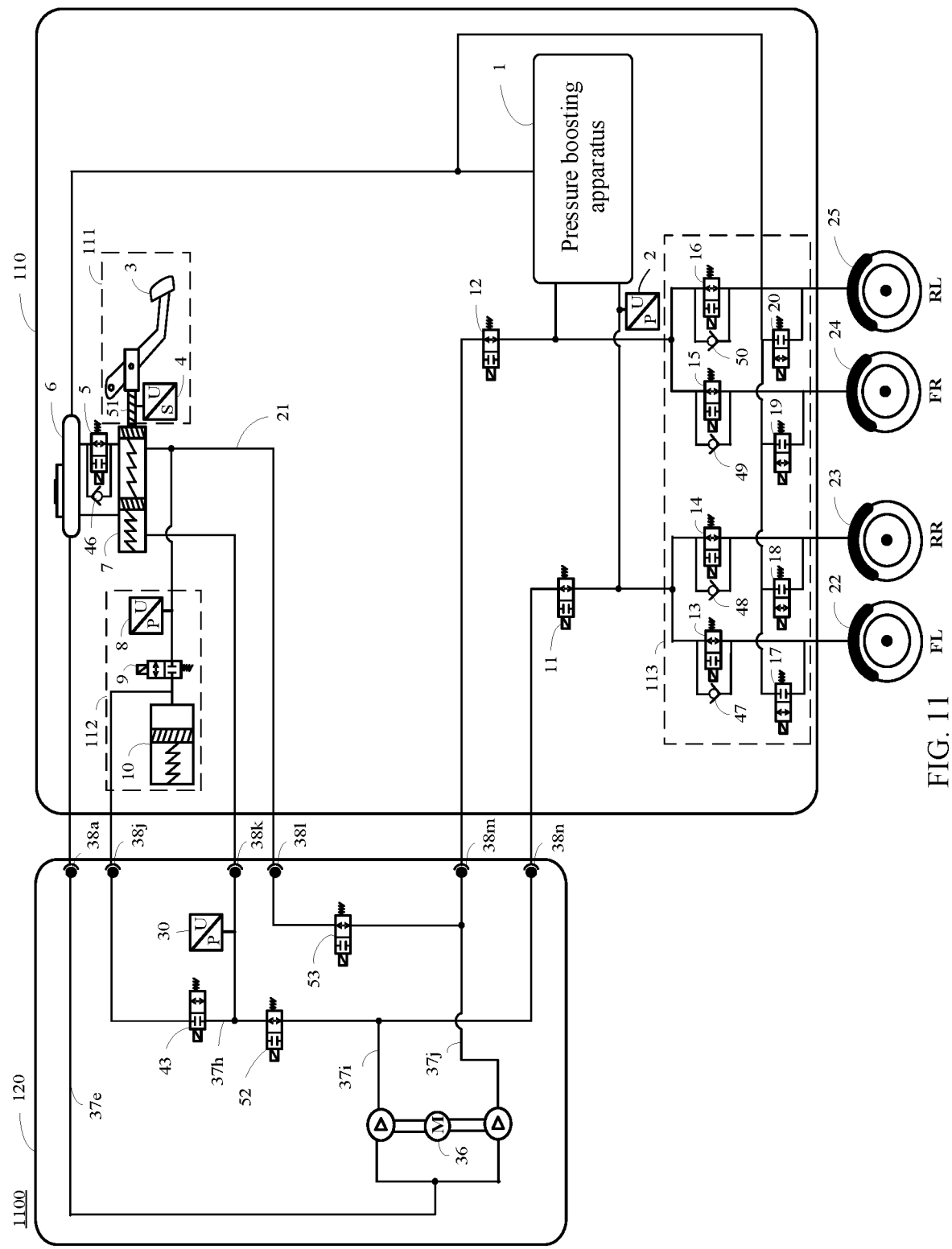
FIG. 11 is a schematic diagram of still another brake-by-wire system according to an embodiment of this application.

FIG. 11 is a schematic diagram of still another brake-by-wire system according to an embodiment of this application. As shown in FIG. 11, the brake-by-wire system 1100 may include a master brake system 110, a redundant brake system 120, and a controller. The brake-by-wire system 100 may also be a first brake wheel cylinder 22, a second brake wheel cylinder 23, a third brake wheel cylinder 24, and a fourth brake wheel cylinder 25.

It should be understood that the redundant brake system 120 may be used as an example of the first brake subsystem, and a name of the first brake subsystem 120 is not limited in this application.

It should be understood that the brake system in this application further includes at least one controller, for example, a controller of the master brake system and a controller of the redundant brake system, which are not shown in the figure. The brake system may further control different components according to different braking requirements through a controller. For example, in a redundant operating mode, the controller may control components of the redundant brake system 120, to implement a corresponding braking function. Various individual components in the brake system may also have their own sub-controllers, and these controllers can communicate with each other and operate together. The controller receives measurement or detection signals from various sensors, such as an environment condition, a driver input, and a brake system status, and controls braking features of the brake system through calculation and judgment.

It should be understood that the brake system in this application may not include a brake wheel cylinder, that is, may include only the master brake system 110 and the redundant brake system 120; or may include a brake wheel cylinder, that is, the master brake system 110, the redundant brake system 120, and the brake wheel cylinder all belong to the brake system.

It should be understood that the at least one brake wheel cylinder (22, 23, 24, 25) in this application may be the first brake wheel cylinder 22, the second brake wheel cylinder 23, the third brake wheel cylinder 24, and the fourth brake wheel cylinder 25 described above.

The master brake system 110 may include a pressure boosting apparatus 1, a mechanical brake input apparatus 111, a first pedal feel simulation system 112, a brake circuit 113, a second pressure sensor 2, a master cylinder inlet valve 5, a one-way valve 46, a first fluid storage container 6, a brake master cylinder 7, a first wheel cylinder isolation valve 11, a second wheel cylinder isolation valve 12, and a master brake pipeline 21.

In a possible implementation, the mechanical brake input apparatus 111 includes a brake pedal 3, a pedal displacement sensor 4, and a push rod 51. It should be understood that when a driver steps on the brake pedal 3, the brake pedal is connected to the push rod 51, and the push rod 51 is pushed forward, so that pressures of a first hydraulic chamber and a second hydraulic chamber of the brake master cylinder 7 increase, and pressures of the brake fluid (hydraulic fluid) in the first fluid storage container 6 increase after passing through the master brake pipeline, the one-way valve 46, and the master cylinder inlet valve 5 and entering the first hydraulic chamber and the second hydraulic chamber of the brake master cylinder 7. The brake fluid then pushes the first hydraulic chamber and the second hydraulic chamber of the brake master cylinder 7 into the master brake pipeline 21 from the master brake, passes through the redundant brake system 120, and then passes through the first wheel cylinder isolation valve 11 and the second wheel cylinder isolation valve 12 to enter the brake circuit 113. The pedal displacement sensor 4 is configured to measure displacement of the push rod 51 relative to the brake master cylinder 7. It should be understood that the master brake pipeline 21 includes pipelines in the master brake system. For brief description, each pipeline in the master brake pipeline 21 is not described in this embodiment of this application.

It should be understood that the first pedal feel simulator 112 in FIG. 11 is the same as that in FIG. 1(*a*). To avoid repetition, details are not described herein again. Similarly, the brake circuit 113 in FIG. 11 is also described by using an X-shaped brake circuit as an example. To avoid repetition, details are not described herein again. For detailed description, refer to the brake circuit 113 in FIG. 1(*a*).

The redundant brake system 120 may include a plunger pump assembly 36, a fifth redundant isolation valve 52, a sixth redundant isolation valve 53, a first pressure sensor 30, a redundant brake pipeline 37, and a brake system plug-in connector 38.

A second port of the fifth redundant isolation valve 52 is connected to the plunger pump assembly 36 through a ninth redundant brake pipeline 37*i*, and the ninth redundant brake pipeline 37*i* provides braking forces for a first brake wheel cylinder 22 and a second brake wheel cylinder 23. A second port of the sixth redundant isolation valve 53 is connected to the plunger pump assembly 36 through a tenth redundant brake pipeline 37*j*, and the tenth redundant brake pipeline 37*j* provides braking forces for a third brake wheel cylinder 24 and a fourth brake wheel cylinder 25. The first port of the fifth redundant isolation valve 52 is connected to a first pressure sensor 30 through an eighth redundant brake pipeline 37*h*. The redundant brake pipeline 37 includes a fifth redundant brake pipeline 37*e*, the eighth redundant brake pipeline 37*h*, the ninth redundant brake pipeline 37*i*, and the tenth redundant brake pipeline 37*j*. The plunger pump assembly 36 is connected to the first brake system plug-in connector 38*a* through the fifth redundant brake pipeline 37*e*.

The brake system plug-in connectors 38 include the first brake system plug-in connector 38*a*, a tenth brake system plug-in connector 38*j*, an eleventh brake system plug-in connector 38*k*, a twelfth brake system plug-in connector 38*l*, a thirteenth brake system plug-in connector 38*m*, and a fourteenth brake system plug-in connector 38*n*.

A redundant brake system 120 may further include a first pedal feel simulator switch valve 43. The first pedal feel simulator switch valve 43 is connected to the first port of the fifth redundant isolation valve 52 through the eighth redundant brake pipeline 37*h*, where the first pedal feel simulator switch valve 43 is configured to feed back pedal feel information to the driver when the master brake system 110 fails; and the first pressure sensor 30 is connected to the first port of the fifth redundant isolation valve 52.

A connection relationship between the master brake system 110 and the redundant brake system 120 in the brake-by-wire system shown in FIG. 11 is as follows: The first fluid storage container 6 is connected to the plunger pump assembly 36 in the redundant brake system 120 through the brake system plug-in connector 38*a*; the master cylinder 7 is connected to the first port of the fifth redundant isolation valve 52 in the redundant brake system through the eleventh brake system plug-in connector 38*k*; the master cylinder 7 is connected to the first port of the sixth redundant isolation valve 53 in the redundant brake system through the twelfth brake system plug-in connector 38*l*; the first port of the first wheel cylinder isolation valve 11 is connected to the second port of the fifth redundant isolation valve 52 through the fourteenth brake system plug-in connector 38n; the first port of the second wheel cylinder isolation valve 11 is connected to the second port of the sixth redundant isolation valve 53 through the thirteenth brake system plug-in connector 38m; and the first port of the first pedal feel simulator 10 is connected to the second port of the first pedal feel simulator switch valve 43 in the redundant brake system 120 through the tenth brake system plug-in connector 38j.

In this embodiment of this application, the brake-by-wire system in FIG. 11 includes three operating modes: a manual braking mode, a pressure boosting apparatus braking mode, and a redundant braking mode. The following describes in detail the redundant braking mode of the brake-by-wire system in FIG. 11 with reference to FIG. 22.

Figure 22:
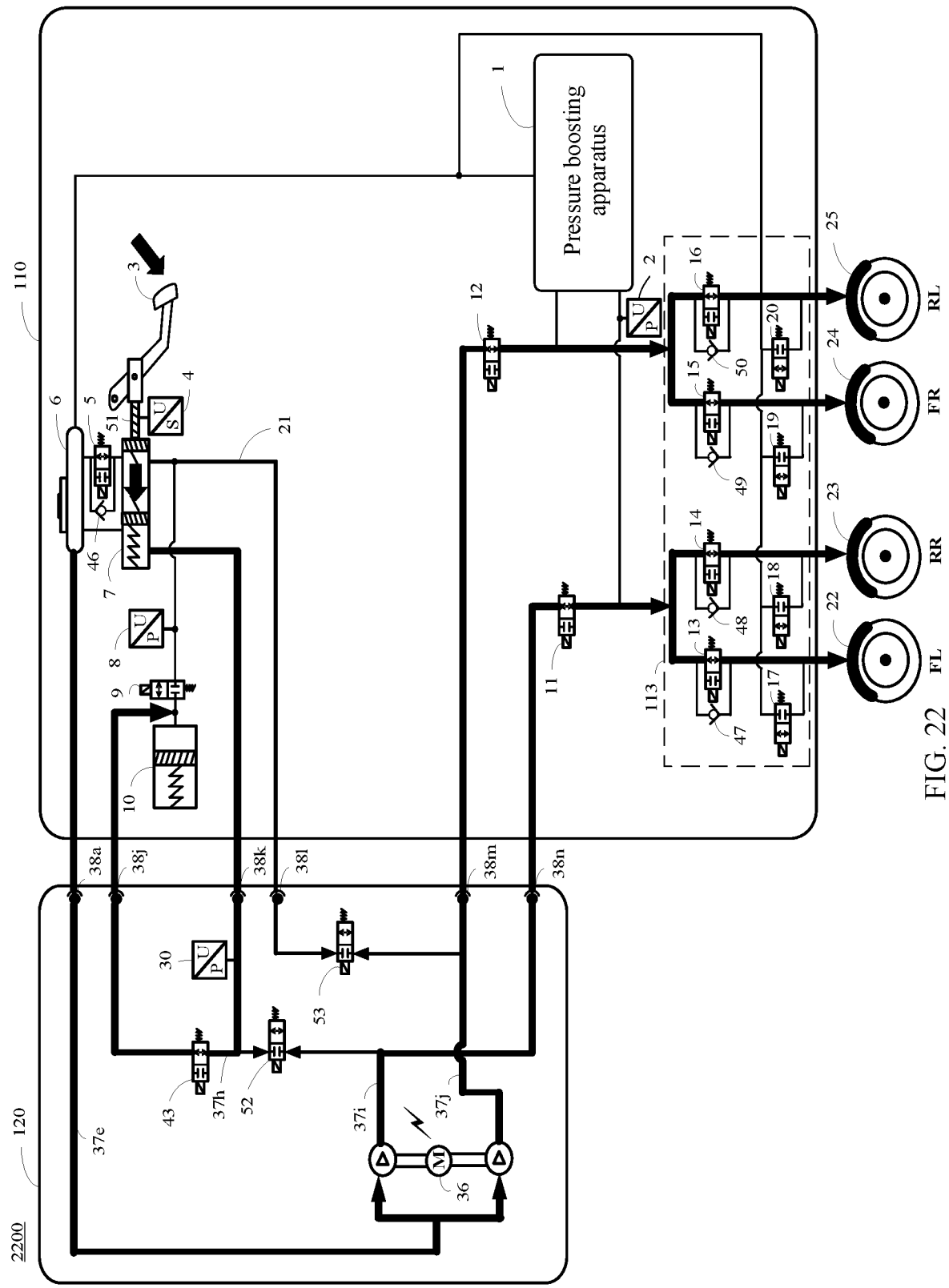
FIG. 22 is a schematic diagram of still another pressure boosting process in a redundant braking mode according to an embodiment of this application.

FIG. 22 is a schematic diagram of still another pressure boosting process in the redundant braking mode according to an embodiment of this application. When a master brake system fails, a controller controls a redundant brake system 120 to provide braking forces for four brake wheel cylinders.

When the master brake system fails, a driver steps on a brake pedal 3, and brake fluid enters the redundant brake system 120 from the brake master cylinder 7 through the master brake pipeline 21. The controller controls the fifth redundant isolation valve 52 and the sixth redundant isolation valve 53 to be in a switched-off state. In this case, the brake fluid cannot enter the brake wheel cylinder through the master brake system, and the redundant brake system 120 is required to provide braking forces for the brake wheel cylinders. The controller in the redundant brake system 120 controls the plunger pump assembly 36 to operate. The brake fluid from the first fluid storage container 6 passes through the plunger pump assembly 36, enters a brake circuit 113 through a first wheel cylinder isolation valve 11 and a second wheel cylinder isolation valve 12 in the master brake system 110, respectively, and enters a first brake wheel cylinder 22, a second brake wheel cylinder 23, a third brake wheel cylinder 24, and a fifth brake wheel cylinder 25, respectively, to provide braking forces for these brake wheel cylinders. Similarly, a first pedal feel simulator switch valve 43 in the redundant brake system is in a switched-on state, and the brake fluid enters a first pedal feel simulator 10 in a master brake system 110 from the brake master cylinder 7 through the first pedal feel simulator switch valve 43, and feeds back pedal feel information to the driver.

It should be noted that the redundant brake system 120 in the brake-by-wire system shown in FIG. 11 is in a low-pressure state. When the brake-by-wire system is in a pressure boosting mode, the redundant brake system 120 is located between the brake master cylinder 7 and a pressure boosting apparatus 1 in the master brake system 110, and the pressure boosting apparatus 1 does not pass through the redundant brake system 120.

Figure 12:
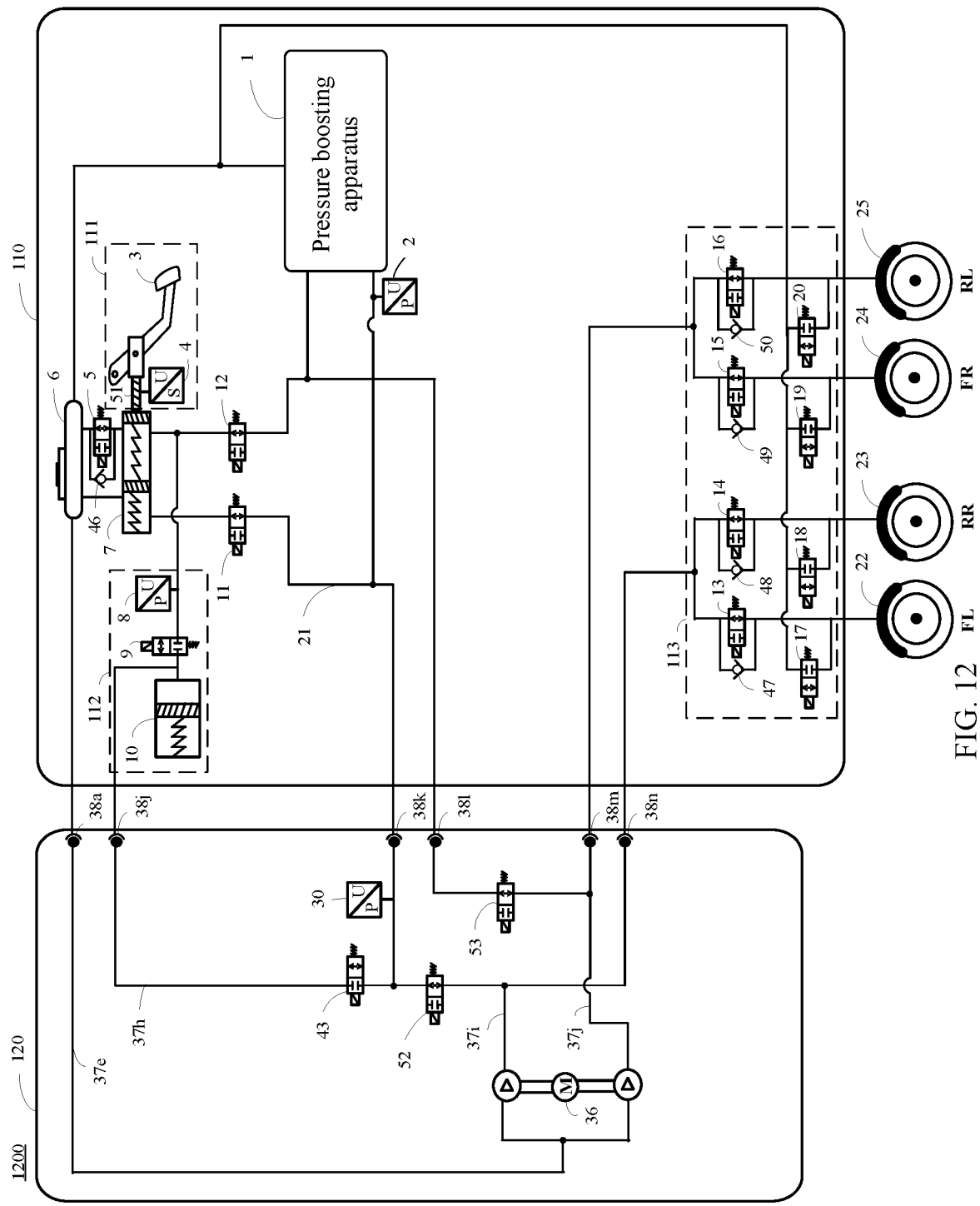
FIG. 12 is a schematic diagram of still another brake-by-wire system according to an embodiment of this application.

The redundant brake system 120 in the brake-by-wire system shown in FIG. 11 may be in a low-pressure state, or may be in a high-pressure state, as shown in FIG. 12. FIG. 12 is a schematic diagram of another brake-by-wire system according to an embodiment of this application. The redundant brake system 120 in the brake-by-wire system shown in FIG. 12 is in a high-pressure state. When the brake-by-wire system is in a pressure boosting mode, the redundant brake system 120 is located between the master brake system 110 and the pressure boosting apparatus 1 and the first control valve, and the pressure boosting apparatus 1 passes through the redundant brake system 120.

The brake-by-wire system shown in FIG. 12 also includes three operating modes: a manual braking mode, a pressure boosting apparatus braking mode, and a redundant braking mode. An operating principle in the redundant braking mode is similar to that shown in FIG. 22. To avoid repetition, details are not described herein again.

In the solution of this application, two isolation valves are disposed in the redundant brake system, so that when the master brake system fails, the redundant brake system can control each brake wheel cylinder, to implement function backup for the master brake system, meet a braking function requirement of a vehicle such as ABS/AEB/ESC/TCS, and further improve safety of the brake system. In addition, the redundant brake system 120 in the brake-by-wire system may further feed back pedal feel information to a driver, so that when the master brake system fails, the driver's pedal feeling can still be ensured, thereby bringing more stable and comfortable driving experience to the driver.

Figure 13:
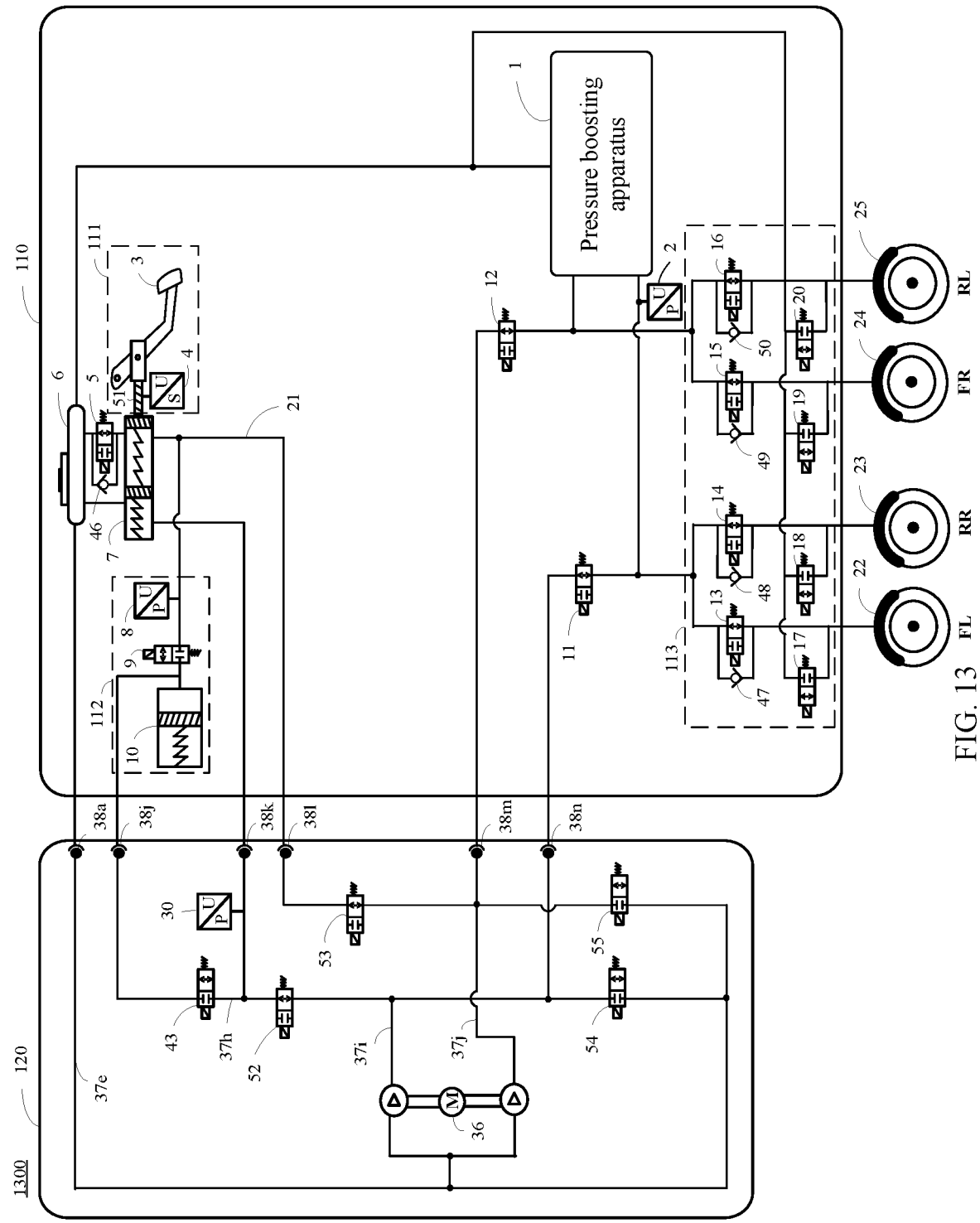
FIG. 13 is a schematic diagram of still another brake-by-wire system according to an embodiment of this application.

FIG. 13 is a schematic diagram of still another brake-by-wire system according to an embodiment of this application. As shown in FIG. 13, the brake-by-wire system 100 includes a master brake system 110, a redundant brake system 120, a first brake wheel cylinder 22, a second brake wheel cylinder 23, a third brake wheel cylinder 24, and a fourth brake wheel cylinder 25.

A structure and functions of the master brake system 110 in FIG. 13 are the same as those of the master brake system 110 in FIG. 11. To avoid repetition, details are not described herein again.

The redundant brake system 120 may include a plunger pump assembly 36, a fifth redundant isolation valve 52, a sixth redundant isolation valve 53, a first pressure sensor 30, a redundant brake pipeline 37, and a brake system plug-in connector 38.

A second port of the fifth redundant isolation valve 52 is connected to the plunger pump assembly 36 through a ninth redundant brake pipeline 37i, and the ninth redundant brake pipeline 37i provides braking forces for a first brake wheel cylinder 22 and a second brake wheel cylinder 23. A second port of the sixth redundant isolation valve 53 is connected to the plunger pump assembly 36 through a tenth redundant brake pipeline 37j, and the tenth redundant brake pipeline 37j provides braking forces for a third brake wheel cylinder 24 and a fourth brake wheel cylinder 25. The first port of the fifth redundant isolation valve 52 is connected to a first pressure sensor 30 through an eighth redundant brake pipeline 37h. The redundant brake pipeline 37 includes a fifth redundant brake pipeline 37e, the eighth redundant brake pipeline 37h, the ninth redundant brake pipeline 37i, and the tenth redundant brake pipeline 37j. The plunger pump assembly 36 is connected to the first brake system plug-in connector 38a through the fifth redundant brake pipeline 37e.

The brake system plug-in connectors 38 include the first brake system plug-in connector 38a, a tenth brake system plug-in connector 38j, an eleventh brake system plug-in connector 38k, a twelfth brake system plug-in connector 38l, a thirteenth brake system plug-in connector 38m, and a fourteenth brake system plug-in connector 38n.

A redundant brake system 120 may further include a first pedal feel simulator switch valve 43. The first pedal feel simulator switch valve 43 is connected to the first port of the fifth redundant isolation valve 52 through the eighth redundant brake pipeline 37h, where the first pedal feel simulator switch valve 43 is configured to feed back pedal feel information to the driver when the master brake system 110 fails; and the first pressure sensor 30 is connected to the first port of the fifth redundant isolation valve 52.

The redundant brake system 120 may further include a fifth wheel cylinder outlet valve 54 and a sixth wheel cylinder outlet valve 55. A second port of the fifth wheel cylinder outlet valve 54 is connected to a second port of the fifth redundant isolation valve 52 through the ninth redundant brake pipeline 37i, and a first port of the fifth wheel cylinder outlet valve 54 is connected to the first brake system plug-in connector 38a through the fifth redundant brake pipeline 37e. A second port of the sixth wheel cylinder outlet valve 55 is connected to a second port of a sixth redundant isolation valve 53 through the tenth redundant brake pipeline 37j, and a first port of the sixth wheel cylinder outlet valve 55 is connected to the first brake system plug-in connector 38a through the fifth redundant brake pipeline 37e.

It should be noted that, in this application, when the redundant brake system is in the depressurization mode, the first port that is of the control valve and that the brake fluid needs to pass through to flow back to the fluid storage reservoir is a second port. Therefore, in FIG. 13, upper ends of the fifth wheel cylinder outlet valve 54 and the sixth wheel cylinder outlet valve 55 are the second ports, and lower ends of the fifth wheel cylinder outlet valve 54 and the sixth wheel cylinder outlet valve 55 are the first ports.

A connection relationship between the master brake system 110 and the redundant brake system 120 in the brake-by-wire system shown in FIG. 13 is the same as that in FIG. 11, and details are not described herein again.

As described above, the brake-by-wire system in FIG. 13 in this embodiment of this application includes three operating modes: a manual braking mode, a pressure boosting apparatus braking mode, and a redundant braking mode. The following describes in detail a pressure boosting process and a depressurization process in the redundant braking mode with reference to FIG. 23 and FIG. 24 for the redundant braking mode of the brake-by-wire system in FIG. 13.

Figure 23:
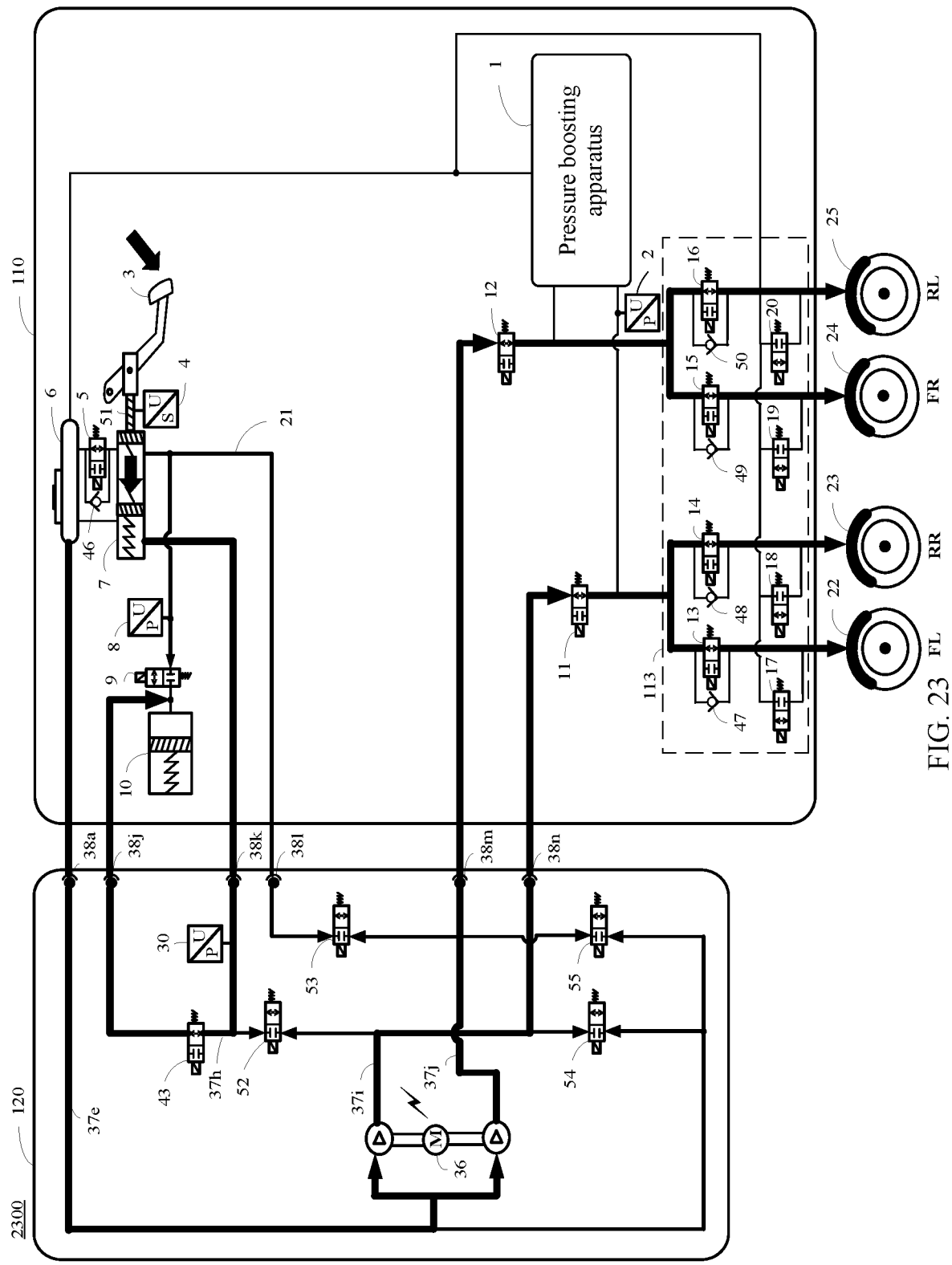
FIG. 23 is a schematic diagram of still another pressure boosting process in a redundant braking mode according to an embodiment of this application.

Pressure boosting process in the redundant braking mode: FIG. 23 is a schematic diagram of another pressure boosting process in the redundant braking mode provided in FIG. 13 according to an embodiment of this application. The pressure boosting process in FIG. 23 is similar to the pressure boosting process in FIG. 22, and a difference lies in that the redundant brake system 120 in FIG. 23 controls the fifth wheel cylinder outlet valve 54 and the sixth wheel cylinder outlet valve 55 to be in a switched-off state, to prevent the brake fluid from flowing back from the plunger pump 36 to the first fluid storage container 6. In addition, the rest of the pressure boosting process is similar to that in FIG. 22. Details are not described herein again, and reference may be made to the pressure boosting process in FIG. 22.

Figure 24:
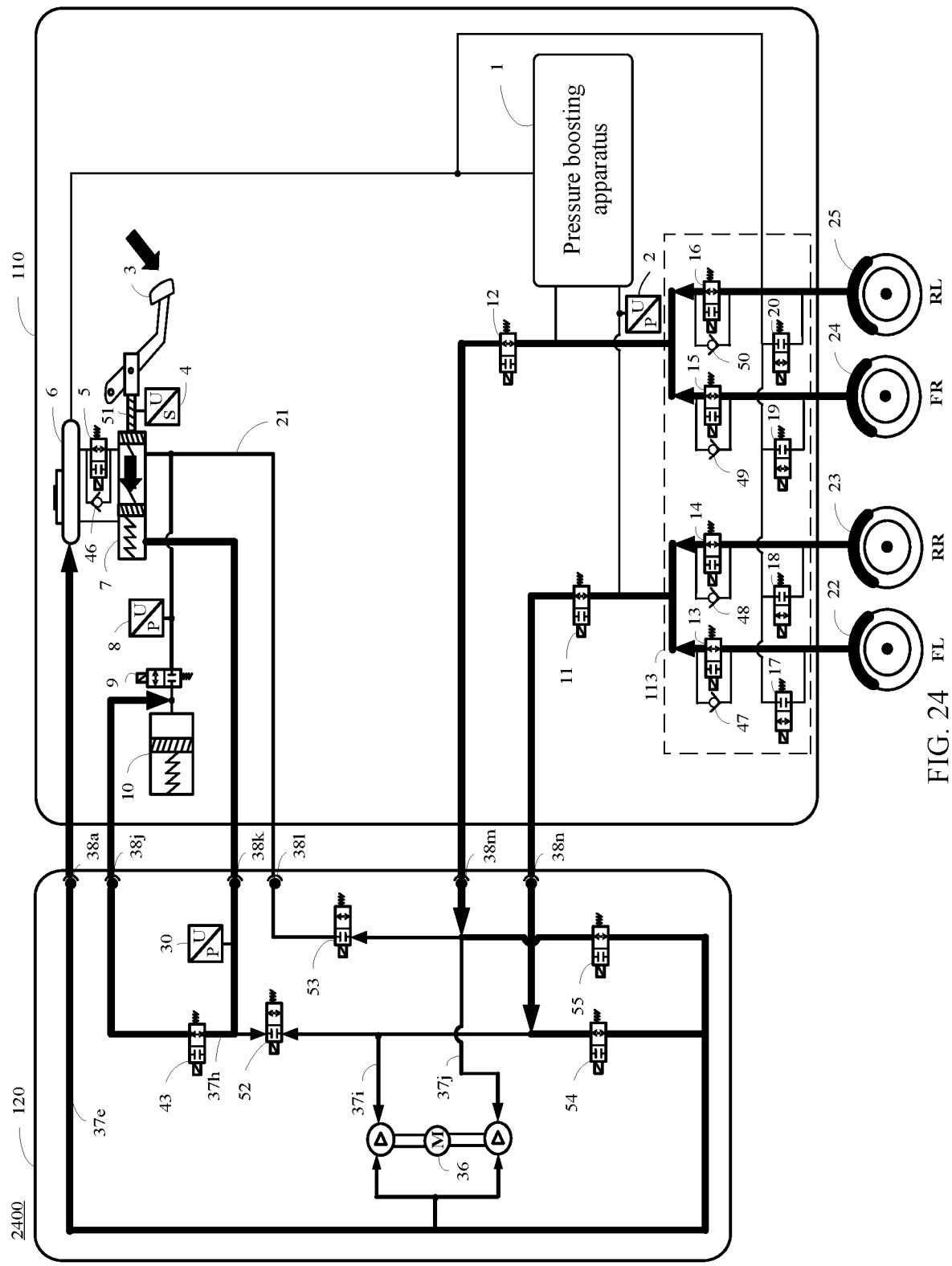
FIG. 24 is a schematic diagram of another depressurization process in a redundant braking mode according to an embodiment of this application.

Depressurization process in the redundant braking mode: FIG. 24 is a schematic diagram of another depressurization process in the redundant braking mode according to an embodiment of this application.

When a master brake system fails, a controller controls a fifth wheel cylinder outlet valve 54 and a sixth wheel cylinder outlet valve 55 to be in a switched-on state, and controls a fifth redundant isolation valve 52 and a sixth redundant isolation valve 53 to be in a switched-off state, and brake fluid passes through a first wheel cylinder isolation valve 11 and a second wheel cylinder isolation valve 12 from a first brake wheel cylinder 22, a second brake wheel cylinder 23, a third brake wheel cylinder 24, and a fourth brake wheel cylinder 25. After passing through the fifth wheel cylinder outlet valve 54 and the sixth wheel cylinder outlet valve 55, the fluid flows back to a first fluid storage container 6, to reduce braking forces of the first brake wheel cylinder 22, the second brake wheel cylinder 23, the third brake wheel cylinder 24, and the fourth brake wheel cylinder 25.

Figure 14:
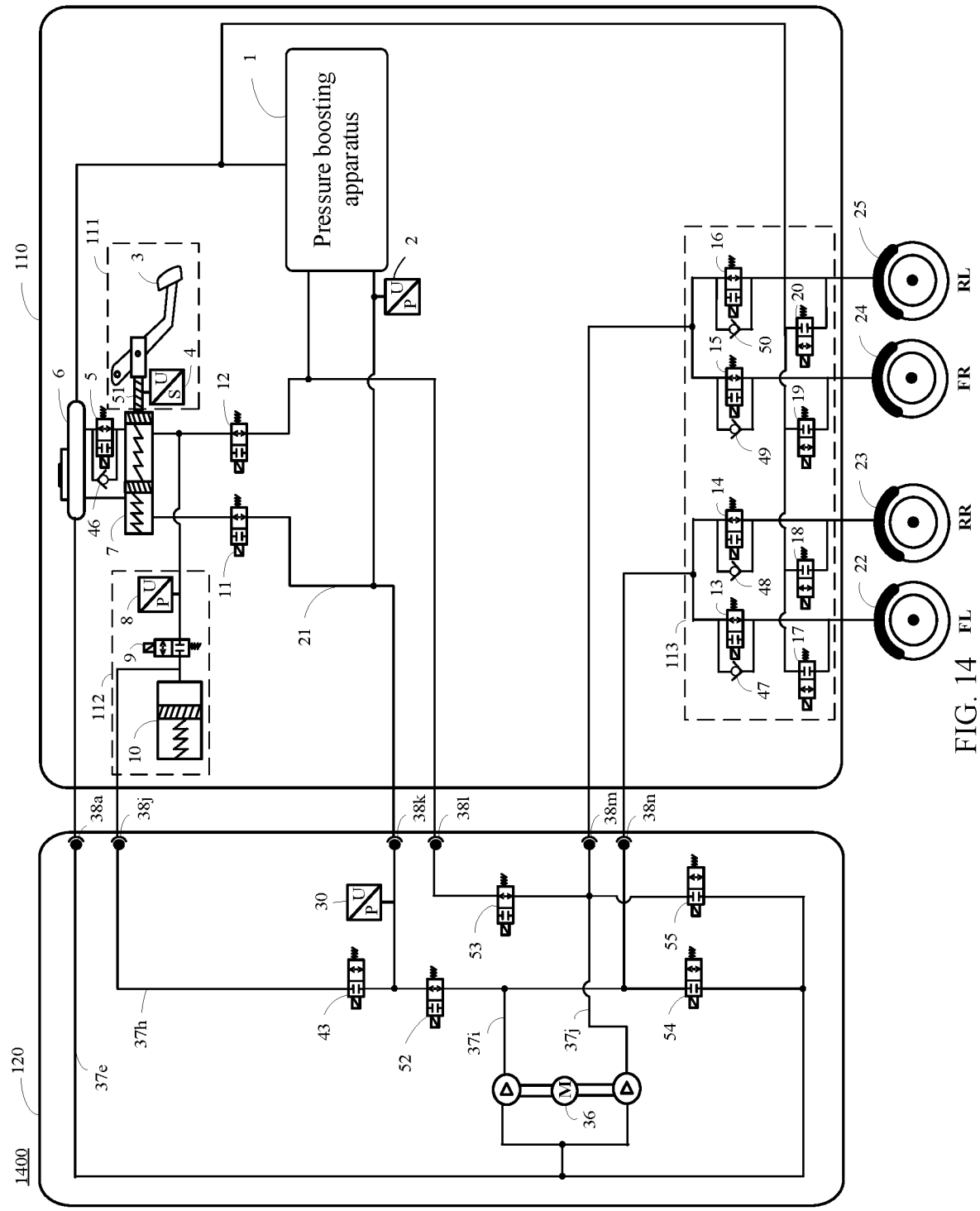
FIG. 14 is a schematic diagram of still another brake-by-wire system according to an embodiment of this application.

It should be noted that the redundant brake system 120 in the brake-by-wire system shown in FIG. 13 may be in a low-pressure state, or may be in a high-pressure state, as shown in FIG. 14. FIG. 14 is a schematic diagram of still another brake-by-wire system according to an embodiment of this application. For a detailed explanation of whether the redundant brake system is in a low-pressure state or a high-pressure state, refer to FIG. 11 and FIG. 12. Details are not described herein again. Similarly, the brake-by-wire system shown in FIG. 14 also includes three operating modes: a manual braking mode, a pressure boosting apparatus braking mode, and a redundant braking mode. An operating principle in the redundant braking mode is similar to that shown in FIG. 23 and FIG. 24. To avoid repetition, details are not described herein again.

In the solution of this application, a wheel cylinder outlet valve is added to a redundant brake system, so that when a master brake system fails and a brake wheel cylinder needs to be depressurized, for example, when an ABS braking requirement is met, the controller can effectively reduce braking forces of the four brake wheel cylinders, thereby further improving safety of the brake system. Similarly, in this solution, the redundant brake system 120 in the brake-by-wire system may further feed back pedal feel information to the driver. When the master brake system fails, pedal feel of the driver can still be ensured, thereby bringing more stable and comfortable driving experience to the driver. In addition, a quantity of solenoid valves in the redundant brake system is small, which can effectively control the four brake wheel cylinders at low costs.

Figure 15:
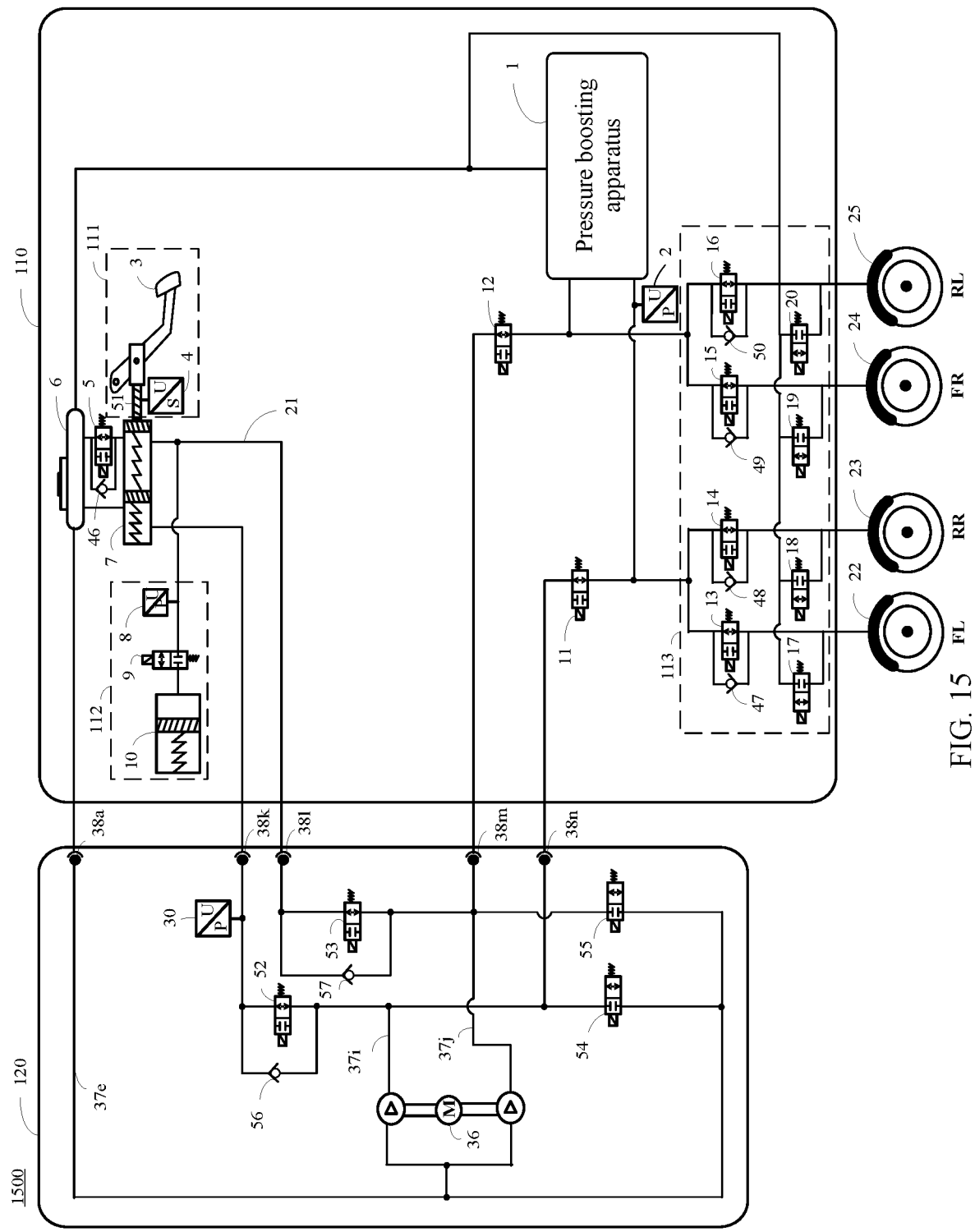
FIG. 15 is a schematic diagram of still another brake-by-wire system according to an embodiment of this application.

FIG. 15 is a schematic diagram of still another brake-by-wire system according to an embodiment of this application. As shown in FIG. 15, the brake-by-wire system 100 includes a master brake system 110, a redundant brake system 120, a first brake wheel cylinder 22, a second brake wheel cylinder 23, a third brake wheel cylinder 24, and a fourth brake wheel cylinder 25.

A structure and functions of the master brake system 110 in FIG. 15 are the same as those of the master brake system 110 in FIG. 11. To avoid repetition, details are not described herein again.

The redundant brake system 120 may include a plunger pump assembly 36, a fifth redundant isolation valve 52, a sixth redundant isolation valve 53, a first pressure sensor 30, a redundant brake pipeline 37, and a brake system plug-in connector 38.

A second port of the fifth redundant isolation valve 52 is connected to the plunger pump assembly 36 through a ninth redundant brake pipeline 37i, and the ninth redundant brake pipeline 37i provides braking forces for a first brake wheel cylinder 22 and a second brake wheel cylinder 23. A second port of the sixth redundant isolation valve 53 is connected to the plunger pump assembly 36 through a tenth redundant brake pipeline 37j, and the tenth redundant brake pipeline 37j provides braking forces for a third brake wheel cylinder 24 and a fourth brake wheel cylinder 25. The first port of the fifth redundant isolation valve 52 is connected to a first pressure sensor 30 through an eighth redundant brake pipeline 37h. The redundant brake pipeline 37 includes a fifth redundant brake pipeline 37e, the eighth redundant brake pipeline 37h, the ninth redundant brake pipeline 37i, and the tenth redundant brake pipeline 37j. The plunger pump assembly 36 is connected to the first brake system plug-in connector 38a through the fifth redundant brake pipeline 37e.

The brake system plug-in connectors 38 include the first brake system plug-in connector 38a, an eleventh brake system plug-in connector 38k, a twelfth brake system plug-in connector 38l, a thirteenth brake system plug-in connector 38m, and a fourteenth brake system plug-in connector 38n.

The redundant brake system 120 may further include a fifth wheel cylinder outlet valve 54 and a sixth wheel cylinder outlet valve 55. A second port of the fifth wheel cylinder outlet valve 54 is connected to a second port of the fifth redundant isolation valve 52 through the ninth redundant brake pipeline 37i, and a first port of the fifth wheel cylinder outlet valve 54 is connected to the first brake system plug-in connector 38a through the fifth redundant brake pipeline 37e. A second port of the sixth wheel cylinder outlet valve 55 is connected to a second port of a sixth redundant isolation valve 53 through the tenth redundant brake pipeline 37j, and a first port of the sixth wheel cylinder outlet valve 55 is connected to the first brake system plug-in connector 38a through the fifth redundant brake pipeline 37e.

The redundant brake system 120 may further include a ninth one-way valve 56 and a tenth one-way valve 57, where the ninth one-way valve 56 is connected in parallel to the fifth redundant isolation valve 52, and the tenth one-way valve 57 is connected in parallel to the sixth redundant isolation valve 53.

A connection relationship between the master brake system 110 and the redundant brake system 120 in the brake-by-wire system shown in FIG. 15 is as follows: The first fluid storage container 6 is connected to the plunger pump assembly 36 in the redundant brake system 120 through the brake system plug-in connector 38a; the master cylinder 7 is connected to the first port of the fifth redundant isolation valve 52 in the redundant brake system through the eleventh brake system plug-in connector 38k; the master cylinder 7 is connected to the first port of the sixth redundant isolation valve 53 in the redundant brake system through the twelfth brake system plug-in connector 38l; the first port of the first wheel cylinder isolation valve 11 is connected to the second port of the fifth redundant isolation valve 52 through the fourteenth brake system plug-in connector 38n; and the first port of the second wheel cylinder isolation valve 11 is connected to the second port of the sixth redundant isolation valve 53 through the thirteenth brake system plug-in connector 38m.

In this embodiment of this application, the brake-by-wire system in FIG. 15 includes three operating modes: a manual braking mode, a pressure boosting apparatus braking mode, and a redundant braking mode. The following describes in detail the redundant braking mode of the brake-by-wire system in FIG. 15 with reference to FIG. 25.

Figure 25:
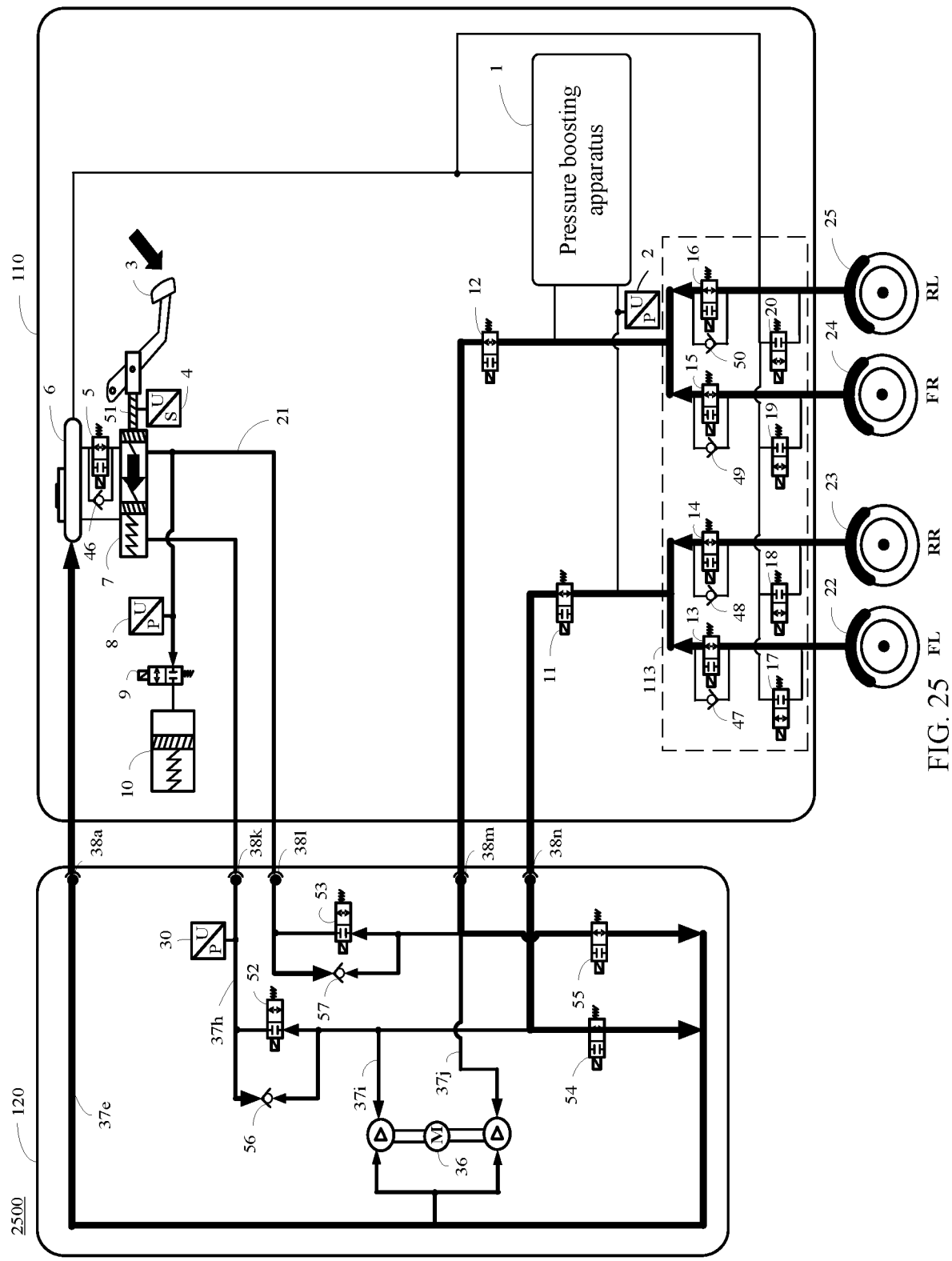
FIG. 25 is a schematic diagram of still another depressurization process in a redundant braking mode according to an embodiment of this application.

FIG. 25 is a schematic diagram of still another depressurization process in the redundant braking mode according to an embodiment of this application. When a master brake system fails, a controller controls a redundant brake system 120 to reduce braking forces of four brake wheel cylinders.

When a master brake system fails, a controller controls a fifth wheel cylinder outlet valve 54 and a sixth wheel cylinder outlet valve 55 to be in a switched-on state, and controls a fifth redundant isolation valve 52 and a sixth redundant isolation valve 53 to be in a switched-off state, and brake fluid passes through a first wheel cylinder isolation valve 11 and a second wheel cylinder isolation valve 12 from a first brake wheel cylinder 22, a second brake wheel cylinder 23, a third brake wheel cylinder 24, and a fourth brake wheel cylinder 25. After passing through the fifth wheel cylinder outlet valve 54 and the sixth wheel cylinder outlet valve 55, the fluid flows back to a first fluid storage container 6, to reduce braking forces of the first brake wheel cylinder 22, the second brake wheel cylinder 23, the third brake wheel cylinder 24, and the fourth brake wheel cylinder 25. A ninth one-way valve 56 and a tenth one-way valve 57 can isolate the brake fluid from flowing back to a master cylinder 7.

It should be noted that, when the master brake system fails, and the redundant brake system 120 needs to be used to provide braking forces for the four brake wheel cylinders, because the controller controls the fifth redundant isolation valve 52 and the sixth redundant isolation valve 53 to be in a switched-off state, when the driver steps on the brake pedal 3, the ninth one-way valve 56 and the tenth one-way valve 57 may be opened, and a small amount of brake fluid may flow out of the brake master cylinder 7. This avoids that because the fifth redundant isolation valve 52 and the sixth redundant isolation valve 53 in the redundant brake system are in a switched-off state, the brake fluid cannot flow in the brake master cylinder 7 and the master brake pipeline 21, so that the driver cannot step on the brake pedal 3.

Figure 16:
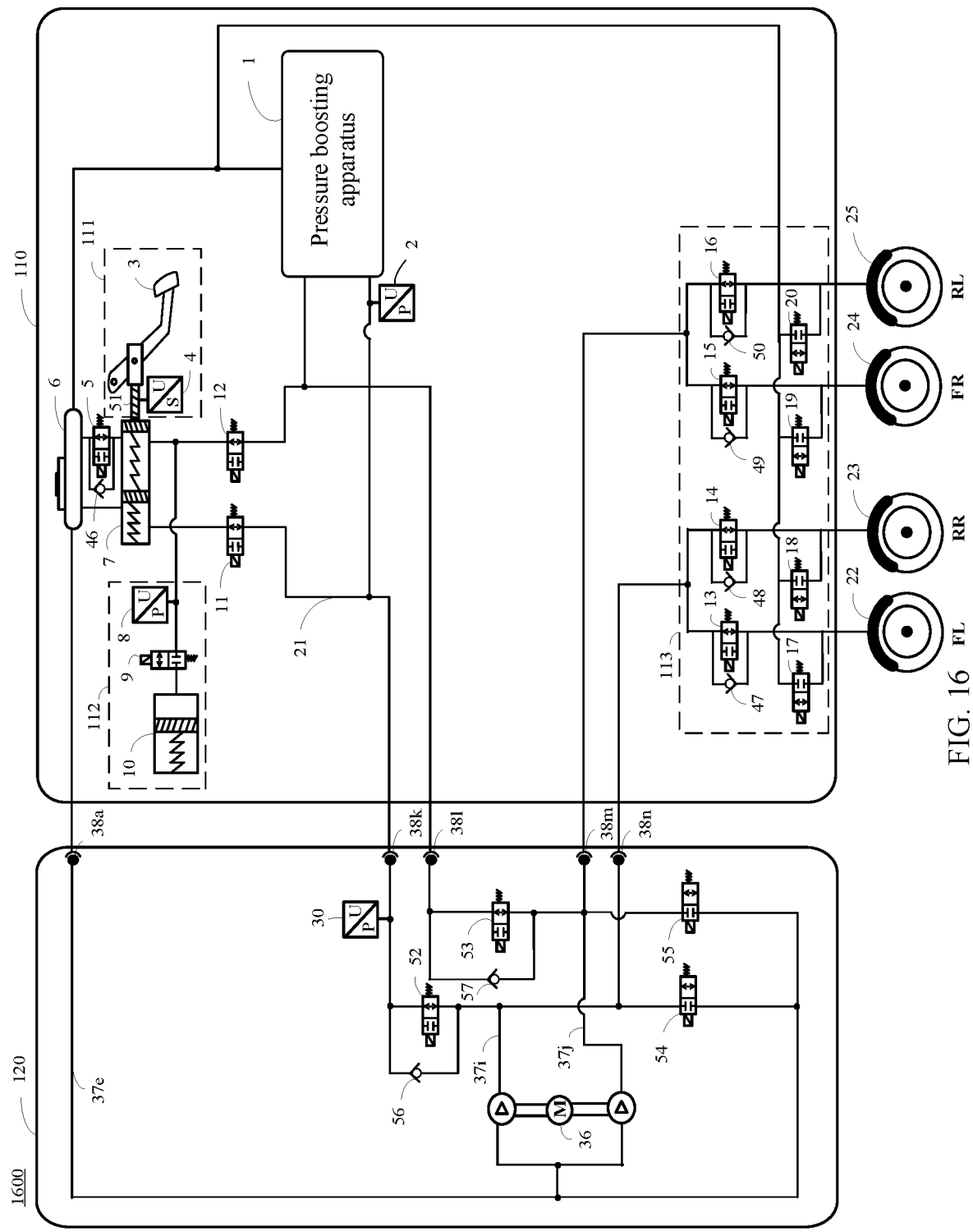
FIG. 16 is a schematic diagram of still another brake-by-wire system according to an embodiment of this application.

The redundant brake system 120 in the brake-by-wire system shown in FIG. 15 may be in a low-pressure state, or may be in a high-pressure state, as shown in FIG. 16. FIG. 16 is a schematic diagram of still another brake-by-wire system according to an embodiment of this application. For a detailed explanation of whether the redundant brake system is in a low-pressure state or a high-pressure state, refer to FIG. 11 and FIG. 12. Details are not described herein again. Similarly, the brake-by-wire system shown in FIG. 16 also includes three operating modes: a manual braking mode, a pressure boosting apparatus braking mode, and a redundant braking mode. An operating principle in the redundant braking mode is similar to that shown in FIG. 25. To avoid repetition, details are not described herein again.

In the solution of this application, a wheel cylinder outlet valve is added to a redundant brake system, so that when a master brake system fails and a brake wheel cylinder needs to be depressurized, for example, when an ABS braking requirement is met, the controller can effectively reduce braking forces of the four brake wheel cylinders, thereby further improving safety of the brake system. In addition, a quantity of solenoid valves in the redundant brake system is small, which can effectively control the four brake wheel cylinders at low costs.

Figure 17:
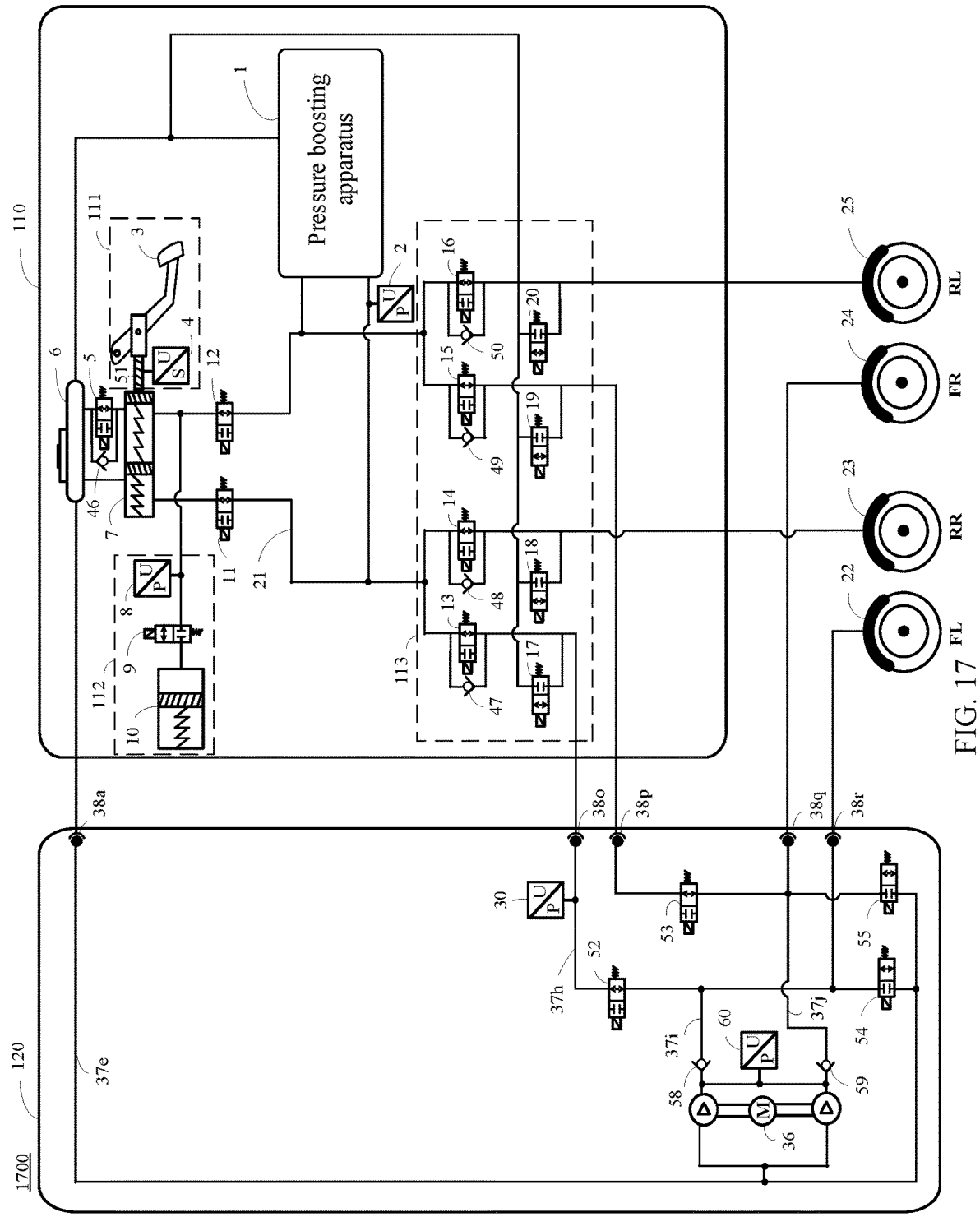
FIG. 17 is a schematic diagram of still another brake-by-wire system according to an embodiment of this application.

FIG. 17 is a schematic diagram of still another brake-by-wire system according to an embodiment of this application. As shown in FIG. 17, the brake-by-wire system 100 includes a master brake system 110, a redundant brake system 120, and a controller.

The brake system may further include a first brake wheel cylinder 22, a second brake wheel cylinder 23, a third brake wheel cylinder 24, and a fourth brake wheel cylinder 25.

A structure and functions of the master brake system 110 in FIG. 17 are the same as those of the master brake system 110 in FIG. 1(a) and FIG. 1(b). To avoid repetition, details are not described herein again.

It should be noted that the internal structure of the master brake system shown in FIG. 17 is the same as the internal structure of the master brake system shown in FIG. 1(a). However, a connection relationship among a brake circuit 113 in the master brake system shown in FIG. 17, a redundant brake system 120, and a brake wheel cylinder is different from that shown in FIG. 1(a). The specific connection relationship is described in detail after the redundant brake system 120 shown in FIG. 17 is described.

The redundant brake system 120 may include a plunger pump assembly 36, a fifth redundant isolation valve 52, a sixth redundant isolation valve 53, a first pressure sensor 30, a redundant brake pipeline 37, and a brake system plug-in connector 38.

A second port of the fifth redundant isolation valve 52 is connected to the plunger pump assembly 36 through a ninth redundant brake pipeline 37i, and the ninth redundant brake pipeline 37i provides braking forces for a first brake wheel cylinder 22 and a second brake wheel cylinder 23. A second port of the sixth redundant isolation valve 53 is connected to the plunger pump assembly 36 through a tenth redundant brake pipeline 37j, and the tenth redundant brake pipeline 37j provides braking forces for a third brake wheel cylinder 24 and a fourth brake wheel cylinder 25. The first port of the fifth redundant isolation valve 52 is connected to a first pressure sensor 30 through an eighth redundant brake pipeline 37h. The redundant brake pipeline 37 includes a fifth redundant brake pipeline 37e, the eighth redundant brake pipeline 37h, the ninth redundant brake pipeline 37i, and the tenth redundant brake pipeline 37j. The plunger pump assembly 36 is connected to the first brake system plug-in connector 38a through the fifth redundant brake pipeline 37e.

The brake system plug-in connectors 38 include the first brake system plug-in connector 38a, a fifteenth brake system plug-in connector 38o, a sixteenth brake system plug-in connector 38p, a seventeenth brake system plug-in connector 38q, and an eighteenth brake system plug-in connector 38r.

The redundant brake system 120 may further include a fifth wheel cylinder outlet valve 54 and a sixth wheel cylinder outlet valve 55. A second port of the fifth wheel cylinder outlet valve 54 is connected to a second port of the fifth redundant isolation valve 52 through the ninth redundant brake pipeline 37i, and a first port of the fifth wheel cylinder outlet valve 54 is connected to the first brake system plug-in connector 38a through the fifth redundant brake pipeline 37e. A second port of the sixth wheel cylinder outlet valve 55 is connected to a second port of a sixth redundant isolation valve 53 through the tenth redundant brake pipeline 37j, and a first port of the sixth wheel cylinder outlet valve 55 is connected to the first brake system plug-in connector 38a through the fifth redundant brake pipeline 37e.

The redundant brake system 120 may further include an eleventh one-way valve 58, a twelfth one-way valve 59, and a fourth pressure sensor 60. The eleventh one-way valve 58 and the twelfth one-way valve 59 are respectively connected to two outlets of the plunger pump assembly 36, and the fourth pressure sensor 60 is connected to the plunger pump assembly 36.

It should be noted that, in this embodiment of this application, any redundant brake system in the brake-by-wire system may include the eleventh one-way valve 58, the twelfth one-way valve 59, and the fourth pressure sensor 60, to accurately control a pressure of the brake fluid.

The connection relationship among the master brake system 110, the redundant brake system 120, and the brake wheel cylinder may be as follows: The first fluid storage container 6 is connected to the plunger pump assembly 36 in the redundant brake system 120 through the brake system plug-in connector 38a; the brake circuit 113 is connected to the first port of the fifth redundant isolation valve 52 in the redundant brake system 120 through the fifteenth brake system plug-in connector 38o; the brake circuit 113 is connected to the first port of the sixth redundant isolation valve 53 in the redundant brake system 120 through the sixteenth brake system plug-in connector 38p; the first brake wheel cylinder 22 is connected to the second port of the fifth redundant isolation valve 52 through the seventeenth brake system plug-in connector 38q; the third brake wheel cylinder 24 is connected to the second port of the sixth redundant isolation valve 53 through the eighteenth brake system plug-in connector 38r; the brake circuit 113 is connected to the second brake wheel cylinder 23; and the brake circuit 113 is connected to the fourth brake wheel cylinder 25.

It should be noted that the brake circuit shown in FIG. 17 is arranged in an X-shaped manner. As shown in FIG. 17, a brake circuit that controls a front wheel in one brake circuit needs to pass through a redundant brake system 120, and then is connected to a front wheel brake wheel cylinder, for example, a front left wheel brake wheel cylinder, that is, the first brake wheel cylinder 22; a brake circuit that controls a rear wheel is directly connected to a wheel cylinder of a rear wheel, for example, a rear right wheel brake wheel cylinder, that is, the second brake wheel cylinder 23; a brake circuit that controls a front wheel in the other brake circuit needs to pass through the redundant brake system 120, and then is connected to a front wheel brake wheel cylinder, for example, a front right wheel brake wheel cylinder, that is, the third brake wheel cylinder 24; and a brake circuit that controls a rear wheel is directly connected to a wheel cylinder of a rear wheel, for example, a brake wheel cylinder of a rear left wheel, that is, the fourth brake wheel cylinder 25.

It should be understood that the redundant brake system 120 in the brake-by-wire system shown in FIG. 17 may independently control the front wheel brake wheel cylinder of the vehicle after the master brake system fails. Therefore, in another brake circuit arrangement form, there may be another connection manner. Therefore, the connection manner in this embodiment of this application is not limited to that shown in FIG. 17.

In this embodiment of this application, the brake-by-wire system in FIG. 17 includes three operating modes: a manual braking mode, a pressure boosting apparatus braking mode, and a redundant braking mode. The following describes in detail a pressure boosting process and a depressurization process in the redundant braking mode with reference to FIG. 26 and FIG. 27 for the redundant braking mode of the brake-by-wire system in FIG. 17.

Figure 26:
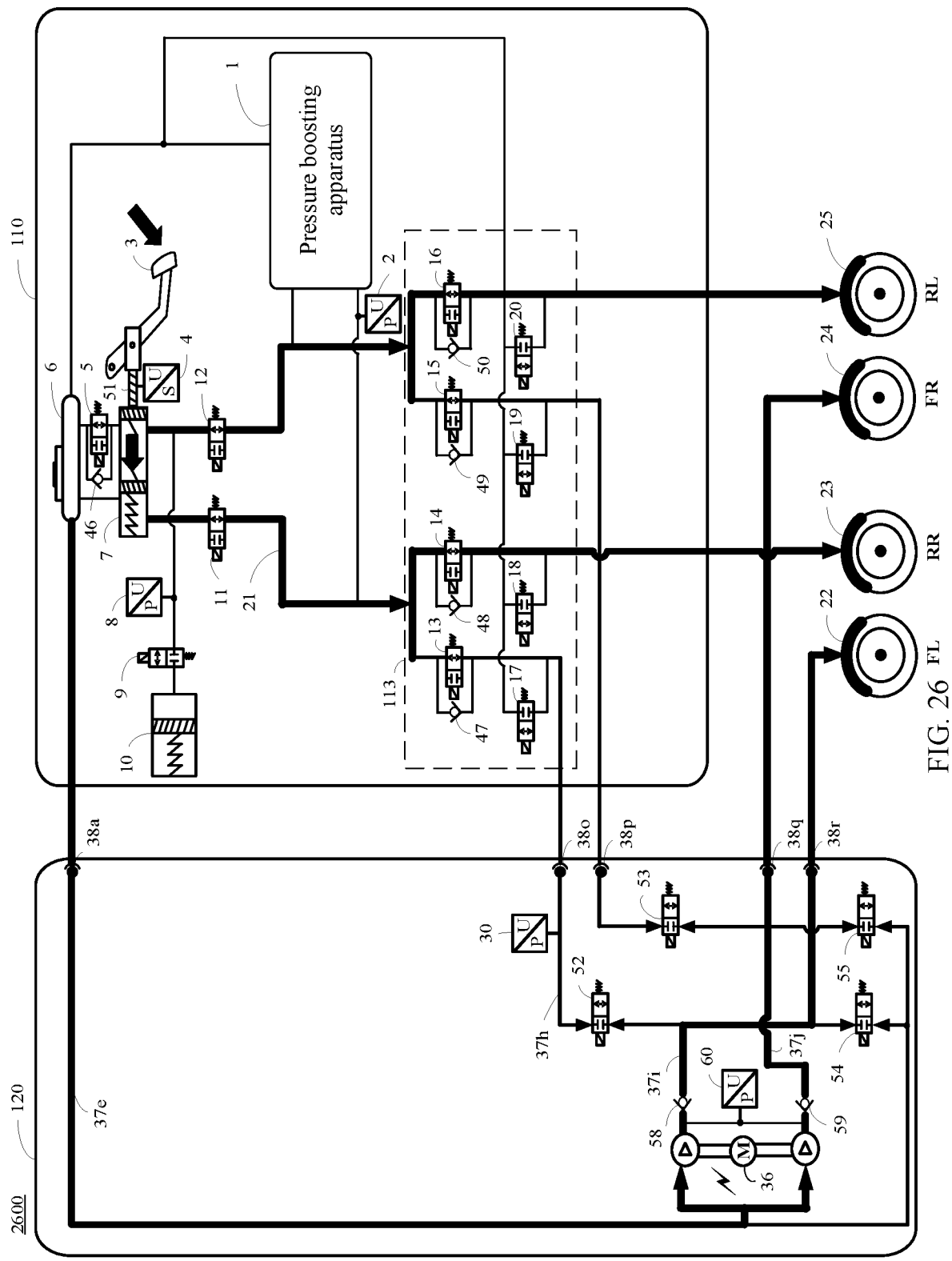
FIG. 26 is a schematic diagram of still another pressure boosting process in a redundant braking mode according to an embodiment of this application.

Pressure boosting process in the redundant braking mode: FIG. 26 is a schematic diagram of still another pressure boosting process in the redundant braking mode according to an embodiment of this application.

When a master brake system fails, a driver steps on a brake pedal 3, and brake fluid is divided into two channels after coming out of a brake master cylinder 7. One channel passes through a brake circuit 113 and directly enters a second brake wheel cylinder 23 and a fourth brake wheel cylinder 25, and the other channel passes through a redundant brake system 120. Because a controller controls a fifth redundant isolation valve 52 and a sixth redundant isolation valve 53 to be in a switched-off state, the brake fluid cannot enter the corresponding brake wheel cylinder, and the redundant brake system 120 is required to provide braking forces for brake wheel cylinders. A controller in the redundant brake system 120 controls a plunger pump assembly 36 to operate. A fourth pressure sensor 60, an eleventh one-way valve 58, and a twelfth one-way valve 59 accurately control the brake fluid, and the brake fluid from the first fluid storage container 6 passes through the plunger pump assembly 36.

In this case, the controller controls a fifth wheel cylinder outlet valve 54 and a sixth wheel cylinder outlet valve 55 to be in a switched-off state, and the brake fluid enters a first brake wheel cylinder 22 and a third brake wheel cylinder 24 through the plunger pump assembly 36, to provide braking forces for the two brake wheel cylinders. The controller may control an electronic park brake (EPB) system, to provide braking forces for the second brake wheel cylinder 23 and the fourth brake wheel cylinder 25 through a mechanical structure.

Figure 27:
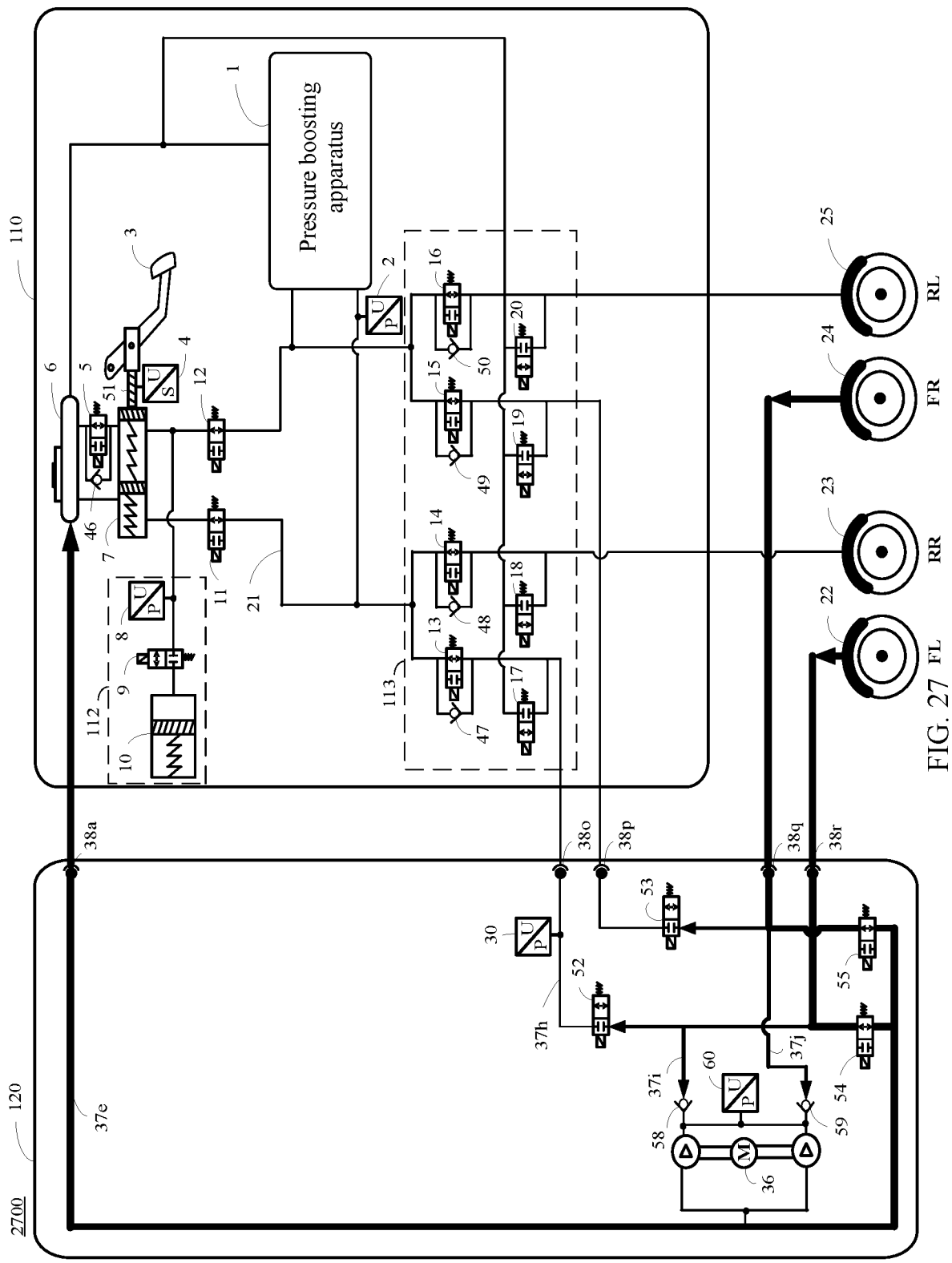
FIG. 27 is a schematic diagram of still another depressurization process in a redundant braking mode according to an embodiment of this application.

Depressurization process in a redundant braking mode: FIG. 27 is a schematic diagram of still another depressurization process in the redundant braking mode according to an embodiment of this application.

When a master brake system fails, a controller controls a fifth wheel cylinder outlet valve 54 and a sixth wheel cylinder outlet valve 55 to be in a switched-on state, and controls a fifth redundant isolation valve 52 and a sixth redundant isolation valve 53 to be in a switched-off state, and brake fluid flows out from a first brake wheel cylinder 22 and a third brake wheel cylinder 24, passes through the fifth wheel cylinder outlet valve 54 and the sixth wheel cylinder outlet valve 55, and flows back to a first fluid storage container 6.

In the solution of this application, when the master brake system fails, each front wheel brake wheel cylinder is independently controlled through a redundant brake system, so that depressurization can be performed on each front wheel brake wheel cylinder when the wheel is locked, to meet an ABS braking requirement of each front wheel. In the process of pressure boosting, the redundant brake system can boost the pressure of each front wheel brake wheel cylinder, and pressure boosting is performed on each rear wheel brake wheel cylinder through an EPB system, so as to implement independent pressure boosting for each of the four wheels. In addition, the pressure sensor and one-way valve of the plunger pump may cooperate with the redundant brake system to control the pressure of the brake fluid more accurately, thereby ensuring safety of the brake system.

Figure 18:
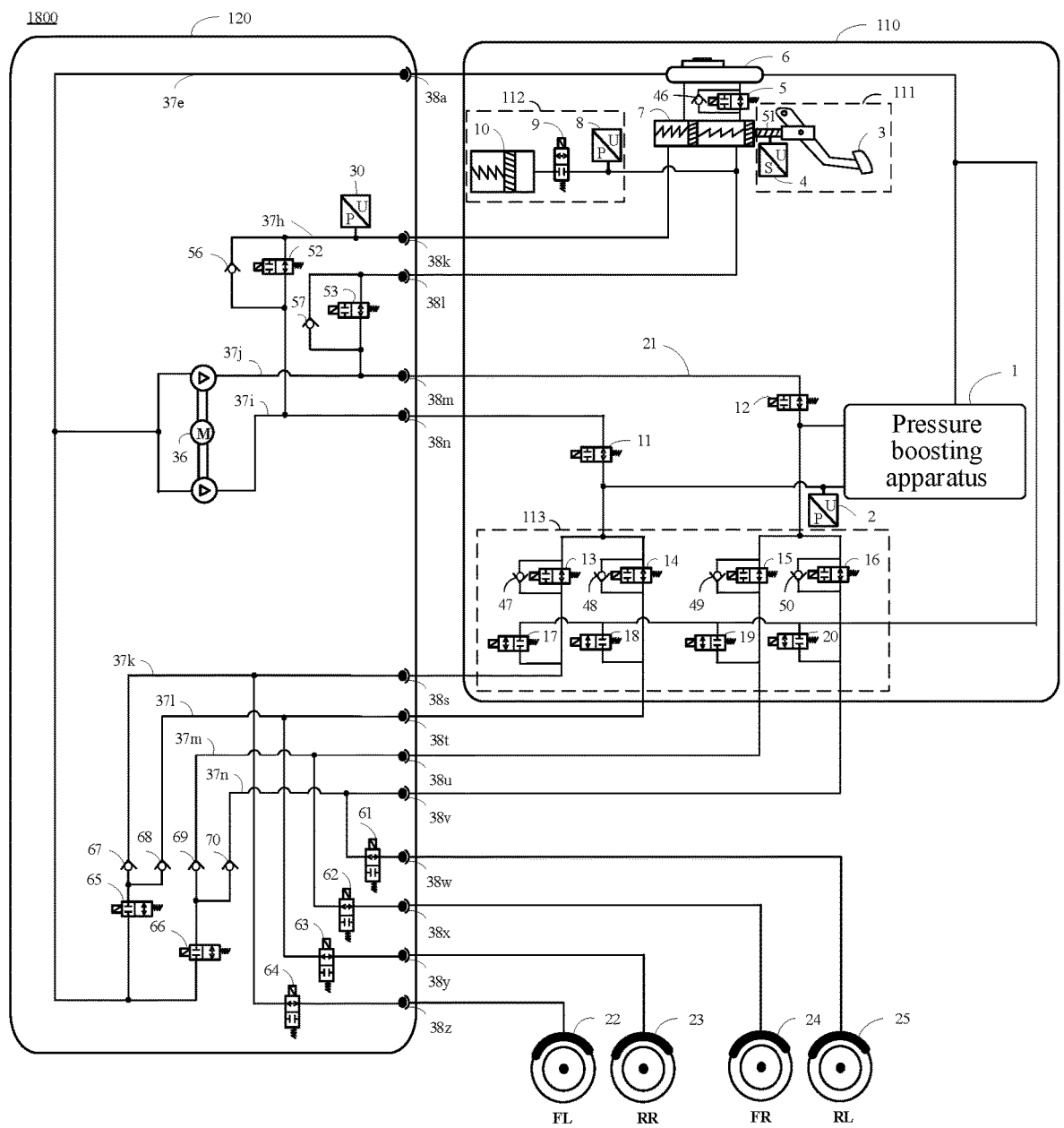
FIG. 18 is a schematic diagram of still another brake-by-wire system according to an embodiment of this application.

FIG. 18 is a schematic diagram of still another brake-by-wire system according to an embodiment of this application. As shown in FIG. 18, the brake-by-wire system 100 includes a master brake system 110, a redundant brake system 120, and a controller.

The brake system further includes a first brake wheel cylinder 22, a second brake wheel cylinder 23, a third brake wheel cylinder 24, and a fourth brake wheel cylinder 25.

A structure and functions of the master brake system 110 in FIG. 18 are the same as those of the master brake system 110 in FIG. 11. To avoid repetition, details are not described herein again.

The redundant brake system 120 may include a plunger pump assembly 36, a fifth redundant isolation valve 52, a sixth redundant isolation valve 53, a first pressure sensor 30, a redundant brake pipeline 37, and a brake system plug-in connector 38.

A second port of the fifth redundant isolation valve 52 is connected to the plunger pump assembly 36 through a ninth redundant brake pipeline 37i, and the ninth redundant brake pipeline 37i provides braking forces for a first brake wheel cylinder 22 and a second brake wheel cylinder 23. A second port of the sixth redundant isolation valve 53 is connected to the plunger pump assembly 36 through a tenth redundant brake pipeline 37j, and the tenth redundant brake pipeline 37j provides braking forces for a third brake wheel cylinder 24 and a fourth brake wheel cylinder 25. The first port of the fifth redundant isolation valve 52 is connected to a first pressure sensor 30 through an eighth redundant brake pipeline 37h. The redundant brake pipeline 37 includes a fifth redundant brake pipeline 37e, the eighth redundant brake pipeline 37h, the ninth redundant brake pipeline 37i, and the tenth redundant brake pipeline 37j. The plunger pump assembly 36 is connected to the first brake system plug-in connector 38a through the fifth redundant brake pipeline 37e.

The brake system plug-in connectors 38 include the first brake system plug-in connector 38a, an eleventh brake system plug-in connector 38k, a twelfth brake system plug-in connector 38l, a thirteenth brake system plug-in connector 38m, a fourteenth brake system plug-in connector 38n, a nineteenth brake system plug-in connector 38s, a twentieth brake system plug-in connector 38t, a twenty-first brake system plug-in connector 38u, a twenty-second brake system plug-in connector 38v, a twenty-third brake system plug-in connector 38w, a twenty-fourth brake system plug-in connector 38x, a twenty-fifth brake system plug-in connector 38y, and a twenty-sixth brake system plug-in connector 38z.

The redundant brake system 120 may further include a ninth wheel cylinder inlet valve 61, a tenth wheel cylinder inlet valve 62, an eleventh wheel cylinder inlet valve 63, a twelfth wheel cylinder inlet valve 64, a seventh wheel cylinder outlet valve 65, an eighth wheel cylinder outlet valve 66, a thirteenth one-way valve 67, a fourteenth one-way valve 68, a fifteenth one-way valve 69, and a sixteenth one-way valve 70.

The ninth wheel cylinder inlet valve 61, the sixteenth one-way valve 70, and the eighth wheel cylinder outlet valve 66 are connected through the fourteenth redundant brake pipeline 37n; the tenth wheel cylinder inlet valve 62, the fifteenth one-way valve 69, and the eighth wheel cylinder outlet valve 66 are connected through the thirteenth redundant brake pipeline 37m, and the fifteenth one-way valve 69 and the sixteenth one-way valve 70 are connected in parallel; the eleventh wheel cylinder inlet valve 63, the fourteenth one-way valve 68, and the seventh wheel cylinder outlet valve 65 are connected through the twelfth redundant brake pipeline 37l; and the twelfth wheel cylinder inlet valve 64, the thirteenth one-way valve 67, and the seventh wheel cylinder outlet valve 65 are connected through the eleventh redundant brake pipeline 37k, and the thirteenth one-way valve 67 and the fourteenth one-way valve 68 are connected in parallel.

In a possible implementation, a connection relationship between the wheel cylinder inlet valve, the one-way valve, and the wheel cylinder outlet valve in the redundant brake system may be as follows: A first port of the wheel cylinder inlet valve, a corresponding one-way valve, and a wheel cylinder outlet valve are connected through a redundant brake pipeline. In an example in which the ninth wheel cylinder inlet valve 61, the sixteenth one-way valve 70, and the eighth wheel cylinder outlet valve 66 are connected through the fourteenth redundant brake pipeline 37n, the first port of the ninth wheel cylinder inlet valve 61, the sixteenth one-way valve 70, and the eighth wheel cylinder outlet valve 66 are connected through the fourteenth redundant brake pipeline 37n, as shown in FIG. 18.

In a possible implementation, a connection relationship between the wheel cylinder inlet valve, the one-way valve, and the wheel cylinder outlet valve in the redundant brake system may be as follows: A second port of the wheel cylinder inlet valve, a corresponding one-way valve, and a wheel cylinder outlet valve are connected through a redundant brake pipeline. In an example in which the ninth wheel cylinder inlet valve 61, the sixteenth one-way valve 70, and the eighth wheel cylinder outlet valve 66 are connected through a fourteenth redundant brake pipeline 37*n*, the second port of the ninth wheel cylinder inlet valve 61, the sixteenth one-way valve 70, and the eighth wheel cylinder outlet valve 66 are connected through the fourteenth redundant brake pipeline 37*n*, and this connection manner is not shown in the figure.

A connection relationship between the master brake system 110 and the redundant brake system 120 in the brake-by-wire system shown in FIG. 18 is as follows: The first fluid storage container 6 is connected to the plunger pump assembly 36 in the redundant brake system 120 through the brake system plug-in connector 38*a*; the master cylinder 7 is connected to the first port of the fifth redundant isolation valve 52 in the redundant brake system through the eleventh brake system plug-in connector 38*k*; the master cylinder 7 is connected to the first port of the sixth redundant isolation valve 53 in the redundant brake system through the twelfth brake system plug-in connector 38*l*; the first port of the first wheel cylinder isolation valve 11 is connected to the second port of the fifth redundant isolation valve 52 through the fourteenth brake system plug-in connector 38*n*; the first port of the second wheel cylinder isolation valve 11 is connected to the second port of the sixth redundant isolation valve 53 through the thirteenth brake system plug-in connector 38*m*; the brake circuit 113 is connected to the first port of the ninth wheel cylinder inlet valve 61 in the redundant brake system 120 through the twenty-second brake system plug-in connector 38*v*; the brake circuit 113 is connected to the first port of the tenth wheel cylinder inlet valve 62 in the redundant brake system 120 through the twenty-first brake system plug-in connector 38*u*; and the brake circuit 113 is connected to the first port of the eleventh wheel cylinder inlet valve 63 in the redundant brake system 120 through the twentieth brake system plug-in connector 38*t*; the brake circuit 113 is connected to the first port of the twelfth wheel cylinder inlet valve 64 in the redundant brake system 120 through the nineteenth brake system plug-in connector 38*s*; the first brake wheel cylinder 22 is connected to the second port of the ninth wheel cylinder inlet valve 61 in the redundant system 120 through the twenty-third brake system plug-in connector 38*w*; the second brake wheel cylinder 23 is connected to the second port of the tenth wheel cylinder inlet valve 62 in the redundant system 120 through the twenty-fourth brake system plug-in connector 38*x*; the third brake wheel cylinder 24 is connected to the second port of the eleventh wheel cylinder inlet valve 63 in the redundant system 120 through the twenty-fifth brake system plug-in connector 38*y*; and the fourth brake wheel cylinder 25 is connected to the second port of the twelfth wheel cylinder inlet valve 64 in the redundant system 120 through the twenty-sixth brake system plug-in connector 38*z*.

In this embodiment of this application, the brake-by-wire system in FIG. 18 includes three operating modes: a manual braking mode, a pressure boosting apparatus braking mode, and a redundant braking mode. The following describes in detail a pressure boosting process and a depressurization process in the redundant braking mode with reference to FIG. 28 and FIG. 29 for the redundant braking mode of the brake-by-wire system in FIG. 18.

Figure 28:
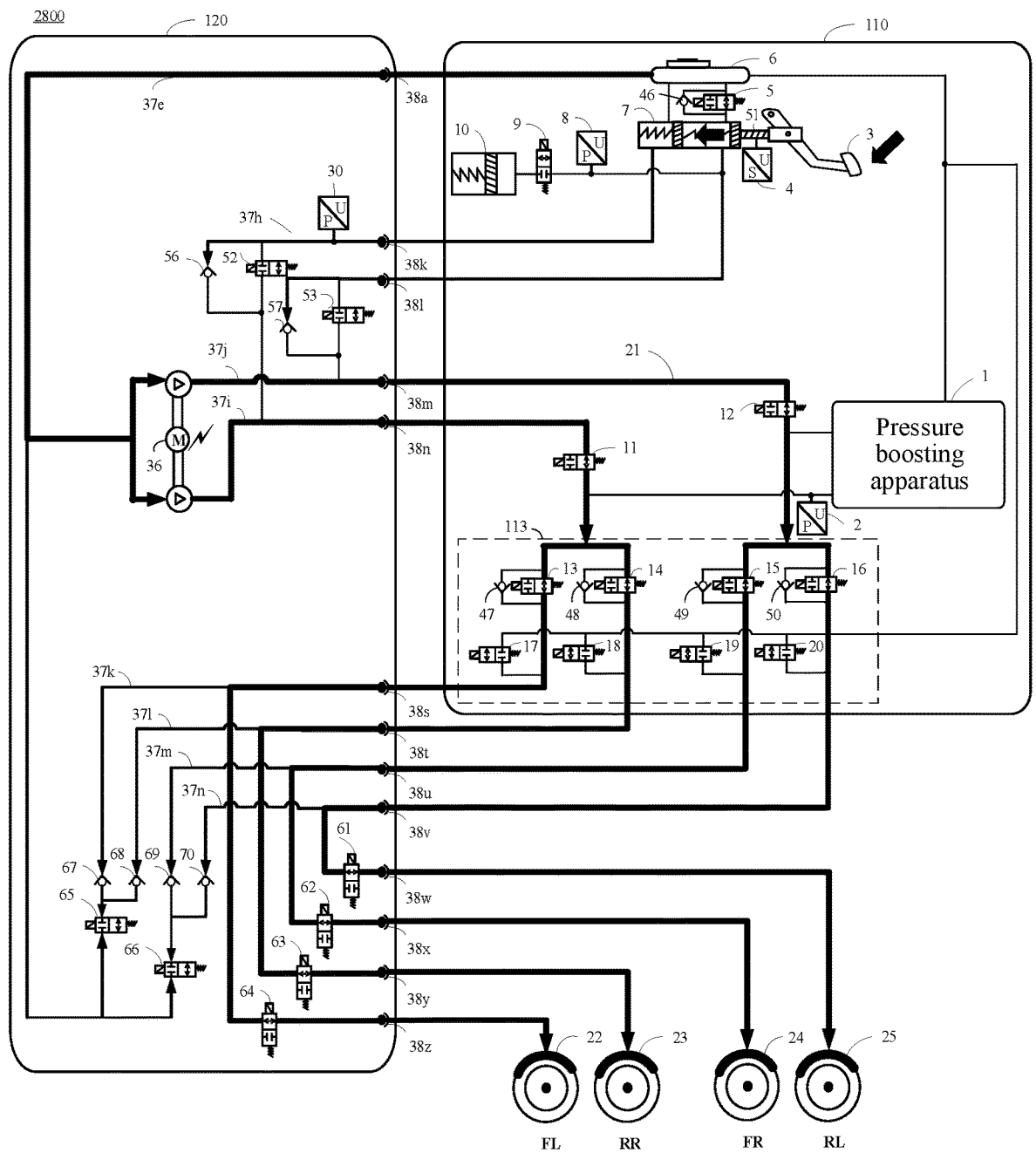
FIG. 28 is a schematic diagram of still another pressure boosting process in a redundant braking mode according to an embodiment of this application.

Pressure boosting process in the redundant braking mode: FIG. 28 is a schematic diagram of still another pressure boosting process in the redundant braking mode according to an embodiment of this application.

When the master brake system fails, a driver steps on a brake pedal 3, and brake fluid enters the redundant brake system 120 from the brake master cylinder 7 through the master brake pipeline 21. The controller controls the fifth redundant isolation valve 52 and the sixth redundant isolation valve 53 to be in a switched-off state. In this case, to enable the driver to step on the brake pedal 3, only a small amount of brake fluid can enter the redundant brake system from the ninth one-way valve 56 and the tenth one-way valve 57, and a large amount of brake fluid cannot enter the brake wheel cylinder through the master brake system, and the redundant brake system 120 is required to provide braking forces for the brake wheel cylinders. The controller controls the seventh wheel cylinder outlet valve 65 and the eighth wheel cylinder outlet valve 66 to be in a switched-off state, and controls the ninth wheel cylinder inlet valve 61, the tenth wheel cylinder inlet valve 62, the eleventh wheel cylinder inlet valve 63, and the twelfth wheel cylinder inlet valve 64 to be in a switched-on state. The controller in the redundant brake system 120 controls the plunger pump assembly 36 to operate. The brake fluid from the first fluid storage container 6 passes through the plunger pump assembly 36, enters the brake circuit 113 through the first wheel cylinder isolation valve 11 and the second wheel cylinder isolation valve 12 in the master brake system 110 respectively, and then enters the first brake wheel cylinder 22, the second brake wheel cylinder 23, the third brake wheel cylinder 24, and the fifth brake wheel cylinder 25 through the ninth wheel cylinder inlet valve 61, the tenth wheel cylinder inlet valve 62, the eleventh wheel cylinder inlet valve 63, and the twelfth wheel cylinder inlet valve 64 in the redundant brake system, to provide braking forces for these brake wheel cylinders.

Because the controller controls the seventh wheel cylinder outlet valve 65 and the eighth wheel cylinder outlet valve 66 to be in the closed state, a small amount of brake fluid passes through the thirteenth one-way valve 67, the fourteenth one-way valve 68, the fifteenth one-way valve 69, and the sixteenth one-way valve 70, but cannot flow back to the first fluid storage container 6 through the seventh wheel cylinder outlet valve 65 and the eighth wheel cylinder outlet valve 66.

Figure 29:
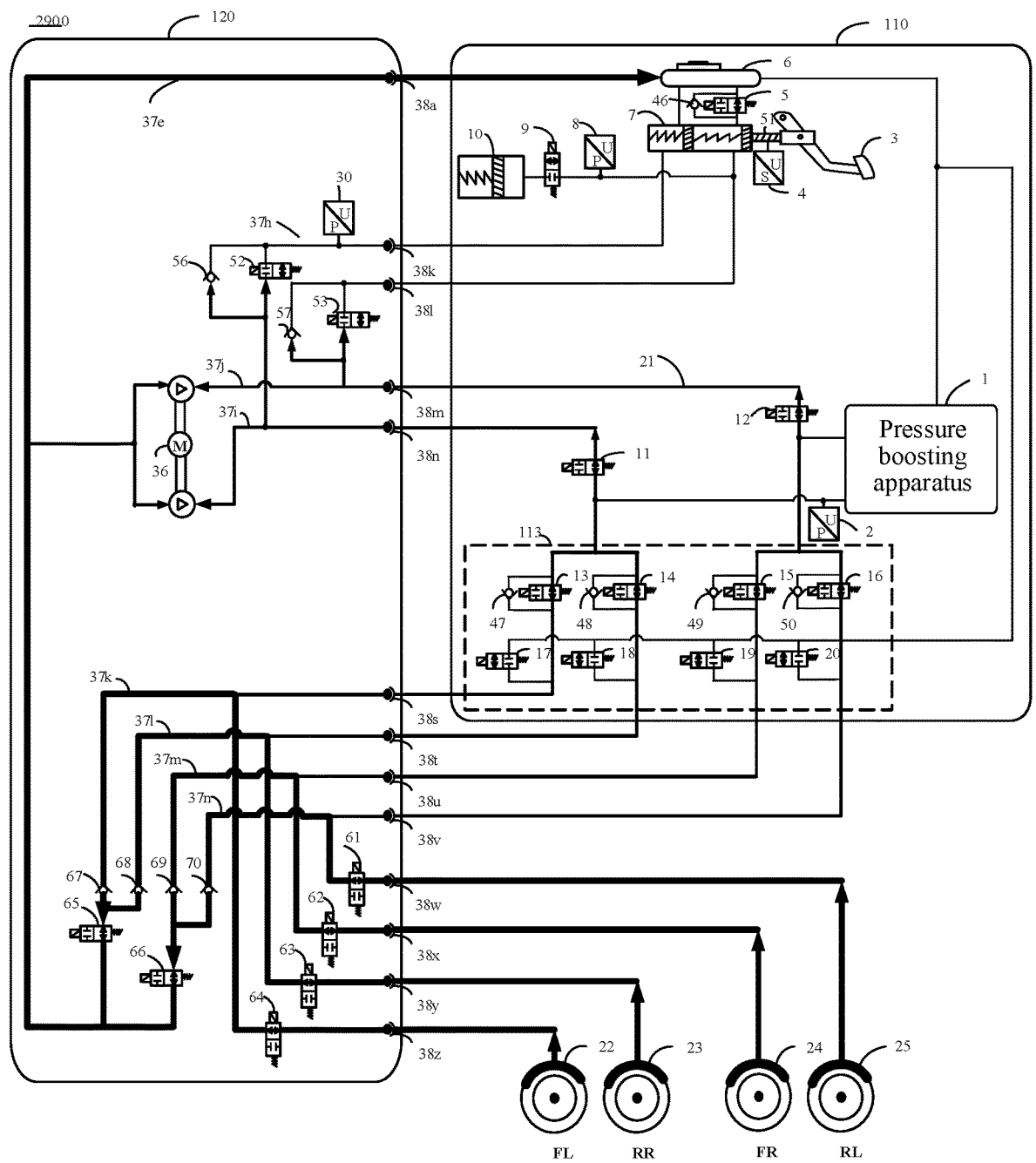
FIG. 29 is a schematic diagram of still another depressurization process in a redundant braking mode according to an embodiment of this application.

Depressurization process in a redundant braking mode: FIG. 29 is a schematic diagram of still another depressurization process in the redundant braking mode according to an embodiment of this application.

When a master brake system fails, a controller controls a seventh wheel cylinder outlet valve 65 and the eighth wheel cylinder outlet valve 66 to be in a switched-on state, and controls the ninth wheel cylinder inlet valve 61, the tenth wheel cylinder inlet valve 62, the eleventh wheel cylinder inlet valve 63, and the twelfth wheel cylinder inlet valve 64 to be in a switched-on state. The brake fluid from the first brake wheel cylinder 22, the second brake wheel cylinder 23, the third brake wheel cylinder 24, and the fourth brake wheel cylinder 25 respectively passes through the twelfth wheel cylinder inlet valve 64, the eleventh wheel cylinder inlet valve 63, the tenth wheel cylinder inlet valve 62, and the ninth wheel cylinder inlet valve 61, then passes through the thirteenth one-way valve 67, the fourteenth one-way valve 68, the fifteenth one-way valve 69, and the sixteenth one-way valve 70, and then flows back to the first fluid storage container 6 through the seventh wheel cylinder outlet valve 65 and the eighth wheel cylinder outlet valve 66.

Figure 19:
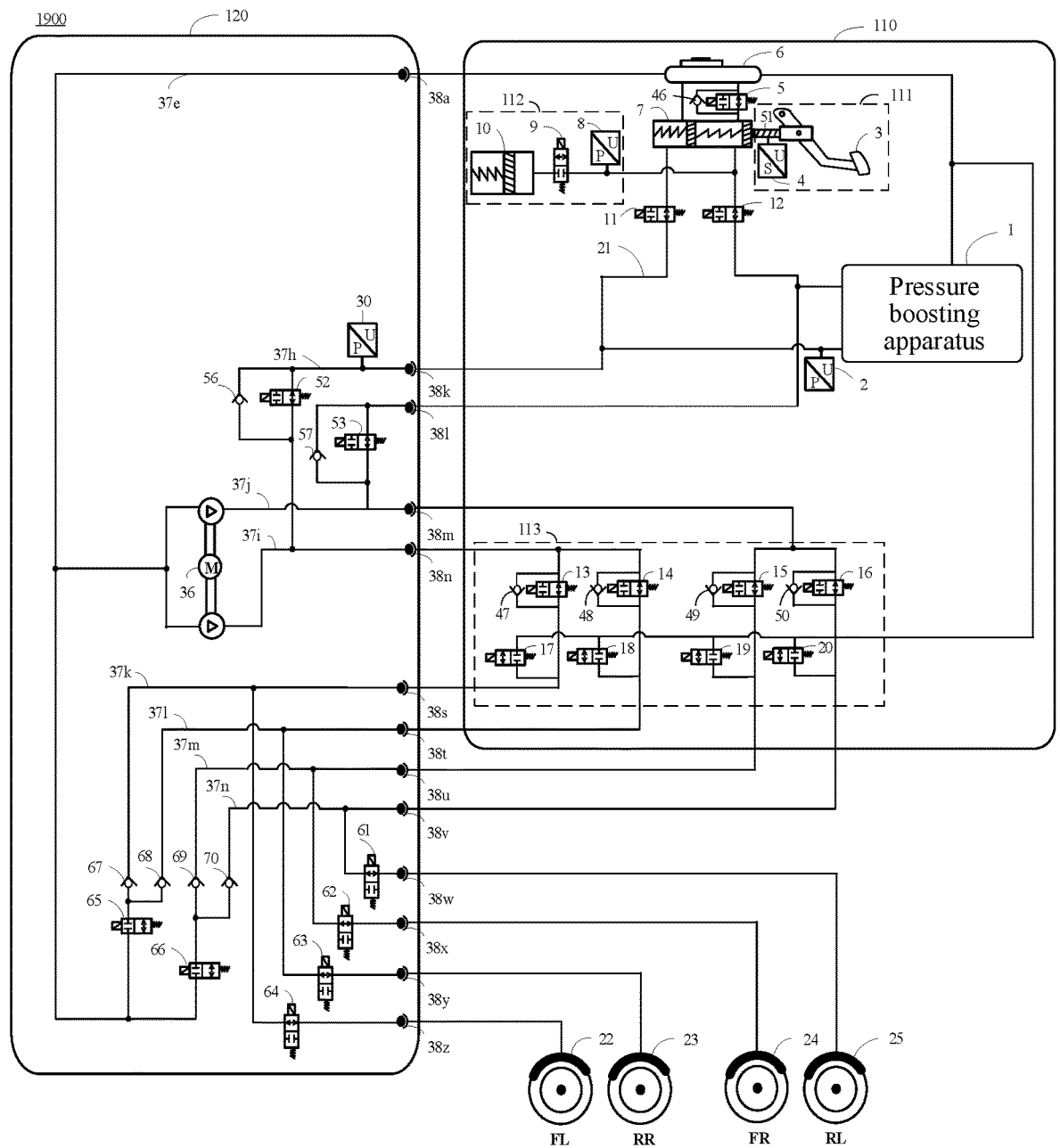
FIG. 19 is a schematic diagram of still another brake-by-wire system according to an embodiment of this application.

It should be noted that the redundant brake system 120 in the brake-by-wire system shown in FIG. 18 may be in a low-pressure state, or may be in a high-pressure state, as shown in FIG. 19. FIG. 19 is a schematic diagram of still another brake-by-wire system according to an embodiment of this application. For a detailed explanation of whether the redundant brake system is in a low-pressure state or a high-pressure state, refer to FIG. 11 and FIG. 12. Details are not described herein again. Similarly, the brake-by-wire system shown in FIG. 19 also includes three operating modes: a manual braking mode, a pressure boosting apparatus braking mode, and a redundant braking mode. An operating principle in the redundant braking mode is similar to that shown in FIG. 28 and FIG. 29. To avoid repetition, details are not described herein again.

In the solution of this application, the wheel cylinder outlet valve and the wheel cylinder inlet valve for each brake wheel cylinder are disposed in the redundant brake system, so that when the master brake system fails, the redundant brake system can independently control each brake wheel cylinder, to implement function backup for the master brake system, thereby meeting the requirements for braking functions such as ABS/AEB/ESC/TCS of the vehicle, and further improving safety of the brake system.

Figure 20:
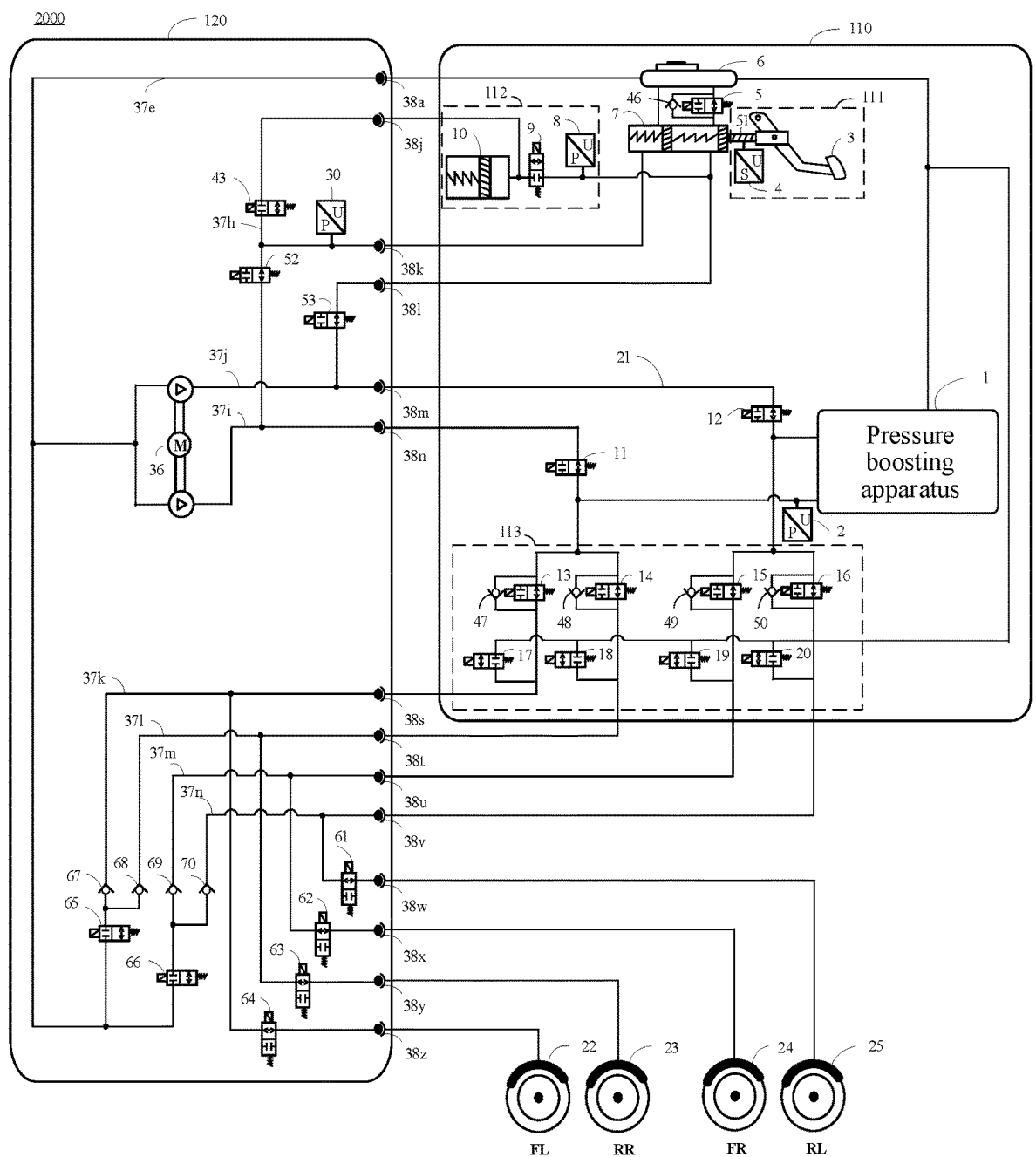
FIG. 20 is a schematic diagram of still another brake-by-wire system according to an embodiment of this application.

FIG. 20 is a schematic diagram of still another brake-by-wire system according to an embodiment of this application. As shown in FIG. 20, the brake-by-wire system 100 includes a master brake system 110, a redundant brake system 120, and a controller.

The brake system further includes a first brake wheel cylinder 22, a second brake wheel cylinder 23, a third brake wheel cylinder 24, and a fourth brake wheel cylinder 25.

A structure and functions of the master brake system 110 in FIG. 20 are the same as those of the master brake system 110 in FIG. 11. To avoid repetition, details are not described herein again.

Compared with the redundant brake system in FIG. 18, the redundant brake system 120 in FIG. 20 further includes a first pedal feel simulator switch valve 43 on the basis of the redundant brake system in FIG. 18. The first pedal feel simulator switch valve 43 is connected to the first port of the fifth redundant isolation valve 52 through an eighth redundant brake pipeline 37h, where the first pedal feel simulator switch valve 43 is configured to feed back pedal feel information to the driver when the master brake system 110 fails.

Compared with the connection relationship shown in FIG. 18, the connection relationship between the master brake system 110 and the redundant brake system 120 in the brake-by-wire system shown in FIG. 20 may further include: The first port of the first pedal feel simulator 10 is connected to the second port of the first pedal feel simulator switch valve 43 in the redundant brake system 120 through the tenth brake system plug-in connector 38j.

In this embodiment of this application, the brake-by-wire system in FIG. 20 includes three operating modes: a manual braking mode, a pressure boosting apparatus braking mode, and a redundant braking mode. The following describes the redundant braking mode of the brake-by-wire system in FIG. 20 with reference to FIG. 30.

Figure 30:
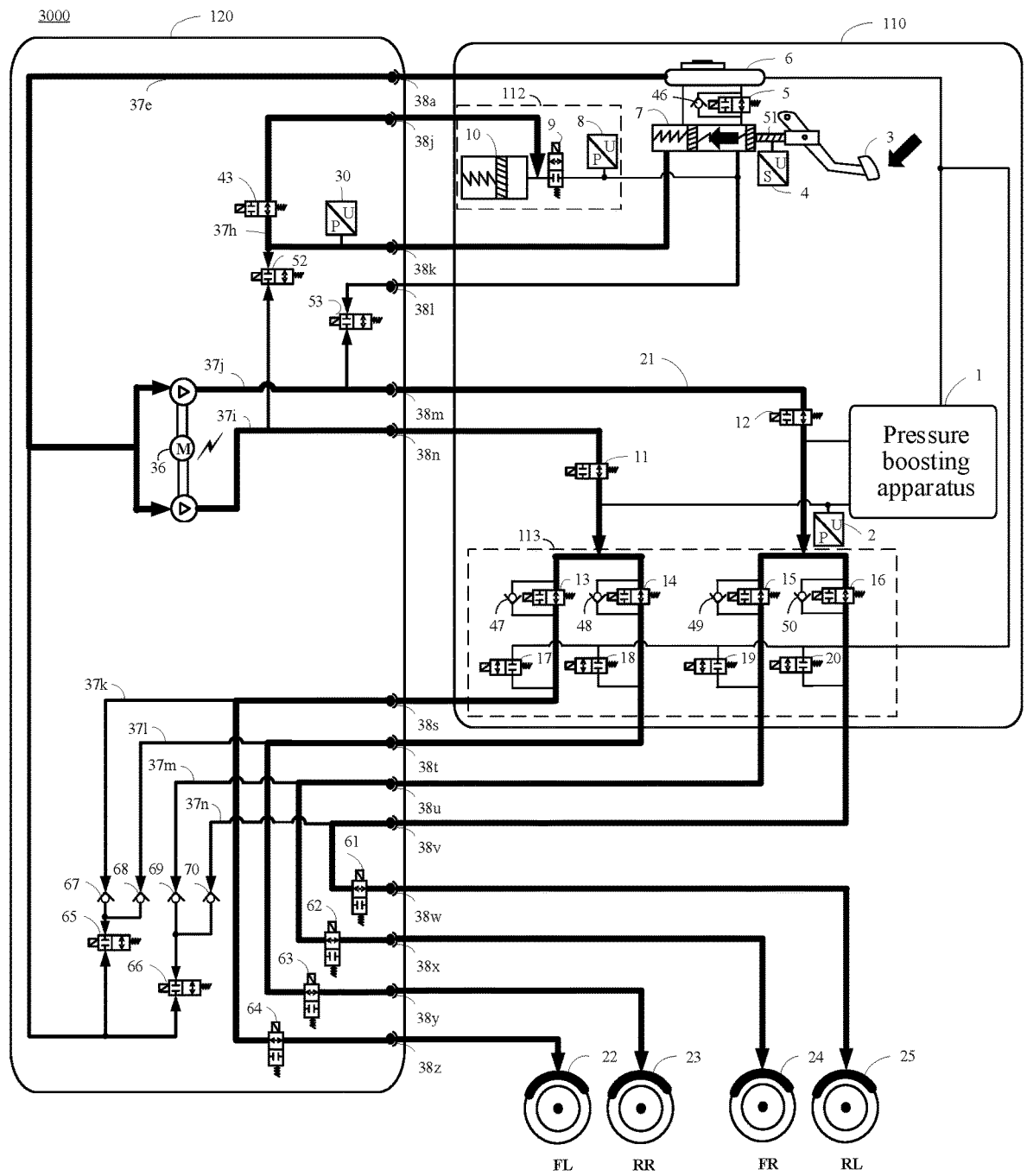
FIG. 30 is a schematic diagram of still another pressure boosting process in a redundant braking mode according to an embodiment of this application.

Pressure boosting process in the redundant braking mode: FIG. 30 is a schematic diagram of another pressure boosting process in the redundant braking mode provided in FIG. 20 according to an embodiment of this application. A pressure boosting process in FIG. 30 is similar to the pressure boosting process in FIG. 28, and a difference lies in that the redundant brake system 120 in FIG. 30 may further simulate foot feel. When the master brake system fails, the controller controls the fifth redundant isolation valve 52 and the sixth redundant isolation valve 53 to be in a switched-off state, and controls the first pedal feel simulator switch valve 43 to be in a switched-on state, and the brake fluid in the brake master cylinder 7 flows to the first pedal feel simulator 10 through the first pedal feel simulator switch valve 43, and feeds back pedal feel information to the driver.

Figure 21:
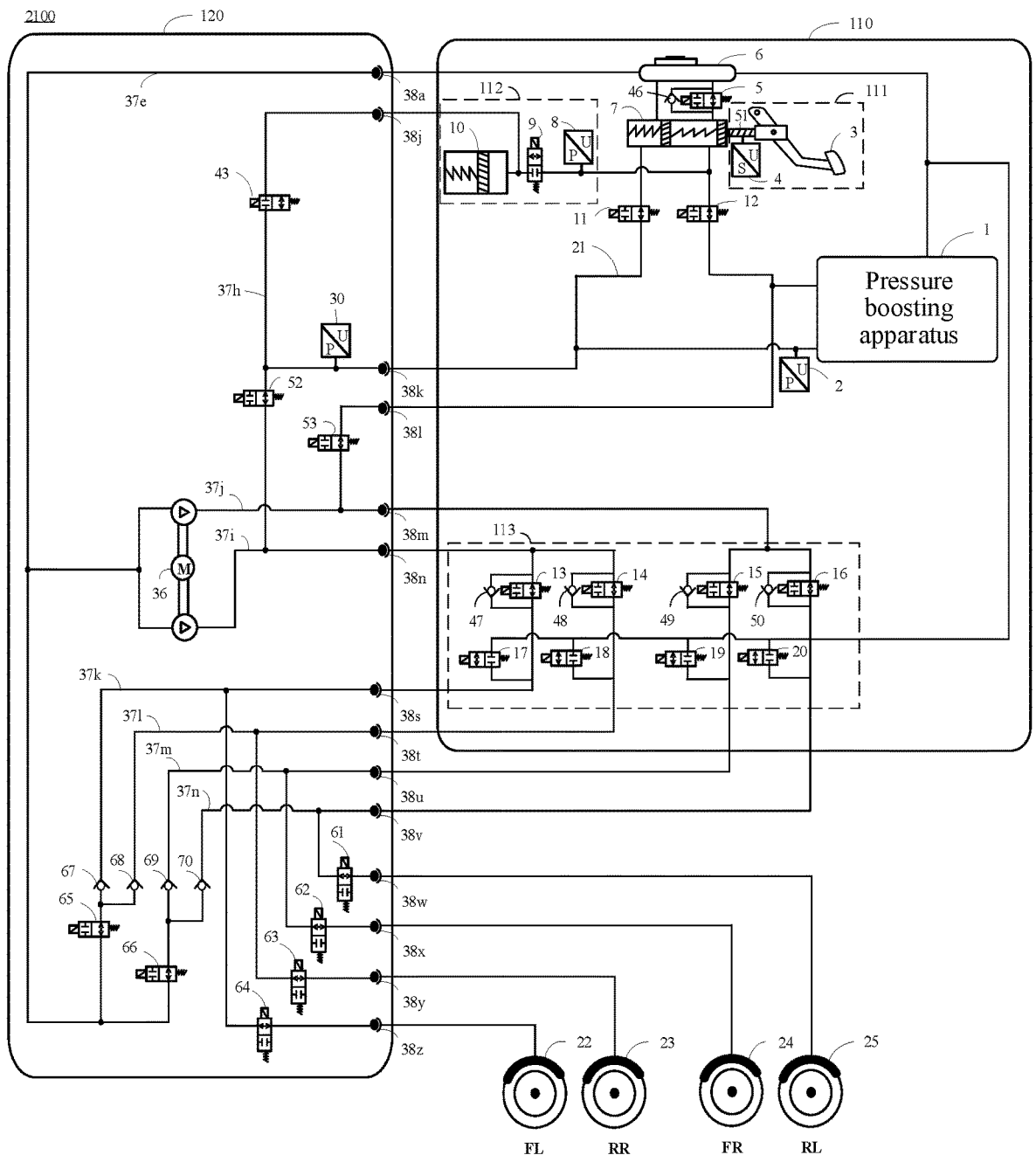
FIG. 21 is a schematic diagram of still another brake-by-wire system according to an embodiment of this application.

It should be noted that the redundant brake system 120 in the brake-by-wire system shown in FIG. 20 may be in a low-pressure state, or may be in a high-pressure state, as shown in FIG. 21. FIG. 21 is a schematic diagram of still another brake-by-wire system according to an embodiment of this application. For a detailed explanation of whether the redundant brake system is in a low-pressure state or a high-pressure state, refer to FIG. 11 and FIG. 12. Details are not described herein again. Similarly, the brake-by-wire system shown in FIG. 21 also includes three operating modes: a manual braking mode, a pressure boosting apparatus braking mode, and a redundant braking mode. An operating principle in the redundant braking mode is similar to that shown in FIG. 30. To avoid repetition, details are not described herein again.

In the solution of this application, the wheel cylinder outlet valve and the wheel cylinder inlet valve for each brake wheel cylinder are disposed in the redundant brake system, so that when the master brake system fails, the redundant brake system can independently control each brake wheel cylinder, to implement function backup for the master brake system, thereby meeting the requirements for braking functions such as ABS/AEB/ESC/TCS of the vehicle, and further improving safety of the brake system. Similarly, in this solution, the redundant brake system 120 in the brake-by-wire system may further feed back pedal feel information to the driver. When the master brake system fails, pedal feel of the driver can still be ensured, thereby bringing more stable and comfortable driving experience to the driver.

The foregoing has described the brake-by-wire system in the embodiments of this application and operating processes of the brake-by-wire system in different operating modes with reference to FIG. 1(*a*) and FIG. 1(*b*) to FIG. 30. The following describes a control method of the brake-by-wire system in the embodiments of this application with reference to FIG. 31.

Figure 31:
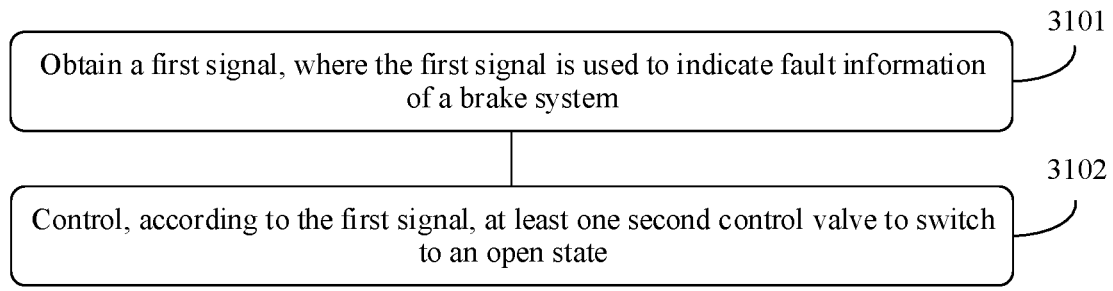
FIG. 31 is a schematic flowchart of a brake-by-wire control method according to an embodiment of this application.

FIG. 31 is a schematic flowchart of a brake-by-wire control method according to an embodiment of this application. The method shown in FIG. 31 may be performed by a controller in a vehicle.

S3101: Obtain a first signal, where the first signal is used to indicate fault information of a brake system.

Optionally, a failure signal of a master brake system, that is, the first signal, may be obtained by using a travel length collected by the pedal or by collecting a pressure of the master cylinder.

S3102: Control, according to the first signal, the at least one second control valve (26, 27, 28, 29) to switch to a switched-off state.

It should be understood that for a specific process, refer to the foregoing related description of an operating process in the redundant braking mode of the brake-by-wire system. Details are not described herein again.

Figure 32:
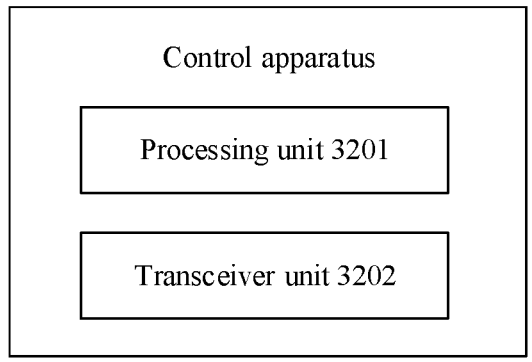
FIG. 32 is a schematic diagram of a control apparatus according to an embodiment of this application.
Figure 33:
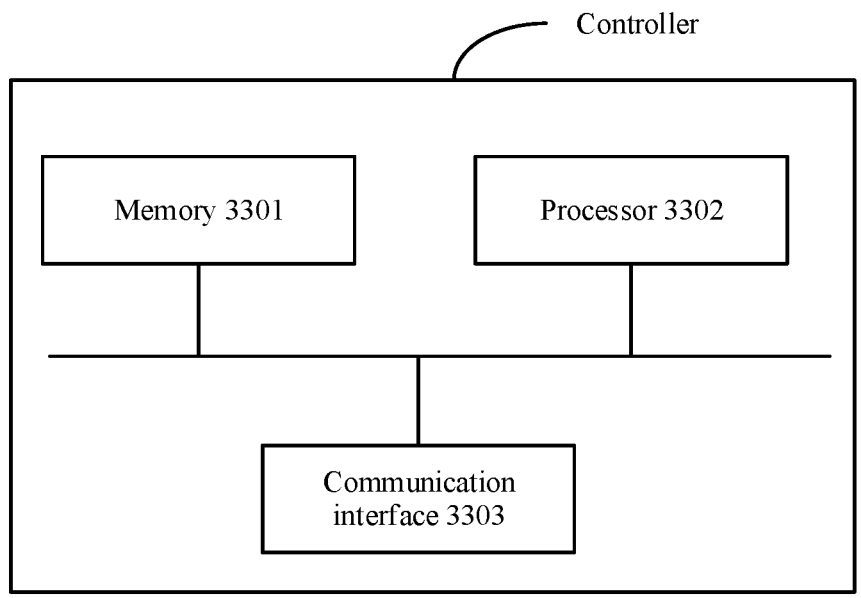
FIG. 33 is a schematic diagram of another control apparatus according to an embodiment of this application.

The following describes, with reference to FIG. 32 and FIG. 33, a control apparatus for performing the foregoing control method in this application. It should be noted that the apparatus in this embodiment of this application may be applied to any one of the foregoing brake-by-wire control systems. For brevity, details are not described herein again.

FIG. 32 is a schematic diagram of a control apparatus according to an embodiment of this application. The control apparatus shown in FIG. 32 includes a processing unit 3201 and a transceiver unit 3202.

The transceiver unit 3202 is configured to obtain a first signal, where the first signal is used to indicate fault information of a brake system.

The processing unit 3201 is configured to control, according to the first signal, the at least one second control valve (26, 27, 28, 29) to switch to a switched-off state.

The processing unit 3201 may be a processor 3302 in FIG. 33, and the transceiver unit 3202 may be a communication interface 3303 in FIG. 33.

FIG. 33 is a schematic diagram of another control apparatus according to an embodiment of this application. The control apparatus shown in FIG. 33 may be a controller in a vehicle, for example, a brake system controller. The control apparatus may include a memory 3301, the processor 3302, and the communication interface 3303. The memory 3301, the processor 3302, and the communication interface 3303 are connected through an internal connection path. The memory 3301 is configured to store instructions, and the processor 3302 is configured to execute the instructions stored in the memory 3302, to control the communication interface 3303 to receive/send information. Optionally, the memory 3301 may be coupled to the processor 3302 through an interface, or may be integrated with the processor 3302.

It should be noted that the communication interface 3303 uses an apparatus such as but not limited to an input/output interface, to implement communication between the controller and another device or a communication network.

In an implementation process, steps in the methods may be implemented by using a hardware integrated logic circuit in the processor 3302, or by using instructions in a form of software. The methods disclosed with reference to embodiments of this application may be directly performed by a hardware processor, or may be performed by a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 4001, and the processor 4002 reads information in the memory 4001 and completes the steps in the foregoing methods in combination with hardware of the processor 4002. To avoid repetition, details are not described herein again.

It should be understood that, in embodiments of this application, the processor may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like.

It should also be understood that, in embodiments of this application, the memory may include a read-only memory and a random access memory, and provide instructions and data to the processor. A part of the processor may further include a non-volatile random access memory. For example, the processor may further store device type information.

In embodiments of this application, "first", "second", and various numeric numbers are merely used for distinguishing for ease of description and are not intended to limit the scope of embodiments of this application. For example, "first", "second", and various numeric numbers are used for distinguishing between different pipelines, through holes, and the like.

It should be understood that the term "and/or" in this specification describes only an association relationship between associated objects and indicates that three relationships may exist. For example, A and/or B may represent the following three cases: Only A exists, both A and B exist, and only B exists. In addition, the character "/" in this specification generally indicates an "or" relationship between the associated objects.

It should be understood that, in embodiments of this application, the "outlet pipeline" and the "inlet pipeline" may correspond to different brake pipelines, or may correspond to a same brake pipeline. The "outlet pipeline" and the "inlet pipeline" are distinguished based only on functions of the brake pipelines in the braking control system. For example, when the "outlet pipeline" and the "inlet pipeline" correspond to a same brake pipeline 1, it may be understood that, in a process of depressurizing wheels of a vehicle, a brake pipeline (channel) in the braking control system is configured to transfer brake fluid in a brake wheel cylinder to a fluid storage apparatus. In this case, the brake pipeline may be referred to as an "outlet pipeline". In a process of pressurizing a wheel of the vehicle, the brake pipeline is configured to provide brake fluid to the wheel of the vehicle, to provide a braking force for the wheel of the vehicle. In this case, the brake pipeline may be referred to as an "inlet pipeline".

In addition, an "inlet valve", an "outlet valve", and a "pressure equalizing valve" used in the embodiments of this application are distinguished based only on functions of the control valves in the braking control system. A control valve configured to control connection or disconnection of the inlet pipeline may be referred to as an "inlet valve" or a "pressure boosting valve". A controller configured to control connection or disconnection of a fluid return pipeline may be referred to as an "outlet valve" or a "depressurization valve". A control valve configured to isolate brake subsystems at two levels may be referred to as an "isolation valve". The control valve may be a valve commonly used in an existing braking control system, for example, a solenoid valve. This is not specifically limited in this embodiment of this application.

In addition, in the embodiments of this application, when an architecture of a braking control system, an architecture of a vehicle, or the like is described with reference to the accompanying drawings, the accompanying drawings schematically show two operating states (closed or open) that may be implemented by each control valve. A current operating state of the control valve is not limited to that shown in the figures.

It should be understood that, in the embodiments of this application, sequence numbers of the foregoing processes do not mean execution sequences. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed operating process of the foregoing systems, apparatuses, and units, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A brake system, wherein the brake system comprises:
a brake master cylinder, a first pressure booster, a second pressure booster, at least one first interface, at least one first control valve, at least one second control valve, and at least one third control valve, wherein:
the at least one first interface is configured to connect to at least one brake wheel cylinder, respectively;
the brake master cylinder and the at least one first interface are respectively connected through the at least one first control valve, and the first pressure booster and the at least one first interface are respectively connected through the at least one first control valve, wherein the at least one first interface and the at least one first control valve are respectively connected through the at least one second control valve; and
the second pressure booster and the at least one first interface are respectively connected through the at least one third control valve.

2. The brake system according to claim 1, wherein the brake system further comprises at least one fourth control valve, and the at least one fourth control valve and the second pressure booster are connected in parallel.

3. The brake system according to claim 1, wherein:
the brake system further comprises a first fluid storage container and a second fluid storage container, wherein at least one fourth control valve and the second pressure booster are separately connected to the second fluid storage container, and the brake master cylinder and the first pressure booster are separately connected to the first fluid storage container; or
the brake system further comprises the first fluid storage container, wherein the at least one fourth control valve, the second pressure booster, the brake master cylinder, and the first pressure booster are separately connected to the first fluid storage container.

4. The brake system according to claim 1, wherein that the at least one first interface and the at least one first control valve are respectively connected through the at least one second control valve comprises:
the at least one second control valve and the at least one first control valve are directly connected through a pipeline; or
the at least one second control valve and the at least one first control valve are respectively connected through at least one second interface, wherein the brake system further comprises the at least one second interface.

5. The brake system according to claim 3, wherein that the at least one fourth control valve and the second pressure booster are separately connected to the first fluid storage container comprises:
the at least one fourth control valve, the second pressure booster, and the first fluid storage container are directly connected through a pipeline; or
the at least one fourth control valve and the second pressure booster are connected to the first fluid storage container through a third interface, wherein the brake system further comprises the third interface.

6. The brake system according to claim 5, wherein the brake system further comprises:
a second pedal feel simulation system, wherein the second pedal feel simulation system is connected to any one of the at least one second control valve, a first pressure sensor is connected to a second control valve connected to the second pedal feel simulation system, and the brake system further comprises the first pressure sensor.

7. The brake system according to claim 5, wherein the brake system further comprises:
at least one first one-way valve, wherein the at least one first one-way valve is connected in parallel to the at least one second control valve, a first pressure sensor is connected to any one of the at least one second control valve, and the brake system further comprises the first pressure sensor.

8. The brake system according to claim 5, wherein the brake system further comprises a first pedal feel simulator switch valve and a first pedal feel simulation system, wherein:
the first pedal feel simulator switch valve is connected to any one of the at least one second control valve;
a first pressure sensor is connected to a second control valve connected to the first pedal feel simulator switch valve, and a second hydraulic apparatus comprises the first pressure sensor; and
a first pedal feel simulator in the first pedal feel simulation system is connected to the first pedal feel simulator switch valve.

9. The brake system according to claim 8, wherein that a first pedal feel simulator in the first pedal feel simulation system is connected to the first pedal feel simulator switch valve comprises:
the first pedal feel simulator and the first pedal feel simulator switch valve are directly connected through a pipeline; or
the first pedal feel simulator and the first pedal feel simulator switch valve are connected through a fourth interface, wherein the second hydraulic apparatus further comprises the fourth interface.

10. The brake system according to claim 1, wherein the brake system further comprises at least one fifth control valve, at least one sixth control valve, and a mechanical brake input apparatus, wherein:
the mechanical brake input apparatus is connected to the brake master cylinder;
at least one fifth control valve is further comprised between the brake master cylinder and the at least one first control valve; and
one end of the at least one sixth control valve is connected to a hydraulic pipeline between the at least one first control valve and the at least one second control valve, and the other end of the at least one sixth control valve is configured to be hydraulically connected to a fluid storage container.

11. A first brake subsystem, wherein the first brake subsystem comprises:
at least one first interface, at least one second interface, at least one second control valve, at least one third control valve, and a second pressure booster, wherein:
the at least one first interface is configured to connect to at least one brake wheel cylinder;
the second pressure booster is connected to the at least one first interface through the at least one third control valve; and
the at least one second interface is connected to the at least one first interface through the at least one second control valve.

12. The first brake subsystem according to claim 11, wherein the first brake subsystem further comprises at least one fourth control valve, and the at least one fourth control valve and the second pressure booster are connected in parallel.

13. The first brake subsystem according to claim 11, wherein the first brake subsystem further comprises:
a second fluid storage container, wherein at least one fourth control valve and the second pressure booster are separately connected to the second fluid storage container; or
a third interface, wherein the at least one fourth control valve and the second pressure booster are separately connected to the third interface.

14. The first brake subsystem according to claim 13, wherein the first brake subsystem further comprises:
a second pedal feel simulation system, wherein the second pedal feel simulation system is connected to any one of the at least one second control valve, a first pressure sensor is connected to a second control valve connected to the second pedal feel simulation system, and a first hydraulic apparatus comprises the first pressure sensor.

15. The first brake subsystem according to claim 13, wherein the first brake subsystem further comprises:
at least one first one-way valve, wherein the at least one first one-way valve is connected in parallel to the at least one second control valve, a first pressure sensor is connected to any one of the at least one second control valve, and the first brake subsystem comprises the first pressure sensor.

16. The first brake subsystem according to claim 13, wherein:
the first brake subsystem further comprises a fourth interface and a first pedal feel simulator switch valve;
the fourth interface is connected to any one of the at least one second control valve through the first pedal feel simulator switch valve; and
a first pressure sensor is connected to a second control valve connected to the first pedal feel simulator switch valve, and the first brake subsystem comprises the first pressure sensor.

17. A brake system control method, applied to a brake system, wherein:
the brake system comprises:
a brake master cylinder, a first pressure booster, a second pressure booster, at least one first interface, at least one first control valve, at least one second control valve, and at least one third control valve, wherein:
the at least one first interface is configured to connect to at least one brake wheel cylinder, respectively;
the brake master cylinder and the at least one first interface are respectively connected through the at least one first control valve, and the first pressure booster and the at least one first interface are respectively connected through the at least one first control valve, wherein the at least one first interface and the at least one first control valve are respectively connected through the at least one second control valve; and
the second pressure booster is connected to the at least one first interface through the at least one third control valve; and
the brake system control method comprises:
obtaining a first signal, wherein the first signal is used to indicate fault information of the brake system; and
controlling, according to the first signal, the at least one second control valve to switch to a switched-off state.

18. The brake system control method according to claim 17, wherein the brake system control method further comprises:
obtaining a second signal, wherein the second signal is used to indicate a first target braking requirement; and
controlling, according to the second signal, the at least one third control valve to switch to a first state, wherein the first state comprises:

at least one target third control valve is configured to be in a switched-on state, wherein the at least one third control valve comprises the at least one target third control valve, and the at least one target third control valve is determined according to the second signal.

19. The brake system control method according to claim 18, wherein:
the brake system further comprises at least one fourth control valve, and the at least one fourth control valve and the second pressure booster are connected in parallel; and
the brake system control method further comprises:
obtaining a third signal, wherein the third signal is used to indicate a second target braking requirement; and
controlling, according to the third signal, the at least one fourth control valve to switch to a second state, wherein the second state comprises:
at least one target fourth control valve is configured to be in a switched-on state, wherein the at least one fourth control valve comprises the at least one target fourth control valve, and the at least one target fourth control valve is determined according to the third signal.

20. The brake system control method according to claim 17, wherein the brake system comprises a second pedal feel simulation system, the second pedal feel simulation system is connected to any one of the at least one second control valve, a first pressure sensor is connected to a second control valve connected to the second pedal feel simulation system, and the brake system further comprises the first pressure sensor; and
the brake system control method further comprises:
obtaining a fourth signal, wherein the fourth signal is used to indicate the second pedal feel simulation system to operate; and
controlling, according to the fourth signal, a second pedal feel simulator switch valve in the second pedal feel simulation system to switch to a third state, wherein the third state comprises: the second pedal feel simulator switch valve is configured to be in a switched-on state.

* * * * *